(12) United States Patent
Tsujii et al.

(10) Patent No.: US 9,593,243 B2
(45) Date of Patent: Mar. 14, 2017

(54) COMPOUND, PIGMENT DISPERSING AGENT, PIGMENT COMPOSITION, PIGMENT DISPERSION AND TONER CONTAINING SAID COMPOUND

(71) Applicant: CANON KABUSHIKI KAISHA, Tokyo (JP)

(72) Inventors: Yuki Tsujii, Tokyo (JP); Yasuaki Murai, Kawasaki (JP); Takayuki Toyoda, Yokohama (JP); Waka Hasegawa, Tokyo (JP); Masanori Seki, Yokohama (JP); Chiaki Nishiura, Pittsburgh, PA (US); Masashi Kawamura, Yokohama (JP); Masashi Hirose, Machida (JP); Ayano Mashida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/912,383

(22) PCT Filed: Aug. 26, 2014

(86) PCT No.: PCT/JP2014/072856
§ 371 (c)(1),
(2) Date: Feb. 16, 2016

(87) PCT Pub. No.: WO2015/030223
PCT Pub. Date: Mar. 5, 2015

(65) Prior Publication Data
US 2016/0185971 A1    Jun. 30, 2016

(30) Foreign Application Priority Data
Aug. 28, 2013    (JP) .................. 2013-177371

(51) Int. Cl.
*G03G 9/097*    (2006.01)
*C09B 69/10*    (2006.01)
(Continued)

(52) U.S. Cl.
CPC .............. *C09B 69/106* (2013.01); *C08F 8/30* (2013.01); *C09B 67/0041* (2013.01);
(Continued)

(58) Field of Classification Search
CPC ..... C09B 69/106; C09B 67/0041; C98F 8/30; G03G 9/091
See application file for complete search history.

(56) References Cited

U.S. PATENT DOCUMENTS 7,250,479 B2    7/2007    Le et al.
7,348,367 B2    3/2008    Thetford et al.
(Continued)

FOREIGN PATENT DOCUMENTS

JP        6-148927 A       5/1994
JP    2000-239554 A       9/2000
(Continued)

OTHER PUBLICATIONS

U.S. Appl. No. 15/044,745, filed Feb. 16, 2016, Toyoda et al.
(Continued)

*Primary Examiner* — Peter Vajda
(74) *Attorney, Agent, or Firm* — Fitzpatrick, Cella, Harper & Scinto

(57) ABSTRACT

Provided is a compound that improves dispersibility of a pigment in a non-water-soluble solvent, and a pigment dispersing agent, a pigment composition, a pigment dispersion and a toner that use that compound. The present invention relates to a compound in which a polymer and a monoazo compound having a specific structure are bonded. The present invention further relates to a pigment dispersing (Continued)

agent, a pigment composition, a pigment dispersion and a toner containing that compound.

16 Claims, 4 Drawing Sheets

(51) Int. Cl.
    *C08F 8/30* (2006.01)
    *C09B 67/22* (2006.01)
    *G03G 9/087* (2006.01)
    *G03G 9/09* (2006.01)

(52) U.S. Cl.
    CPC ..... *C09B 67/0046* (2013.01); *G03G 9/08791* (2013.01); *G03G 9/08795* (2013.01); *G03G 9/091* (2013.01); *G03G 9/0914* (2013.01)

(56) References Cited

U.S. PATENT DOCUMENTS

| | | |
|---|---|---|
| 7,504,488 B2 | 3/2009 | Toyoda et al. |
| 7,582,152 B2 | 9/2009 | Jaunky et al. |
| 7,662,986 B2 | 2/2010 | Le et al. |
| 7,666,962 B2 | 2/2010 | Le et al. |
| 7,714,075 B1 | 5/2010 | Le et al. |
| 8,377,616 B2 | 2/2013 | Tani et al. |
| 8,628,899 B2 | 1/2014 | Kawamura et al. |
| 8,815,484 B2 | 8/2014 | Tanaka et al. |
| 8,815,485 B2 | 8/2014 | Tanaka et al. |
| 8,916,319 B2 | 12/2014 | Ikeda et al. |
| 8,936,894 B2 | 1/2015 | Toyoda et al. |
| 8,940,467 B2 | 1/2015 | Hashimoto et al. |
| 8,962,726 B2 | 2/2015 | Tanaka et al. |
| 9,097,999 B2 | 8/2015 | Murai et al. |
| 9,229,345 B2 | 1/2016 | Ikeda et al. |
| 2010/0261103 A1 | 10/2010 | Sasaki et al. |
| 2012/0094226 A1* | 4/2012 | Tani ............... C09B 29/337 430/108.23 |
| 2014/0356779 A1 | 12/2014 | Hasegawa et al. |
| 2014/0377697 A1 | 12/2014 | Nishiura et al. |
| 2015/0004538 A1 | 1/2015 | Kawamura et al. |
| 2015/0004539 A1 | 1/2015 | Watanabe et al. |
| 2015/0274853 A1 | 10/2015 | Nishiura et al. |
| 2015/0277254 A1 | 10/2015 | Mukumoto et al. |

FOREIGN PATENT DOCUMENTS

| | | |
|---|---|---|
| JP | 2000-515181 A | 11/2000 |
| JP | 2003-531001 A | 10/2003 |
| JP | 3721617 B2 | 11/2005 |
| JP | 2009-501251 A | 1/2009 |
| JP | 4254292 B2 | 4/2009 |
| JP | 2009-287002 A | 12/2009 |
| JP | 2012-067285 A | 4/2012 |
| WO | 98/01478 A1 | 1/1998 |
| WO | 01/80987 A2 | 11/2001 |
| WO | 2007/006637 A2 | 1/2007 |
| WO | 2009/060886 A1 | 5/2009 |

OTHER PUBLICATIONS

U.S. Appl. No. 15/045,589, filed Feb. 17, 2016, Yoshida et al..
New Experimental Chemistry, Maruzen Co., Ltd., 1st edition, vol. 15, pp. 390-448 (1977).
J. Brandrup et al. (eds.), Polymer Handbook, Third Edition, John Wiley & Sons, pp. 209-262 (1989).
Experimental Chemistry, Series 2, Maruzen Co., Ltd., vol. 17-2, pp. 162-179 (1956).
Krzysztof Matyjaszewski et al., "Atom Transfer Radical Polymerization," 101(9) Chem. Rev. 2921-2990 (Sep. 2001).
Craig J. Hawker et al., "New Polymer Synthesis by Nitroxide Mediated Living Radical Polymerizations," 101(12) Chem. Rev. 3661-3688 (Oct. 2001).
Masami Kamigaito et al., "Metail-Catalyzed Living Radical Polymerization," 101(12) Chem. Rev. 3689-3745 (Dec. 2001).
Atsushi Goto et al., "Mechanism-Based Invention of High-Speed Living Radical Polymerization Using Organotellurium compounds and Azo-Initiators," 125 J. Am. Chem. Soc. 8720-8721 (Jun. 2003).
Melvin S. Newman et al., "N-Methylpyrrolidone as Solvent for Reaction of Aryl Halides with Cuprous Cyanide," 26(7) J. Org. Chem. 2525-2528 (Jul. 1961).
Norman O .V. Sonntag, "The Reactions of Aliphatic Acid Chlorides," 52(2) Chem. Rev. 237-416 (1953).
J. Brandrup et al. (eds.), Polymer Handbook, Third Edition, John Wiley & Sons, pp. 209-277 (1989).

* cited by examiner

COMPOUND, PIGMENT DISPERSING AGENT, PIGMENT COMPOSITION, PIGMENT DISPERSION AND TONER CONTAINING SAID COMPOUND

TECHNICAL FIELD

The present invention relates to a novel compound, a pigment dispersing agent, a pigment composition and a pigment dispersion that contain the compound, and a full-color toner that uses the pigment composition as a colorant.

BACKGROUND ART

Fine pigment tends to demonstrate strong cohesive force between pigment particles in a medium such as an organic solvent or molten resin, and aggregated pigment ends up causing a decrease in tinting strength.

Various pigment dispersing agents and pigment compositions containing such pigment dispersing agents have been proposed for improving pigment dispersibility. For example, an example has been disclosed that combines the use of a pigment having an azo skeleton and a binder resin having an acidic group (Patent Document 1). On the other hand, a toner has been disclosed that contains a block copolymer or graft copolymer, obtained by polymerizing a styrene-based monomer and acrylate-based monomer (or methacrylate-based monomer), carbon black and a binder resin in order to improve the dispersibility of carbon black in the toner (Patent Document 2). Moreover, an azo compound has been disclosed that has a styrene/acrylic-based polymer segment in order to improve the dispersibility of an azo pigment (Patent Document 3).

CITATION LIST

Patent Literature

[PTL 1] Japanese Patent Application Laid-open No. 2000-239554
[PTL 2] Japanese Patent Application Laid-open No. H6-148927
[PTL 3] Japanese Patent Application Laid-open No. 2012-067285

SUMMARY OF INVENTION

Technical Problems

However, although the pigment dispersing agent described in Patent Document 1 demonstrates high affinity for some pigments having an acidic group, since it has inadequate affinity for other pigments, those pigments that are actually able to be dispersed end up being limited. Moreover, binding between a pigment and binder ends up being misdirected in a toner produced in an aqueous dispersant, and there are cases in which adequate dispersion effects are not obtained.

In addition, in the method described in Patent Document 2, a large amount of dispersing agent must be added to obtain a certain level of pigment dispersibility, and depending on the application, there is concern over an excessive amount of dispersing agent having detrimental effects on various required properties.

In addition, in the case of using the compound described in Patent Document 3, favorable dispersibility is obtained particularly in the case of azo pigments. However, further improvement of pigment dispersibility is required in order to respond to recent demands for even higher image quality of output images.

An object of the present invention is to solve the above-mentioned problems. Namely, the present invention provides a compound having both high affinity for various types of pigments as well as high affinity for polymerizable monomers, binder resins and non-water-soluble solvents in the case of using as a pigment dispersing agent. In addition, the present invention provides a pigment composition having favorable dispersibility in a non-water-soluble solvent. In addition, the present invention provides a pigment dispersion that demonstrates a favorable dispersed state in a non-water-soluble solvent. Moreover, the present invention provides a full-color toner having high tinting strength by applying a pigment composition using the pigment dispersing agent as a toner colorant.

Solution to Problem

The above-mentioned problems are solved by the present invention as described below. Namely, the present invention provides a compound in which a partial structure represented by the following formula (1) is bound to a polymer having a monomer unit represented by the following formula (2):

[Chemical Formula 1]

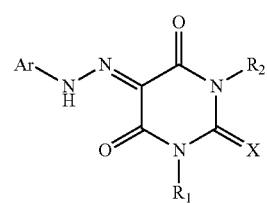

Formula (1)

(wherein,
Ar represents an aryl group,
Ar, $R_1$ and $R_2$ satisfy at least one of the following conditions (i) and (ii):
(i) Ar has a linking group that composes a bonding moiety with the polymer obtained by bonding to a carbon atom in the aryl group; and
(ii) $R_1$ or $R_2$ is a linking group that composes a bonding moiety with the polymer,
in the case $R_1$ and $R_2$ are not linking groups, $R_1$ and $R_2$ each independently represent hydrogen atoms, alkyl groups, phenyl groups or aralkyl groups, and
X represents O, NH or S), and

[Chemical Formula 2]

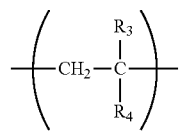

Formula (2)

(wherein, $R_3$ represents a hydrogen atom or alkyl group, and $R_4$ represents a phenyl group, carboxyl group, carboxylic acid ester group or carboxylic acid amide group).

In addition, the present invention provides a pigment dispersing agent, a pigment composition, a pigment dispersion and a full-color toner that contain the above-mentioned novel compound.

Advantageous Effects of Invention

A novel compound is provided by the present invention. A compound in which a partial structure represented by the above-mentioned formula (1) is bound to a polymer having a monomer unit represented by the aforementioned formula (2) demonstrates high affinity for a non-water-soluble solvent, and particularly affinity for a nonpolar solvent and affinity for various types of pigments. Consequently, a pigment composition having improved pigment dispersibility is provided by using the compound according to the present invention as a dispersing agent. In addition, a pigment dispersion, and preferably a styrene pigment dispersion, which has superior dispersibility in a non-water-soluble solvent, is provided by using the pigment composition. Moreover, a full-color toner having high tinting strength is provided by using the pigment composition as a colorant.

Furthermore, the partial structure represented by formula (1) is also referred to as an "azo skeleton structure". Moreover, a compound in which an azo skeleton structure is bound to a polymer having a monomer unit represented by formula (2) is also referred to as a "compound having an azo skeleton structure". In addition, a compound indicating only a polymer having a monomer unit represented by formula (2) to which an azo skeleton structure is not bound is referred to as a "polymer segment".

DESCRIPTION OF EMBODIMENTS

Figure 1:
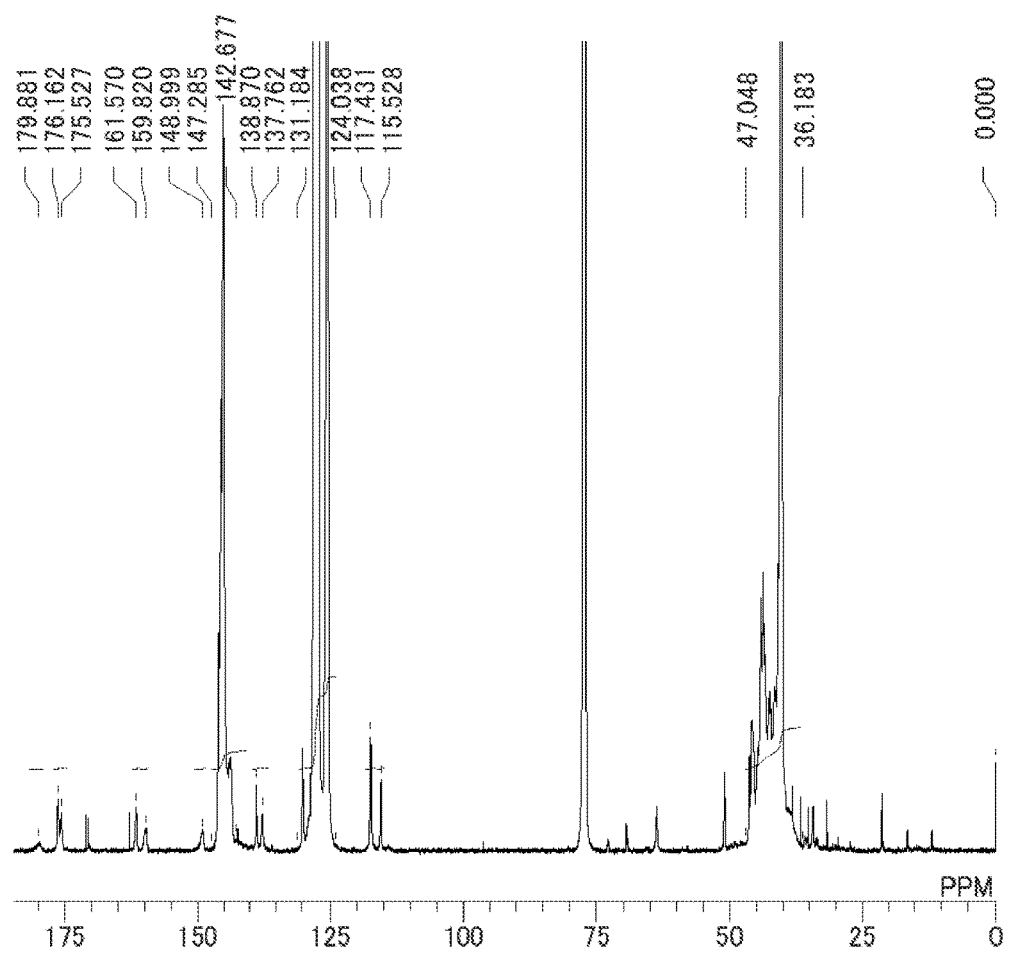
FIG. 1 is a drawing representing the $^{13}$C-NMR spectrum of a compound (C-1) relating to the present invention as determined in CDCl$_3$, at room temperature and at 150 MHz.

The following provides a detailed explanation of the present invention by indicating preferred embodiments thereof.

First, an explanation is provided of the compound of the present invention.

The compound of the present invention is composed of an azo skeleton structure that has high affinity for pigment and is represented by formula (1) and a polymer segment that has high affinity for a non-water-soluble solvent and has a monomer unit represented by formula (2):

[Chemical Formula 3]

-continued

Formula (1)

(wherein,
Ar represents an aryl group,
Ar, $R_1$ and $R_2$ satisfy at least one of the following conditions (i) and (ii):
  (i) Ar has a linking group that composes a bonding moiety with the polymer obtained by bonding to a carbon atom in the aryl group; and
  (ii) $R_1$ or $R_2$ is a linking group that composes a bonding moiety with the polymer,
in the case $R_1$ and $R_2$ are not linking groups, $R_1$ and $R_2$ each independently represent hydrogen atoms, alkyl groups, phenyl groups or aralkyl groups, and
X represents O, NH or S), and

[Chemical Formula 4]

Formula (2)

(wherein, $R_3$ represents a hydrogen atom or alkyl group, and $R_4$ represents a phenyl group, carboxyl group, carboxylic acid ester group or carboxylic acid amide group).

First, a detailed explanation is provided of the azo skeleton structure represented by the above-mentioned formula (1).

In the above-mentioned formula (1), Ar represents an aryl group.

In the above-mentioned formula (1), Ar, $R_1$ and $R_2$ satisfy at least one of the following conditions (i) and (ii):
  (i) Ar has a linking group that composes a bonding moiety with the polymer obtained by bonding to a carbon atom in the aryl group; and
  (ii) $R_1$ or $R_2$ is a linking group that composes a bonding moiety with the polymer.

In the case $R_1$ and $R_2$ are not linking groups, $R_1$ and $R_2$ each independently represent hydrogen atoms, alkyl groups, phenyl groups or aralkyl groups.

Examples of alkyl groups represented by $R_1$ and $R_2$ in the above-mentioned formula (1) include linear, branched or cyclic alkyl groups such as a methyl group, ethyl group, n-propyl group, n-butyl group, n-pentyl group, n-hexyl group, isopropyl group, isobutyl group, sec-butyl group, tert-butyl group or cyclohexyl group.

Examples of aralkyl groups represented by $R_1$ and $R_2$ in the above-mentioned formula (1) include a benzyl group and phenethyl group.

Substituents of $R_1$ and $R_2$ in the above-mentioned formula (1) may be further substituted with substituents provided they do not significantly inhibit affinity for pigment. In this case, examples of substituents that may be substituted include a halogen atom, nitro group, amino group, hydroxyl group, cyano group and trifluoromethyl group.

Although $R_1$ and $R_2$ in the aforementioned formula (1) can be arbitrarily selected from the previously listed substituents, phenyl group, hydrogen atom and substituents for bonding with a polymer as a linking group thereof, the case in which they are hydrogen atoms is preferable from the viewpoint of affinity for pigment.

Although X in the above-mentioned formula (1) can be arbitrarily selected from an oxygen atom (O), NH and sulfur atom (S), the case in which it is O is preferable from the viewpoint of raw material availability.

Ar in the above-mentioned formula (1) represents an aryl group as previously described. Examples of aryl groups include a phenyl group and naphthyl group.

Ar in the above-mentioned formula (1) may be further substituted with a substituent provided it does not significantly inhibit affinity for pigment. In this case, examples of substituents that may be substituted include an alkyl group, alkoxy group, halogen atom, hydroxyl group, cyano group, trifluoromethyl group, carboxyl group, carboxylic acid ester group and carboxylic acid amide group. Ar preferably has a linking group composed of a bonding moiety with the polymer that is obtained by bonding to a carbon atom in the aryl group, and preferably does not have a group other than the linking group as a substituent from the viewpoint of affinity for pigment.

With respect to Ar in the above-mentioned formula (1), the partial structure represented by the above-mentioned formula (1) is preferably a partial structure represented by the following formula (3) from the viewpoint of production ease. Namely, the case in which Ar in formula (1) is a phenyl group that may or may not have a substituent is preferable:

[Chemical Formula 5]

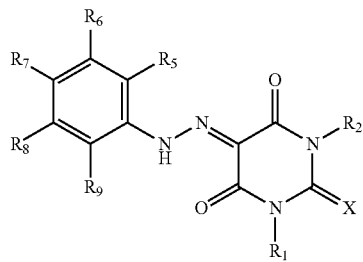

Formula (3)

(wherein, at least one of $R_1$, $R_2$ and $R_5$ to $R_9$ is a substituent for bonding with the polymer as a linking group, and in the case $R_1$, $R_2$ and $R_5$ to $R_9$ are not linking groups, $R_1$, $R_2$ and $R_5$ to $R_9$ each independently represent a hydrogen atom, $COOR_{10}$ group or $CONR_{11}R_{12}$ group, and $R_{10}$ to $R_{12}$ each independently represent a hydrogen atom or alkyl group).

Examples of alkyl groups represented by $R_{10}$ to $R_{12}$ in the above-mentioned formula (3) include linear, branched or cyclic alkyl groups such as a methyl group, ethyl group, n-propyl group, n-butyl group, n-pentyl group, n-hexyl group, isopropyl group, isobutyl group, sec-butyl group, tert-butyl group or cyclohexyl group.

Although $R_{10}$ to $R_{12}$ in the above-mentioned formula (3) can be arbitrarily selected from the previously listed substituents or a hydrogen atom, the case in which $R_{10}$ is a methyl group, $R_{11}$ is a hydrogen atom and $R_{12}$ is a methyl group or hydrogen atom is preferable from the viewpoint of affinity for pigment.

Although $R_5$ to $R_9$ in the above-mentioned formula (3) can be arbitrarily selected from a hydrogen atom, $COOR_{10}$ group, $CONR_{11}R_{12}$ group and substituent for bonding with polymer as the linking group, the case in which at least one of $R_5$ to $R_9$ is a linking group while all other $R_5$ to $R_9$ that are not linking groups are hydrogen atoms is preferable from the viewpoints of production ease and affinity for pigment.

Although there are no particular limitations thereon, the case in which the number of substitutions of the polymer that bonds to the partial structure represented by the above-mentioned formula (3) is one or two locations of the polymer is preferable from the viewpoint of production ease.

Although there are no particular limitations on the linking group with the polymer provided it is a divalent linking group, examples thereof include a linking group having a carboxylic acid ester bond, a linking group having a sulfonic acid ester bond and a linking group having a carboxylic acid amide bond. A linking group having a carboxylic acid ester bond or carboxylic acid amide bond is preferable from the viewpoint of production ease.

The linking group is formed by a reaction between a functional group possessed by the polymer before linking and a functional group possessed by the azo compound before linking. There are no particular limitations on the functional groups for forming the linking group. Examples thereof include a functional group having a hydroxyl group, a functional group having a sulfonate group, a functional group having an amino group and a functional group having a carboxyl group.

Examples of functional groups having a hydroxyl group include hydroxyl group, hydroxyalkyl groups such as a hydroxymethyl group, hydroxyethyl group or hydroxypropyl group, and groups represented by $-R_{51}-O-R_{52}-OH$ (wherein, $R_{51}$ and $R_{52}$ each independently represent an alkylene group having 1 to 4 carbon atoms).

Examples of functional groups having a sulfonate group include sulfonate groups and sulfoalkyl groups such as a sulfomethyl group, sulfoethyl group or sulfopropyl group.

Examples of functional groups having an amino group include amino groups and aminoalkyl groups such as an aminomethyl group, aminoethyl group or aminopropyl group.

Examples of functional groups having a carboxyl group include carboxyl groups and carboxyalkyl groups such as a carboxymethyl group, carboxyethyl group or carboxypropyl group.

Specific examples of the linking group include those represented by the following formulas:

[Chemical Formula 6]

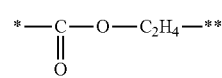 L1

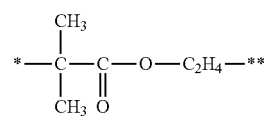 L2

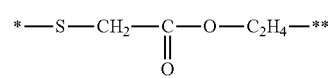 L3

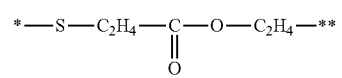 L4

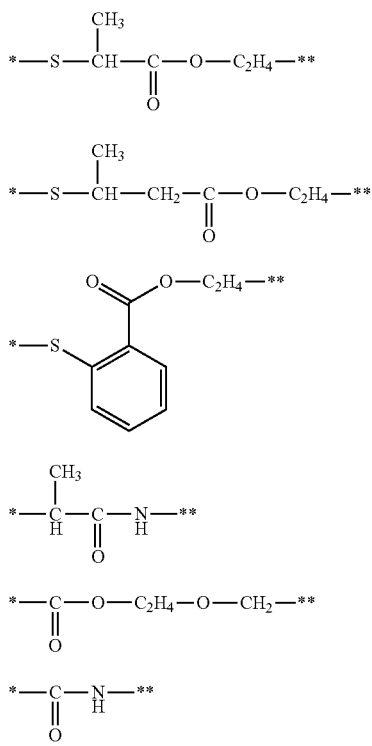

(wherein, asterisks (*) in formulas (L1) to (L10) represent a binding segment with the aforementioned polymer, and double asterisks (**) represent a binding segment with the azo skeleton structure represented by the above-mentioned formula (1)).

The following provides an explanation of the polymer segment having a monomer unit represented by the above-mentioned formula (2).

Although there are no particular limitations on the alkyl group represented by $R_3$ in the above-mentioned formula (2), examples thereof include linear, branched and cyclic alkyl groups such as a methyl group, ethyl group, n-propyl group, n-butyl group, n-pentyl group, n-hexyl group, isopropyl group, isobutyl group, sec-butyl group, tert-butyl group or cyclohexyl group.

Although $R_3$ in the above-mentioned formula (2) can be arbitrarily selected from the previously listed substituents and a hydrogen atom, the case in which it is a hydrogen atom or methyl group is preferable from the viewpoint of polymerizability of the polymerizable monomer that forms the monomer unit.

Although there are no particular limitations on the carboxylic acid ester group represented by $R_4$ in the above-mentioned formula (2), examples thereof include linear and branched ester groups such as a methyl ester group, ethyl ester group, n-propyl ester group, isopropyl ester group, n-butyl ester group, isobutyl ester group, sec-butyl ester group, tert-butyl ester group, octyl ester group, nonyl ester group, decyl ester group, undecyl ester group, dodecyl ester group, hexadecyl ester group, octadecyl ester group, eicosyl ester group, docosyl ester group, 2-ethylhexyl ester group, phenyl ester group, benzyl ester group or 2-hydroxyethyl ester group.

Examples of carboxylic acid amide groups represented by $R_4$ in the above-mentioned formula (2) include linear and branched amides such as a N-methylamide group, N,N-dimethylamide group, N-ethylamide group, N,N-diethylamide group, N-isopropylamide group, N,N-diisopropylamide group, N-n-butylamide group, N,N-di-n-butylamide group, N-isobutylamide group, N,N-diisobutylamide group, N-sec-butylamide group, N,N-di-sec-butylamide group, N-tertbutylamide group, N-octylamide group, N,N-dioctylamide group, N-nonylamide group, N,N-dinonylamide group, N-decylamide group, N,N-didecylamide group, N-undecylamide group, N,N-diundecylamide group, N-dodecylamide group, N,N-didodecylamide group, N-hexadecylamide group, N-octadecylamide group, N-phenylamide group, N-(2-ethylhexyl)amide group or N,N-di(2-ethylhexyl)amide group.

A substituent of $R_4$ in the above-mentioned formula (2) may be further substituted, and there are no particular limitations thereon provided it does not inhibit polymerizability of the polymerizable monomer that forms a monomer unit or cause a significant decrease in solubility of the above-mentioned compound having an azo skeleton structure. In this case, examples of substituents that may be substituted include alkoxy groups such as a methoxy group or ethoxy group, amino groups such as an N-methylamino group or N,N-dimethylamino group, acyl groups such as an acetyl group, and halogen atoms such as a fluorine atom or chlorine atom.

$R_4$ in the above-mentioned formula (2) can be suitably selected from the previously listed substituents, phenyl group or carboxyl group. The case in which it is a phenyl group or carboxylic acid ester group is preferable from the viewpoints of dispersibility and compatibility in a medium of the above-mentioned compound having an azo skeleton structure.

Affinity with the above-mentioned polymer segment and dispersion medium can be controlled by changing the proportion of the monomer unit represented by the above-mentioned formula (2). In the case the dispersion medium is a nonpolar solvent in the manner of styrene, increasing the proportion of a monomer unit in which $R_4$ in the above-mentioned formula (2) is represented with a phenyl group is preferable from the viewpoint affinity with the dispersion medium. In addition, in the case the dispersion medium is a solvent having a certain degree of polarity in the manner of acrylic acid ester, increasing the proportion of a monomer unit in which $R_4$ in the above-mentioned formula (2) is represented with a carboxyl group, carboxylic acid ester group or carboxylic acid amide group is preferable from the viewpoint of affinity with the dispersion medium.

A polymer containing a monomer unit in which $R_4$ is a carboxyl group can be used for the polymer before being linked to the partial structure represented by formula (1). A linking group can be formed by using this carboxyl group. In this case, the linking group is preferably that which contains a carboxylic acid ester bond or carboxylic acid amide bond from the viewpoint of production ease.

In addition, the polymer prior to being linked with the partial structure represented by the above-mentioned formula (1) may be that which has a carboxyl group on the end of the molecular chain. A linking group can be formed by using this carboxyl group. In this case as well, examples of the linking group include a group that contains an ester bond or carboxylic acid amide bond.

Examples of methods that can be applied for the method used to introduce the above-mentioned carboxyl group onto the end of a molecular chain include an atom transfer radical polymerization (ATRP) method to be subsequently described, a method that uses a polymerization initiator having a carboxyl group, and a method that uses a mercaptan-based chain transfer agent having a carboxyl group.

With respect to the molecular weight of the above-mentioned polymer segment, the number average molecular weight thereof is preferably 500 or more from the viewpoint of improving pigment dispersibility. A larger molecular weight is more effective for improving pigment dispersibility. The number average molecular weight of the polymer segment is preferably 200,000 or less. In addition, the number average molecular weight of the polymer segment is more preferably within the range of 2,000 to 50,000 in consideration of production ease.

In addition, as is disclosed in Japanese Translation of PCT Application No. 2003-531001, a method is known for improving dispersibility by introducing a branched aliphatic chain on the end of a polyoxyalkylene carbonyl-based dispersing agent. In the polymer segment of the present invention as well, there are cases in which a branched aliphatic chain can be introduced on the end and dispersibility can be improved by synthesizing a telekelic polymer segment using a method in the manner of atom transfer radial polymerization (ATRP) to be subsequently described.

The location of the azo skeleton structure in the above-mentioned compound having an azo skeleton structure may be a random location or may be unevenly distributed by forming one or a plurality of blocks on one end.

The number of substitutions of the azo skeleton structure in the above-mentioned compound having an azo skeleton structure is such that dispersibility in pigment increases if the number of substitutions is high to a certain degree. The number of substitutions of the above-mentioned azo skeleton structure is preferably 0.5 to 10 and more preferably 0.5 to 5 based on 100 monomers that form the polymer segment.

As is indicated in the drawing below, the azo skeleton structure represented by the above-mentioned formula (1) has tautomers represented by the following formulas (4) and (5). These tautomer are also included within the scope of the present invention.

[Chemical Formula 7]

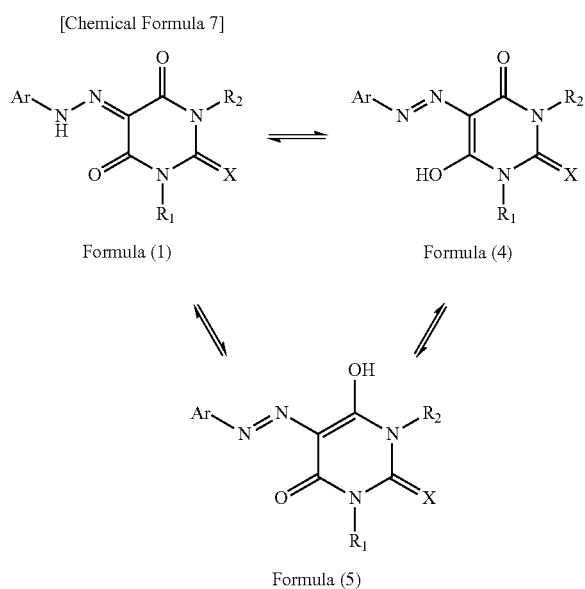

Formula (1)　　Formula (4)

Formula (5)

(In formulas (4) and (5), $R_1$, $R_2$, Ar and X respectively represent the same meanings as $R_1$, $R_2$, Ar and X in formula (1).)

The azo skeleton structure represented by the above-mentioned formula (1) can be synthesized in accordance with a known method.

Examples of methods used to synthesize the compound having an azo skeleton structure include the methods indicated by the following (i) to (iv).

First, the following provides a detailed explanation of method (i) by indicating an example of the scheme thereof. In method (i), a compound having an azo skeleton structure is synthesized by respectively synthesizing an azo skeleton structure and polymer segment in advance and bonding the two materials by a condensation reaction and the like.

Method (i)

(Chemical Formula 8)

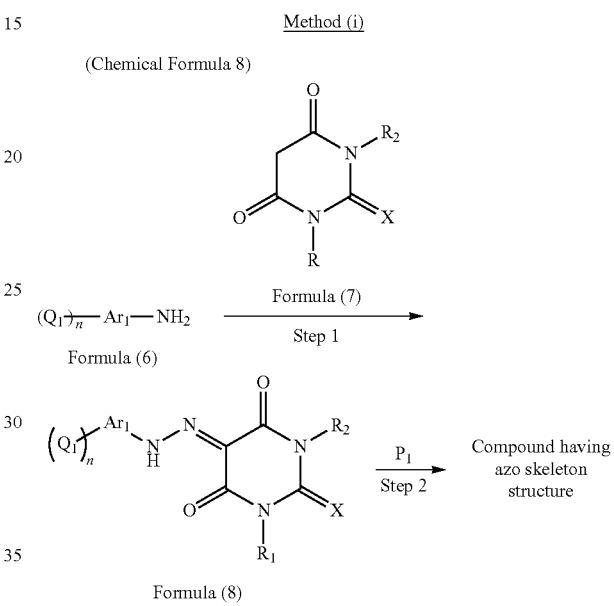

Formula (8)

(In formula (6), n represents an integer of 1 to 5, $Ar_1$ represents an arylene group, and $Q_1$ represents a substituent that forms a linking group by reacting with $P_1$ (substituent for bonding with the polymer as a linking group). In formula (7), $R_1$, $R_2$ and X respectively represent the same meanings as $R_1$, $R_2$ and X in the above-mentioned formula (1). In formula (8), $R_1$, $R_2$, X, $Ar_1$, n and $Q_1$ respectively represent the same meanings as $R_1$, $R_2$, X, $Ar_1$, n and $Q_1$ in formulas (6) and (7). $P_1$ represents a polymer segment obtained by polymerizing a polymerizable monomer that forms a monomer unit represented by the above-mentioned formula (2).)

In the scheme of method (i) exemplified above, a compound having an azo skeleton structure represented by the above-mentioned formula (1) can be synthesized by a step 1, in which an azo compound (8) is synthesized by subjecting an aniline derivative represented by formula (6) and a barbituric acid analogue represented by formula (7) to diazo coupling, and a step 2, in which the azo compound (8) and a polymer segment $P_1$ are bonded by a condensation reaction.

An explanation is first provided of step 1. A known method can be used in step 1. An example thereof is the method indicated below. First, an aniline derivative (6) is reacted with a diazotizing agent such as sodium nitrite or nitrosylsulfuric acid in a methanol solvent and in the presence of an inorganic acid such as hydrochloric acid or sulfuric acid to synthesize the corresponding diazonium salt. Moreover, this diazonium salt is coupled with the barbituric acid analogue (7) to synthesize the azo compound (8).

Numerous types of the above-mentioned aniline derivative (6) and the above-mentioned barbituric acid analogue (7) are sold commercially and are readily available. In addition, they can be easily synthesized according to known methods.

Although the present step can be carried out in the absence of solvent, it is preferably carried out in the presence of a solvent to prevent excessively rapid progression of the reaction. There are no particular limitations on the solvent provided it does not inhibit the reaction. Examples of solvents include alcohols such as methanol, ethanol or propanol, esters such as methyl acetate, ethyl acetate or propyl acetate, ethers such as diethyl ether, tetrahydrofuran or dioxane, hydrocarbons such as benzene, toluene, xylene, hexane or heptane, halocarbons such as dichloromethane, dichloroethane or chloroform, amides such as N,N-dimethylformamide, N-methylpyrrolidone or N,N-dimethylimidazolidinone, nitriles such as acetonitrile or propionitrile, acids such as formic acid, acetic acid or propionic acid, and water.

In addition, two or more types of the above-mentioned solvents may be used as a mixture, and the mixing ratio when using a mixture can be arbitrarily determined corresponding to the solubility of the substrate. Although the amount of the above-mentioned solvent used can be determined arbitrarily, it is preferably within the range of 1.0 times by mass to 20 times by mass of the compound represented by the above-mentioned formula (6) from the viewpoint of the reaction rate.

Step 1 is normally carried out within a temperature range of −50° C. to 100° C. and is normally completed within 24 hours.

Next, an explanation is provided of the method used to synthesize the polymer segment $P_1$ used in step 2. A known method can be used in the synthesis of the polymer segment $P_1$ (such as Krzysztof Matyjaszewski, et al., "Chemical Reviews" (USA), American Chemical Society, 2001, Vol. 101, pp. 2921-2990).

Although examples of methods include radical polymerization, cationic polymerization and anionic polymerization, radical polymerization is used preferably from the viewpoint of production ease.

Radical polymerization can be carried out by using a radical polymerization initiator, irradiating with radiation or laser light and the like, combining the use of a photopolymerization initiator and irradiation with light or by heating.

The radical polymerization initiator is only required to be that which generates radicals and is able to initiate a polymerization reaction, and is selected from compounds that generate radicals by the action of heat, light, radiation or an oxidation-reduction reaction and the like. Examples of radical polymerization initiators include azo compounds, organic peroxides, inorganic peroxides, organometallic compounds and photopolymerization initiators.

Examples thereof include azo-based polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile) or 4,4'-azobis(4-cyanovaleric acid), organic peroxide-based polymerization initiators such as benzoyl peroxide, di-tert-butyl peroxide, tert-butyl peroxyisopropylcarbonate, tert-hexyl peroxybenzoate or tert-butyl peroxybenzoate, inorganic peroxide-based polymerization initiators such as potassium persulfate or ammonium persulfate, and redox-based polymerization initiators such as ferrous hydrogen peroxide-based, benzoyl peroxide-dimethylaniline-based or cerium (IV) salt-alcohol-based initiators. Examples of photopolymerization initiators include benzophenones, benzoin ethers, acetophenones and thioxanthones. Two or more types of these radical polymerization initiators may be used in combination.

The amount of polymerization initiator used at this time is preferably adjusted to within a range of 0.1 parts by mass to 20 parts by mass based on 100 parts by mass of monomer so as allow the obtaining of a copolymer having a target molecular weight distribution.

The polymer segment represented by the above-mentioned $P_1$ can be produced using any of solution polymerization, suspension polymerization, emulsion polymerization, dispersion polymerization, precipitation polymerization or block polymerization, and there are no particular limitations thereon. Solution polymerization in a solvent capable of dissolving each component used during production is preferable.

Examples thereof include polar organic solvents in the manner of alcohols such as methanol, ethanol or 2-propanol, ketones such as acetone or methyl ethyl ketone, ethers such as tetrahydrofuran or diethyl ether, ethylene glycol monoalkyl ethers or acetates thereof, propylene glycol monoalkyl ethers or acetates thereof and diethylene glycol monoalkyl ethers. Depending on the case, a nonpolar solvent such as toluene or xylene can also be used alone or as a mixture. Among these, solvents having a boiling point within a temperature range of 100° C. to 180° C. are more preferable either alone or as a mixture.

The preferable temperature range of the polymerization temperature varies according to the type of initiator used, and there are no particular limitations thereon. For example, a temperature range of −30° C. to 200° C. is typical and a more preferable temperature range is 40° C. to 180° C.

The molecular weight distribution and molecular structure of the above-mentioned polymer segment represented by $P_1$ can be controlled using a known method. For example, a polymer segment can be produced for which molecular weight distribution and molecular structure have been controlled by using a method that uses an addition-fragmentation chain transfer agent (see Japanese Patent No. 4254292 and Japanese Patent No. 3721617), an NMP method that uses dissociation and binding of amine oxide radicals (see, for example, Craig J. Hawker, et al., "Chemical Reviews" (USA), American Chemical Society, 2001, Vol. 101, pp. 3661-3688), an ATRP method in which polymerization is carried out using a heavy metal and ligand and using a halide as polymerization initiator (see, for example, Masami Kamigaito, et al., "Chemical Reviews" (USA), American Chemical Society, 2001, Vol. 101, pp. 3689-3746), an RAFT method which uses a dithiocarboxylic acid ester or xanthate compound as polymerization initiator (see, for example, Japanese Translation of PCT Application No. 2000-515181) and an MADIX method (see, for example, WO 99/05099) or DT method (see, for example, Atsushi Goto, et al., "Journal of the American Chemical Society" (USA), American Chemical Society, 2003, Vol. 125, pp. 8720-8721).

Next, an explanation is provided of step 2. A known method can be used in step 2. For example, a compound having the above-mentioned azo skeleton structure in which the linking group has a carboxylic acid ester bond can be synthesized by using the polymer segment $P_1$ having a carboxyl group and the azo compound (8) in which $Q_1$ is a substituent having a hydroxyl group. In addition, a compound having the above-mentioned azo skeleton structure in which the linking group has a sulfonic acid ester bond can be synthesized by using the polymer segment $P_1$ having a hydroxyl group and the azo compound (8) in which $Q_1$ is a substituent having a sulfonic acid group. Moreover, a compound having the above-mentioned azo skeleton structure in which the linking group has a carboxylic acid amide bond can be synthesized by using the polymer segment $P_1$ having a carboxyl group and the azo compound (8) in which $Q_1$ is a substituent having an amino group. More specifically, examples thereof include a method that uses 1-ethyl-3-(3-dimethylaminopropyl)carbodiimide hydrochloride and the like as a dehydration condensation agent (see, for example, Melvin S. Newman, et al., "The Journal of Organic Chemistry" (USA), American Chemical Society, 1961, Vol. 26, No. 7, pp. 2525-2528), and the Schotten-Baumann method (see, for example, Norman O. V. Sonntag, "Chemical Reviews" (USA), American Chemical Society, 1953, Vol. 52, No. 2, pp. 237-416).

Although the present step can be carried out in the absence of solvent, it is preferably carried out in the presence of a solvent to prevent excessively rapid progression of the reaction. There are no particular limitations on the solvent provided it does not inhibit the reaction, and examples of solvents include ethers such as diethyl ether, tetrahydrofuran or dioxane, hydrocarbons such as benzene, toluene, xylene, hexane or heptane, halocarbons such as dichloromethane, dichloroethane or chloroform, amides such as N,N-dimethylformamide, N-methylpyrrolidone or N,N-dimethylimidazolidinone and nitriles such as acetonitrile or propionitrile.

In addition, two or more types of the above-mentioned solvents may be used as a mixture and the mixing ratio when using a mixture can be arbitrarily determined corresponding to the solubility of the substrate. Although the amount of the above-mentioned solvent used can be determined arbitrarily, it is preferably within the range of 1.0 times by mass to 20 times by mass of the above-mentioned polymer segment represented by $P_1$ from the viewpoint of the reaction rate.

The present step is normally carried out within a temperature range of 0° C. to 250° C. and is normally completed within 24 hours.

The following provides a detailed explanation of method (ii) by indicating an example of the scheme thereof. In method (ii), a compound having the above-mentioned azo skeleton structure is synthesized by preliminarily synthesizing an azo compound having a polymerizable functional group, and copolymerizing with a polymerizable monomer that forms a monomer unit represented by the above-mentioned formula (2).

Method (ii)

[Chemical Formula 9]

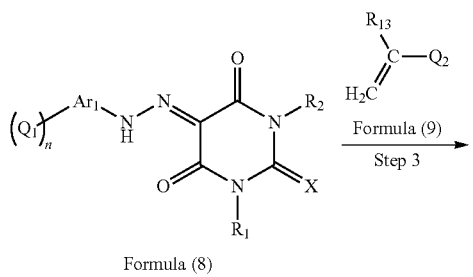

Formula (8)

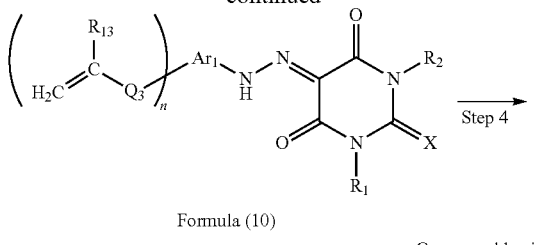

Formula (10)

Compound having azo skeleton structure (In Formula (8), $R_1$, $R_2$, $Ar_1$, X, $Q_1$ and n respectively represent the same meanings as $R_1$, $R_2$, $Ar_1$, X, $Q_1$ and n in formula (8) in the scheme of the above-mentioned method (i). $Q_2$ in formula (9) represents a substituent that forms $Q_3$ in formula (10) by reacting with $Q_1$ in formula (8), and $R_{13}$ represents a hydrogen atom or alkyl group. $R_1$, $R_2$, $Ar_1$, X, n and $R_{13}$ in formula (10) respectively represent the same meanings as $R_1$, $R_2$, $Ar_1$, X, n and $R_{13}$ in formulas (8) and (9), and $Q_3$ represents a linking group formed by a reaction between $Q_1$ in formula (8) and $Q_2$ in formula (9).)

In the scheme of method (ii) exemplified above, a compound having the above-mentioned azo skeleton structure can be synthesized by a step 3, in which a vinyl group-containing compound represented by formula (9) is introduced into an azo compound represented by formula (8) to synthesize an azo compound (10) having a polymerizable functional group, and a step 4, in which the azo compound (10) having a polymerizable functional group is copolymerized with a copolymerizable monomer that forms a monomer unit represented by the above-mentioned formula (2).

First, an explanation is provided of step 3. In step 3, the azo compound (10) having a polymerizable functional group can be synthesized using the same method as step 2 of the above-mentioned method (i). For example, the above-mentioned azo compound in which the linking group has a carboxylic acid ester bond can be synthesized by using the vinyl group-containing compound (9) having a carboxyl group and the azo compound (8) in which $Q_1$ is a substituent having a hydroxyl group. In addition, the above-mentioned azo compound in which the linking group has a sulfonic acid ester bond can be synthesized by using the vinyl group-containing compound (9) having a hydroxyl group and the azo compound (8) in which $Q_1$ is a substituent having a sulfonic acid group. Moreover, the above-mentioned azo compound in which the linking group has a carboxylic acid amide bond can be synthesized by using the vinyl group-containing compound (9) having a carboxyl group and the azo compound (8) in which $Q_1$ is a substituent having an amino group.

Numerous types of the above-mentioned vinyl group-containing compound (9) are sold commercially and are readily available. In addition, they can be easily synthesized according to known methods.

Next, an explanation is provided of step 4. In step 4, a compound having the above-mentioned azo skeleton structure can be synthesized by using the same method as that used to synthesize the polymer segment $P_1$ of the above-mentioned method (i).

The following provides a detailed explanation of method (iii) by indicating an example of the scheme thereof. In method (iii), a compound having the above-mentioned azo skeleton structure is synthesized by using a preliminarily synthesized azo compound having a halogen atom as a polymerization initiator and copolymerizing with a polymerizable monomer that forms a monomer unit represented by the above-mentioned formula (2).

Method (iii)

[Chemical Formula 10]

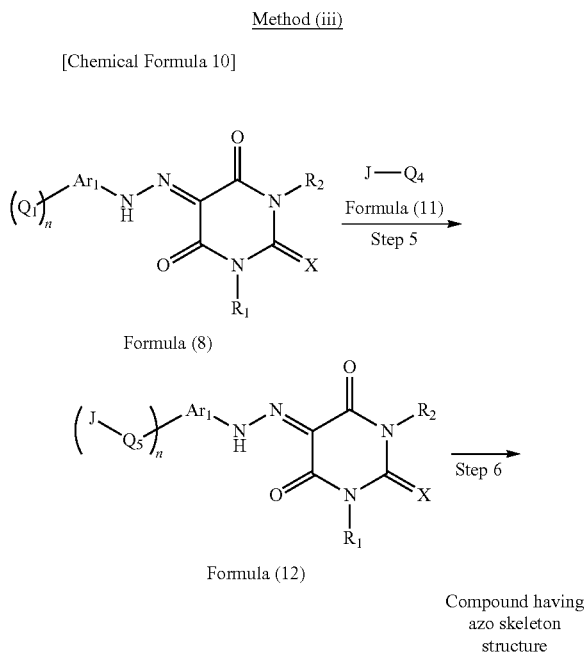

Formula (8)

Formula (12)

Compound having azo skeleton structure (In Formula (8), $R_1$, $R_2$, $Ar_1$, X, $Q_1$ and n respectively represent the same meanings as $R_1$, $R_2$, $Ar_1$, X, $Q_1$ and n in formula (8) in the scheme of the above-mentioned method (i). $Q_4$ in formula (11) represents a substituent that forms $Q_5$ in formula (12) by reacting with $Q_1$ in formula (8), and J represents a chlorine atom, bromine atom or iodine atom. $R_1$, $R_2$, $Ar_1$, X, n and J in formula (12) respectively represent the same meanings as $R_1$, $R_2$, $Ar_1$, X, n and J in formulas (8) and (11), and $Q_5$ represents a linking group formed by a reaction between $Q_1$ in formula (8) and $Q_4$ in formula (11).)

In the scheme of method (iii) exemplified above, a compound having an azo skeleton structure can be synthesized by a step 5, in which a halogen atom-containing compound represented by formula (11) is introduced into an azo compound represented by formula (8) to synthesize an azo compound (12) having a halogen atom, and a step 6, in which the azo compound (12) having a halogen atom is used as a polymerization initiator to polymerize a polymerizable monomer that forms a monomer unit represented by the above-mentioned formula (2).

First, an explanation is provided of step 5. In step 5, the azo compound (12) having a halogen atom can be synthesized using the same method as step 2 of the above-mentioned method (i).

For example, the above-mentioned azo compound in which the linking group has a carboxylic acid ester bond can ultimately be synthesized by using the halogen atom-containing compound (11) having a carboxyl group and the azo compound (8) in which $Q_1$ is a substituent having a hydroxyl group. In addition, the above-mentioned azo compound in which the linking group has a sulfonic acid ester bond can ultimately be synthesized by using the halogen atom-containing compound (11) having a hydroxyl group and the azo compound (8) in which $Q_1$ is a substituent having a sulfonic acid group. Moreover, the above-mentioned azo compound in which the linking group has a carboxylic acid amide bond can ultimately be synthesized by using the halogen atom-containing compound (11) having a carboxyl group and the azo compound (8) in which $Q_1$ is a substituent having an amino group.

Examples of the above-mentioned halogen atom-containing compound (11) having a carboxyl group include chloroacetic acid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-α-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylacetic acid, α-bromodiphenylacetic acid, α-bromo-α-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-chlorobutyric acid, β-bromoisobutyric acid, iododimethyl methylbenzoate and 1-chloroethylbenzoate, and acid halides or acid anhydrides thereof can also be similarly used in the present invention.

Examples of the above-mentioned halogen atom-containing compound (11) having a hydroxyl group include 1-chloroethanol, 1-bromoethanol, 1-iodoethanol, 1-chloropropanol, 2-bromopropanol, 2-chloro-2-propanol, 2-bromo-2-methylpropanol, 2-phenyl-1-bromoethanol and 2-phenyl-2-iodoethanol.

The following provides an explanation of step 6. In step 6, a compound having an azo skeleton structure can be synthesized by using the azo compound (11) having a halogen atom as a polymerization initiator, and polymerizing a polymerizable monomer that forms the above-mentioned monomer unit (2) in the presence of a metal catalyst and ligand using the ATRP method in the above-mentioned method (i).

Although there are no particular limitations on the metal catalyst used in the ATRP method, at least one type of transition metal selected from those of group 7 to group 11 of the periodic table is preferable. In a redox catalyst in which a low valence complex and high valence complex change reversibly (redox covalent complex), examples of low valence metals used include metals selected from the group consisting of $Cu^+$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$ and $Mn^{3+}$. Among these, $Cu^+$, $Ru^{2+}$, $Fe^{2+}$ or $Ni^{2+}$ is preferable and $Cu^+$ is particularly preferable. Examples of monovalent copper compounds include cuprous chloride, cuprous bromide, cuprous iodide and cuprous cyanide, and the above-mentioned copper compounds can be used preferably from the viewpoint of raw material availability.

An ordinary organic ligand is used for the ligand used in the ATRP method. Although examples thereof include 2,2'-bipyridyl and derivatives thereof, 1,10-phenanthroline and derivatives thereof, N,N,N',N'-tetramethylethylenediamine, N,N,N',N'',N''-pentamethyldiethylenetriamine, tris[2-(dimethylamino)ethyl]amine, triphenylphosphine and tributylphosphine, aliphatic polyamines in the manner of N,N,N', N'',N''-pentamethyldiethylenetriamine are preferable from the viewpoint of raw material availability.

The following provides a detailed explanation of method (iv) by indicating an example of the scheme thereof. In method (iv), a compound having an azo skeleton structure is synthesized by diazo coupling by respectively synthesizing a polymer segment, represented by the above-mentioned formula (2) preliminarily bound to an aryl group having an amino group, and a barbituric acid analogue.

Method (iv)

[Chemical Formula 11]

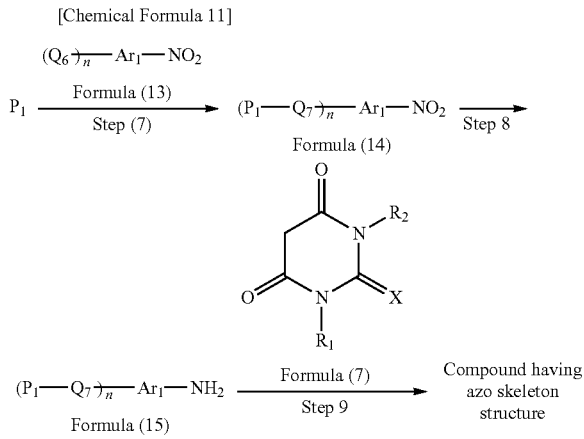

($P_1$ represents the same meaning as $P_1$ in the scheme of the above-mentioned method (i). $Ar_1$ and n in formula (13) respectively represent the same meanings as $Ar_1$ and n in formula (8) in the scheme of the above-mentioned method (i), and $Q_6$ represents a substituent that forms $Q_7$ in formula (14) by reacting with $P_1$. $Ar_1$ and n in formula (14) respectively represent the same meanings as $Ar_1$ and n in formula (13), and $Q_7$ represents a linking group formed by a reaction between $Q_6$ in formula (13) and $P_1$. $Ar_1$, n and $Q_7$ in formula (15) respectively represent the same meanings as $Ar_1$, n and $Q_7$ in formula (14). $R_1$, $R_2$ and X in formula (7) respectively represent the same meanings as $R_1$, $R_2$ and X in formula (7) in the scheme of the above-mentioned method (i).

In the scheme exemplified above, a compound having an azo skeleton structure can be synthesized by a step 7, in which a nitro group-containing arylene group (13) is introduced into the polymer segment $P_1$ to synthesize a polymer segment (14) having a nitro group-containing arylene group, a step 8, in which the polymer segment (14) having a nitro group-containing arylene group is reduced to synthesize a polymer segment (15) having an amino group-containing arylene group, and a step 9, in which the polymer segment (15) having an amino group-containing arylene group and a barbituric acid analogue (7) are subjected to diazo coupling.

First, an explanation is provided of step 7. In step 7, the polymer segment (14) having a nitro group-containing arylene group can be synthesized using the same method as step 2 of the above-mentioned method (i). For example, the polymer segment (14), in which the linking group has a carboxylic acid ester bond in the form of a nitro group-containing arylene group, can be synthesized by reacting the polymer segment $P_1$ having a carboxyl group with the nitro-group containing arylene group (14) in which $Q_6$ is a substituent having a hydroxyl group. In addition, the polymer segment (14), in which the linking group has a sulfonic acid ester bond in the form of a nitro group-containing arylene group, can be synthesized by reacting the polymer segment $P_1$ having a hydroxyl group with the nitro group-containing arylene group (14) in which $Q_6$ is a substituent having sulfonic acid. Moreover, the polymer segment (14), in which the linking group has a carboxylic acid amide bond in the form of a nitro group-containing arylene group, can be synthesized by using the polymer segment $P_1$ having a carboxyl group and the nitro group-containing arylene group (14) in which $Q_6$ is a substituent having an amino group.

Numerous types of the nitro group-containing arylene group represented by the above-mentioned formula (13) are sold commercially and are readily available. In addition, it can be easily synthesized according to a known method.

Next, an explanation is provided of step 8. A known method can be used in step 8. An example of a method that uses a metal compound and the like is described in "Experimental Chemistry", Maruzen Co., Ltd., 2nd edition, Vol. 17-2, pp. 162-179, and an example of a catalytic hydrogenation method is described in "New Experimental Chemistry", Maruzen Co., Ltd., 1st edition, Vol. 15, pp. 390 to 448 or in WO 2009/060886.

Although the present step can be carried out in the absence of solvent, it is preferably carried out in the presence of a solvent to prevent excessively rapid progression of the reaction. There are no particular limitations on the solvent provided it does not inhibit the reaction, and examples of solvents include alcohols such as methanol, ethanol or propanol, esters such as methyl acetate, ethyl acetate or propyl acetate, ethers such as diethyl ether, tetrahydrofuran or dioxane, hydrocarbons such as benzene, toluene, xylene, hexane or heptane, and amides such as N,N-dimethylformamide, N-methylpyrrolidone or N,N-dimethylimidazolidinone.

In addition, two or more types of the above-mentioned solvents may be used as a mixture and the mixing ratio when using a mixture can be arbitrarily determined. The amount of the above-mentioned solvent used can also be determined arbitrarily corresponding to the solubility of the substrate. It is preferably within the range of 1.0 times by mass to 20 times by mass of the compound represented by the above-mentioned nitro group-containing arylene group (14) from the viewpoint of the reaction rate.

The present step is normally carried out within a temperature range of 0° C. to 250° C. and is normally completed within 24 hours.

The following provides an explanation of step 9. In step 9, a compound having an azo skeleton structure can be synthesized by applying the same method as step 1 of the above-mentioned method (i).

Ordinary methods for isolating and purifying organic compounds can be used for the compounds having the above-mentioned azo skeleton structure obtained in each step and the compounds represented by the above-mentioned formulas (8), (10), (12), (14) and (15). Examples of isolation and purification methods include recrystallization or re-precipitation using an organic solvent and column chromatography using silica gel and the like. The compounds can be obtained at high purity by carrying out purification using these methods alone or by combining two or more thereof.

The compounds represented by the above-mentioned formulas (8), (10) and (12) obtained in the above-mentioned steps can be identified and quantified by nuclear magnetic resonance spectroscopic analysis (ECA-400, JEOL Ltd.), ESI-TOF MS (LC/MSDTOF, Agilent Technologies Inc.) and HPLC analysis (LC-20A, Shimadzu Corp.).

The compound having the above-mentioned azo skeleton structure obtained in the above-mentioned steps and the compounds represented by formulas (14) and (15) can be identified and quantified by high-performance GPC (HLC8820GPC, Tosoh Corp.), nuclear magnetic resonance spectroscopic analysis (FT-NMR, Avance-600, Bruker Biospin GmbH), and measurement of acid value based on JIS K-0070 (COM-2500 Automatic Titrator, Hiranuma Sangyo Co., Ltd.).

Next, an explanation is provided of the pigment dispersing agent and pigment composition of the present invention. Since the compound having an azo skeleton structure of the present invention demonstrates high affinity with various types of pigments and high affinity for non-water-soluble solvents, one type alone or two or more types can be combined for use as a pigment dispersing agent.

The pigment dispersing agent of the present invention is only required to contain the compound having an azo skeleton structure of the present invention. The pigment composition of the present invention is used in paint, ink, toner and resin moldings and the like, and is characterized by containing pigment and at least one type of the compound having an azo skeleton structure of the present invention as a pigment dispersing agent.

A yellow pigment can be used for the yellow pigment contained in the pigment composition of the present invention by suitably selecting from among, for example, yellow pigments described in the "Organic Pigments Handbook", 2006 edition (editor/publisher: Isao Hashimoto) (such as monoazo-based pigments, bisazo-based pigments, polyazo-based pigments, isoindoline-based pigments, condensed azo-based pigments, azomethine-based pigments, anthraquinone-based pigments or quinoxaline-based pigments). Among these, monoazo-based pigments, bisazo-based pigments, polyazo-based pigments and isoindoline-based pigments can be used preferably.

Among these, acetoacetanilide-based pigments represented by C.I. Pigment Yellow 74, C.I. Pigment Yellow 83, C.I. Pigment Yellow 93, C.I. Pigment Yellow 128, C.I. Pigment Yellow 155, C.I. Pigment Yellow 175 and C.I. and Pigment Yellow 180 and the like, and isoindoline-based pigments represented by C.I. Pigment Yellow 139 and C.I. Pigment Yellow 185 are preferable due to their high affinity with the compound having an azo skeleton structure of the present invention. In particular, C.I. Pigment Yellow 155, C.I. Pigment Yellow 180 or C.I. Pigment Yellow 185 is more preferable due to the high dispersion effect attributable to the compound having an azo skeleton structure of the present invention.

The above-mentioned yellow pigments may be used alone or two or more types may be used as a mixture.

Known yellow colorants other than the above-mentioned yellow pigments can be used in combination with the yellow colorant contained in the pigment composition of the present invention provided they do not inhibit pigment dispersibility.

Examples of colorants that can be used in combination include compounds typically represented by condensed azo compounds, isoindolinone compounds, anthraquinone compounds, azo metal complexes, methine compounds, quinophthalone compounds and allylamide compounds.

For example, one or more types can be selected from C.I. Pigment Yellow 12, 13, 14, 15, 17, 62, 94, 95, 97, 109, 110, 111, 120, 127, 129, 139, 147, 151, 154, 168, 174, 176, 181, 191, 194, 213 and 214, C.I. Vat Yellow 1, 3 and 20, mineral fast yellow, navel yellow, naphthol yellow S, hansa yellow G, permanent yellow NCG, and C.I. Solvent Yellow 9, 17, 24, 31, 35, 58, 93, 100, 102, 103, 105, 112, 162, 163 and the like.

A magenta pigment can be used for the magenta pigment contained in the pigment composition of the present invention by suitably selecting from among, for example, magenta pigments described in the "Organic Pigments Handbook", 2006 edition (editor/publisher: Isao Hashimoto) (such as quinacridone-based pigments, monoazonaphthol-based pigments, disazonaphthol-based pigments, perylene-based pigments, thioindigo-based pigments, diketopyrrolopyrrole-based pigments, naphthol AS-based pigments or BONA lake-based pigments). Among these, one or more types selected from quinacridone-based pigments, diketopyrrolopyrrole-based pigments, naphthol AS-based pigments and BONA lake-based pigments can be used preferably.

Among these, quinacridone-based pigments represented by the following formula (16), diketopyrrolopyrrole-based pigments represented by the following formula (17) and naphthol AS-based and BONA lake-based pigments represented by the following formula (18) used in the pigment composition of the present invention are preferable due to their high affinity with the compound having an azo skeleton structure of the present invention.

[Chemical Formula 12]

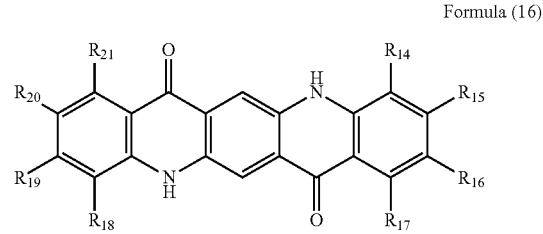

Formula (16)

(In formula (16), $R_{14}$ to $R_{21}$ each independently represent a hydrogen atom, chlorine atom or methyl group.)

[Chemical Formula 13]

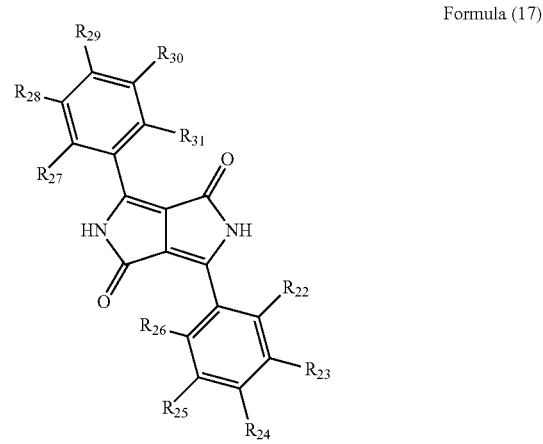

Formula (17)

(In formula (17), $R_{22}$ to $R_{31}$ each independently represent a hydrogen atom, chlorine atom, t-butyl group, cyano group or phenyl group.)

[Chemical Formula 14]

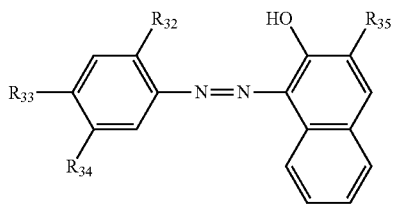

Formula (18)

(In formula (18), $R_{32}$ to $R_{34}$ each independently represent a hydrogen atom, methoxy group, methyl group, nitro group, chlorine atom, N,N-diethylaminosulfonyl group, sulfonic acid group or salt thereof or $CONHR_{36}$ group, $R_{35}$ represents an amino group, carboxylic acid group or salt thereof or $CONHR_{37}$ group, and $R_{36}$ and $R_{37}$ each independently represent a hydrogen atom or phenyl group.)

Examples of quinacridone-based pigments represented by the above-mentioned formula (16) include C.I. Pigment Red 202, 122, 192 and 209.

Although $R_{14}$ to $R_{21}$ in the above-mentioned formula (16) can be arbitrarily selected from the previously listed substituents, the case in which $R_{14}$, $R_{15}$, $R_{17}$ to $R_{19}$ and $R_{21}$ are hydrogen atoms and $R_{16}$ and $R_{20}$ are hydrogen atoms, chlorine atoms or methyl groups is preferable from the viewpoint of affinity with the compound having an azo skeleton structure of the present invention.

Examples of diketopyrrolopyrrole-based pigments represented by the above-mentioned formula (17) include C.I. Pigment Red 255, 254 and 264.

Although $R_{22}$ to $R_{31}$ in the above-mentioned formula (17) can be arbitrarily selected from the previously listed substituents, the case in which $R_{22}$, $R_{23}$, $R_{25}$ to $R_{28}$, $R_{30}$ and $R_{31}$ are hydrogen atoms and $R_{24}$ and $R_{29}$ are hydrogen atoms or phenyl groups is preferable from the viewpoint of affinity with the compound having an azo skeleton structure of the present invention.

Examples of naphthol AS-based pigments represented by the above-mentioned formula (18) include C.I. Pigment Red 2, 3, 5, 6, 7, 23, 150, 146, 184 and 269.

Examples of BONA lake-based pigments represented by the above-mentioned formula (18) include C.I. Pigment Red 48:2, 48:3, 48:4 and 57:1.

Although $R_{32}$ to $R_{37}$ in the above-mentioned formula (18) can be arbitrarily selected from the previously listed substituents, the case in which at least one of $R_{32}$ to $R_{34}$ is a $CONHR_{36}$ group and $R_{35}$ is a $CONHR_{37}$ group is preferable. Moreover, the case in which $R_{37}$ is a hydrogen atom is preferable from the viewpoint of affinity with the compound having an azo skeleton structure of the present invention.

In the present invention, quinacridone-based pigments such as C.I. Pigment Red 122 or 202, diketopyrrolopyrrole-based pigments such as C.I. Pigment Red 255 or 264, and naphthol AS-based pigments such as C.I. Pigment Red 150 in particular are more preferable from the viewpoint of affinity with the compound having an azo skeleton structure of the present invention.

One type of the above-mentioned magenta pigments may be used alone or two more types may be used as a mixture.

Known magenta colorants other than the above-mentioned magenta pigments can be used in combination with the magenta colorant contained in the pigment composition of the present invention provided they do not inhibit pigment dispersibility.

Examples of magenta colorants that can be used in combination include condensed azo compounds, anthraquinone compounds, basic dye lake compounds, benzimidazolone compounds, thioindigo compounds and perylene compounds. Examples thereof include one or more types selected from C.I. Pigment Red 81:1, 144, 166, 169, 177, 185, 220, 221 and 238.

Phthalocyanine pigments represented by the following formula (19) can be preferably used for the cyan colorant contained in the pigment composition of the present invention.

[Chemical Formula 15]

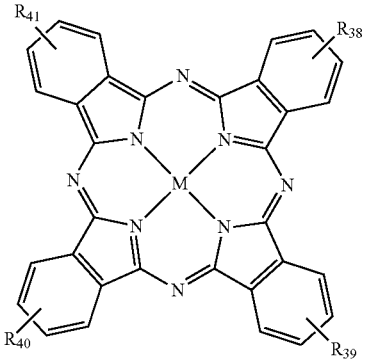

Formula (19)

(In formula (19), $R_{38}$ to $R_{41}$ each independently represent a hydrogen atom, alkyl group, sulfonic acid group or salt thereof and M represents a metal or hydrogen atom.)

Examples of phthalocyanine pigments represented by the above-mentioned formula (19) include C.I. Pigment Blue 15, 15:1, 15:2, 15:3, 15:4, 15:5, 15:6, 16, 17, 17:1, 68, 70, 75, 76 and 79.

In the present invention, C.I. Pigment Blue 15, 15:1, 15:2, 15:3, 15:4, 15:5 and 15:6 in particular are more preferable due to the high dispersion effect attributable to the compound having an azo skeleton structure of the present invention.

One type of the above-mentioned phthalocyanine pigments may be used alone or two or more types may be used as a mixture.

Known cyan colorants other than the above-mentioned phthalocyanine pigments can be used in combination for the cyan colorant contained in the pigment composition of the present invention provided they do not inhibit pigment dispersibility.

Examples of cyan colorants able to be used in combination include one or more types selected from C.I. Pigment Blue 1, 1:2, 1:3, 2, 2:1, 2:2, 3, 4, 5, 6, 7, 8, 9, 9:1, 10, 10:1, 11, 12, 13, 14, 18, 19, 20, 21, 22, 23, 24, 24:1, 25, 26, 27, 28, 29, 30, 31, 32, 33, 34, 35, 36, 36:1, 52, 53, 56, 56:1, 57, 58, 59, 60, 61, 61:1, 62, 63, 64, 65, 66, 67, 69, 71, 72, 73, 74, 77, 78, 80, 81, 82, 83 and 84.

In addition, a colorant other than a cyan colorant can be used to create the proper color tone. For example, the use of C.I. Pigment Green 7 mixed into C.I. Pigment Blue 15:3 makes it possible to improve the color purity of cyan.

Carbon black can be preferably used for the black colorant of the present invention.

Although there are no particular limitations on the carbon black used in the present invention, carbon black obtained according to a production method such as a thermal method, acetylene method, channel method, furnace method or lamp black method can be used.

Although there are no particular limitations on the average primary particle diameter of the carbon black used in the present invention, the average primary particle diameter is preferably 14 nm to 80 nm and more preferably 25 nm to 50 nm. By making the average primary particle diameter to be larger than 14 mm, color tone is less likely to demonstrate a reddish tint making it suitable for use as black pigment. On the other hand, in the case the average primary particle diameter of the carbon black is smaller than 80 nm, tinting strength of printed images becomes favorable in the case of using the pigment composition as a colorant.

Furthermore, average primary particle diameter of the carbon black can be measured by capturing an enlarged photograph thereof with a scanning electron microscope.

Although there are no particular limitations on DBP absorption of the carbon black used in the present invention, it is preferably 30 mL/100 g to 200 mL/100 g and more preferably 40 mL/100 g to 150 mL/100 g. In the case the DBP absorption of the carbon black is 30 mL/100 g or more, the carbon black disperses favorably and tinting strength of printed images is favorable. On the other hand, in the case DBP absorption of the carbon black is 200 mL/100 g or less, a carbon black dispersion can be produced with a suitable amount of dispersion medium when producing a carbon black dispersion, thereby making this preferable.

Furthermore, DBP absorption of carbon black is the amount of dibutyl phthalate (DBP) absorbed by 100 g of carbon black, and can be measured in compliance with JIS K6217.

There are no particular limitations on the pH of the carbon black used in the present invention provided it does not inhibit the effects of the above-mentioned compound having an azo skeleton structure.

Furthermore, the pH of carbon black can be determined by measuring a mixed liquid of carbon black and distilled water with a pH electrode.

Although there are no particular limitations on the specific surface area of the carbon black used in the present invention, it is preferably 300 m$^2$/g or less and more preferably 100 m$^2$/g or less. On the other hand, although there are no particular limitations on the lower limit thereof, it is normally 30 m$^2$/g or more. By making the specific surface area of the carbon black to be 300 m$^2$/g or less, dispersibility of the carbon black by the above-mentioned compound having an azo skeleton structure is favorable.

Furthermore, specific surface area of carbon black refers to the BET specific surface area, and can be measured in compliance with JIS K4652.

One type of the above-mentioned carbon black may be used alone or two or more types may be used as a mixture.

Known black colorants other than the above-mentioned carbon black can be used in combination with the black colorant used in the present invention provided they do not inhibit pigment dispersibility of the carbon black.

Examples of black colorants that can be used in combination include one or more types selected from C.I. Pigment Black 1, 10 and 31, C.I. Natural Black 1, 2, 3, 4, 5 and 6, and activated carbon.

Moreover, a known magenta colorant, cyan colorant or yellow colorant can be used in combination for the black pigment contained in the pigment composition of the present invention for the purpose of color matching.

Furthermore, a pigment other than yellow pigment, magenta pigment, cyan pigment or carbon black as described above can also be preferably used as pigment able to be used in the present invention provided it has affinity with the pigment dispersing agent of the present invention, and there are no limitations thereon.

These may be crude pigments or prepared pigment compositions provided they do not significantly inhibit the effects of the above-mentioned compound having an azo skeleton structure.

The case in which the composite mass ratio of the pigment and compound having an azo skeleton structure in the pigment composition of the present invention is within the range of 100:0.1 to 100:100 is preferable. Moreover, in the case of using yellow pigment, magenta pigment, cyan pigment and carbon black having a specific surface area of 300 m$^2$/g or less, the case in which the composite mass ratio is within the range of 100:0.5 to 100:20 is more preferable.

The pigment composition can be produced by a wet method or dry method. Since the azo compound of the present invention has high affinity with non-water-soluble solvents, it is preferably produced by a wet method that allows a homogeneous pigment composition to be easily produced. For example, the pigment composition is obtained in the manner described below.

A pigment dispersing agent and a resin as necessary are dissolved in a dispersion medium followed by gradually adding a pigment powder while stirring and adequately mixing into the dispersion medium. Moreover, the pigment dispersing agent is adsorbed onto the pigment particle surfaces by applying mechanical shear force with a disperser such as a kneader, roll mill, ball mill, paint shaker, dissolver, attritor, sand mill or high-speed mill, and the pigment is stably and finely dispersed in the form of uniform fine particles.

An assistant may be further added to the pigment composition of the present invention at the time of production. Examples thereof include a surfactant, dispersing agent, filler, standardizer, resin, wax, antifoaming agent, antistatic agent, dust reducing agent, thickener, shading colorant, preservative, drying inhibitor, rheological control additive, wetting agent, antioxidant, UV absorber, photostabilizer and combinations thereof. In addition, the pigment dispersing agent of the present invention may also be added in advance during production of crude pigment.

Next, an explanation is provided of the pigment dispersion of the present invention.

The pigment dispersion of the present invention is composed of the above-mentioned pigment composition and a non-water-soluble solvent. The above-mentioned pigment composition may be dispersed in the non-water-soluble solvent or each constituent of the above-mentioned pigment composition may be dispersed in the non-water-soluble solvent. For example, the pigment dispersion is obtained in the following manner. A pigment dispersing agent and a resin are dissolved as necessary in a dispersion medium followed by gradually adding a pigment or pigment composition powder while stirring and adequately mixing into the dispersion medium. Moreover, the pigment can be stably dispersed in the form of uniform fine particles by applying mechanical shear force with a disperser such as a ball mill, paint shaker, dissolver, attritor, sand mill or high-speed mill.

The non-water-soluble solvent able to be used in the pigment dispersion of the present invention is determined corresponding to the target application of the dispersion, and there are no particular limitations thereon. Examples of non-water-soluble solvents include esters such as methyl acetate, ethyl acetate or propyl acetate, hydrocarbons such as hexane, octane, petroleum ether, cyclohexane, benzene, toluene or xylene, and halogenated hydrocarbons such as carbon tetrachloride, trichloroethylene or tetrabromoethane.

The non-water-soluble solvent able to be used in the pigment dispersion of the present invention may also be a polymerizable monomer. Examples thereof include styrene, α-methylstyrene, α-ethylstyrene, o-methylstyrene, m-methylstyrene, p-methylstyrene, p-methoxysytrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinyl naphthalene, acrylonitrile, methacrylonitrile and acrylamide.

The resin able to be dissolved in the dispersion medium is determined corresponding to the target application of the pigment composition, and there are no particular limitations thereon. Examples thereof include polystyrene resin, styrene copolymer, polyacrylic acid resin, polymethacrylic acid resin, polyacrylic acid ester resin, polymethacrylic acid ester resin, acrylic acid ester copolymer, methacrylic acid ester copolymer, polyester resin, polyvinyl ether resin, polyvinyl alcohol resin, polyvinyl butyral resin, polyurethane resin and polypeptide resin. In addition, two or more of these resins can be used as a mixture.

The pigment composition of the present invention is preferable as colorant of a toner containing toner particles including a binder resin and colorant. Since the use of the pigment composition of the present invention makes it possible to favorably maintain the dispersibility of pigment in the toner particles, a toner having high tinting strength is provided.

The following provides an explanation of the toner of the present invention.

Examples of the binder resin of the toner of the present invention include commonly used styrene-methacrylic acid copolymer, styrene-acrylic acid copolymer, polyester resin, epoxy resin and styrene-butadiene copolymer. Monomers for forming these binder resins are used in methods in which toner particles are obtained directly by a polymerization method.

Examples of monomers include styrene-based monomers such as styrene, α-methylstyrene, α-ethylstyrene, o-methylstyrene, m-methylstyrene, p-methylstyrene, o-ethylstyrene, m-ethylstyrene or p-ethylstyrene, methacrylate-based monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile or methacrylic acid amide, acrylate-based monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile or acrylic acid amide, and olefin-based monomers such as butadiene, isoprene or cyclohexene.

These are used alone or as a suitable mixture of monomers such that the mixture demonstrates a theoretical glass transition temperature (Tg) within the range of 40° C. to 75° C. (see J. Brandrup and E. H. Immergut, ed., "Polymer Handbook" (USA), 3rd edition, John Wiley & Sons, 1989, pp. 209-277). In the case the theoretical glass transition temperature is lower than 40° C., there may be increased susceptibility to problems in terms of toner storage stability and durability test stability, while in the case the theoretical glass transition temperature exceeds 75° C., transparency tends to decrease in the case the toner is used to form full-color images.

The combined use of a polar resin such as a polyester resin or polycarbonate resin with a nonpolar resin such as polystyrene for the binder resin in the toner of the present invention makes it possible to control the distribution of colorant, charge control agent and wax or other additive in the toner. For example, in the case of producing toner particles directly by a suspension polymerization method and the like, the polar resin is added during the polymerization reaction from the dispersion step to the polymerization step. The polar resin is added corresponding to the balance of polarity between the polymerizable monomer composition serving as toner particles and the aqueous medium. As a result, resin concentration can be controlled so as to continuously change moving from the surface towards the center of the toner particles, such as the polar resin forming a thin layer on the surface of the toner particles. At this time, the use of a polar resin that interacts with the above-mentioned compound having an azo skeleton structure, the colorant and the charge control agent makes it possible to realize a state in which the colorant is present in the toner particles in a desirable state.

Moreover, in the present invention, a crosslinking agent can be used when synthesizing the binder resin in order to enhance the mechanical strength of the toner particles as well as control the molecular weight of the above-mentioned particle constituent molecules.

Examples of bifunctional crosslinking agents used in the toner particles of the present invention include divinyl benzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, respective diacrylates of polyethylene glycol #200, #400 and #600, dipropylene glycol diacrylate, polypropylene glycol diacrylate, polyester-type diacrylates, and those in which the diacrylate has been substituted with dimethacrylate.

Examples of polyfunctional crosslinking agents include pentaerythritol triacrylate, trimethylolethane triacrylate, trimethylolpropane triacrylate, tetramethylolmethane tetraacrylate, oligoester acrylate and methacrylates thereof, 2,2-bis(4-methacryloxyphenyl)propane, diallyl phthalate, triallyl cyanurate, triallyl isocyanurate and triallyl trimellitate.

These crosslinking agents are used within a range of preferably 0.05 parts by mass to 10 parts by mass and more preferably 0.1 parts by mass to 5 parts by mass based on 100 parts by mass of the above-mentioned monomer from the viewpoint of toner fixing performance and offset resistance.

Moreover, in the present invention, a wax component can also be used when synthesizing the binder resin to prevent adhesion to a fixing member.

Examples of wax components able to be used in the present invention include petroleum-based waxes such as paraffin wax, microcrystalline wax or petrolactam and derivatives thereof, montan wax and derivatives thereof, hydrocarbon wax obtained according to the Fischer-Tropsch method and derivatives thereof, polyolefin wax as exemplified by polyethylene and derivatives thereof, and natural waxes such as carnauba wax or candelilla wax and derivatives thereof. The derivatives thereof include oxides, block copolymers with vinyl monomers and graft modification products. In addition, other examples of waxes include alcohols such as higher aliphatic alcohols, fatty acids such as stearic acid or palmitic acid, fatty acid amides, fatty acid esters, hydrogenated castor oil and derivatives thereof, plant waxes and animal waxes. These can be used alone or in combination.

The amount of the above-mentioned wax component added is such that the content thereof is preferably within the range of 2.5 parts by mass to 15.0 parts by mass and more preferably within the range of 3.0 parts by mass to 10.0 parts by mass based on 100 parts by mass of the binder resin. An added amount of 2.5 parts by mass or more facilitates oilless fixing. On the other hand, if the added amount is 15.0 parts by mass or less, the amount of wax component in the toner particles is suitable and desired charging characteristics are easily obtained.

In the toner of the present invention, the toner can also be used after mixing in a charge control agent as necessary. The addition thereof makes it possible to control the toner to the optimum triboelectric charge quantity corresponding to the developing system.

A known agent can be used for the charge control agent, and a charge control agent having a rapid charging speed that is able to stably maintain a constant charge quantity is particularly preferable. Moreover, in the case of producing toner particles directly by polymerization, a charge control agent that exhibits little inhibition of polymerization and is substantially free of substances that are soluble in an aqueous dispersion medium is particularly preferable.

Examples of charge control agents that control the toner to a negative charge include polymers or copolymers having a sulfonic acid group, sulfonate group or sulfonic acid ester group, salicylic acid derivatives and metal complexes thereof, monoazo metal compounds, acetylacetone metal compounds, aromatic oxycarboxylic acids, aromatic mono- and polycarboxylic acids and metal salts, anhydrides and esters thereof, phenol derivatives such as bisphenol, urea derivatives, metal-containing naphthoic acid-based compounds, boron compounds, quaternary ammonium salts, calixarene and resin-based charge control agents.

In addition, examples of charge control agents that control the toner to a positive charge include nigrosine-modified products obtained from nigrosine and a fatty acid metal salt and the like, guanidine compounds, imidazole compounds, quaternary ammonium salts such as tributylbenzylammonium-1-hydroxy-4-naphthosulfonate or tetrabutylammonium tetrafluoroborate, analogues thereof in the form of onium salts such as phosphonium salts and lake pigments thereof, triphenylmethane dyes and lake pigments thereof (wherein examples of lake pigments include phosphotungstic acid, phosphomolybdic acid, phosphotungstomolybdic acid, tannic acid, lauric acid, gallic acid, ferricyanide and ferrocyanide), metal salts of higher fatty acids, diorganotin oxides such as dibutyltin oxide, dioctyltin oxide or dicyclohexyltin oxide, diorganotin borates such as dibutyltin borate, dioctyltin borate or dicyclohexyltin borate, and resin-based charge control agents. One type of these can be used alone or two or more types can be used in combination.

An inorganic fine powder may also be added to the toner particles of the toner of the present invention as a fluidizing agent. Examples of inorganic fine powders that can be used include fine powders of silica, titanium oxide, alumina or complex oxides thereof and surface-treated products thereof.

Examples of methods used to produce the toner particles that compose the toner of the present include conventionally used methods such as a pulverization method, suspension polymerization method, suspension granulation method or emulsion polymerization method. Among these methods, the toner particles are particularly preferably obtained by a production method such as suspension polymerization or suspension granulation, in which the toner particles are granulated in an aqueous medium, from the viewpoints of environmental burden during production and particle diameter controllability.

Toner particles of the present invention produced by suspension polymerization are produced, for example, in the manner described below. First, a colorant containing the pigment composition of the present invention, a polymerizable monomer, a wax component and a polymerization initiator and the like are mixed to prepare a polymerizable monomer composition. Next, the polymerizable monomer composition is dispersed in an aqueous medium followed by granulation of particles of the polymerizable monomer composition. The polymerizable monomer present in the particles of the polymerizable monomer composition is then polymerized in an aqueous medium to obtain toner particles.

The polymerizable monomer composition in the above-mentioned step is preferably prepared by mixing a liquid dispersion, obtained by dispersing the above-mentioned colorant in a first polymerizable monomer, with a second polymerizable monomer. Namely, after having completely dispersed the above-mentioned pigment composition in the first polymerizable monomer, mixing with the second polymerizable monomer together with other toner materials makes it possible for the pigment to be present in the toner particles in a more favorably dispersed state.

A known polymerization initiator can be used for the polymerization initiator used in the above-mentioned suspension polymerization method, and examples thereof include azo compounds, organic peroxides, inorganic peroxides, organometallic compounds and photopolymerization initiators. Specific examples include azo-based polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile) or dimethyl-2,2'-azobis(isobutyrate), organic peroxide-based polymerization initiators such as benzoyl peroxide, di-tert-butyl peroxide, tert-butyl peroxyisopropylmonocarbonate, tert-hexyl peroxybenzoate or tert-butyl peroxybenzoate, inorganic peroxide-based polymerization initiators such as potassium persulfate or ammonium persulfate, and ferrous hydrogen peroxide-based, BPO-dimethylaniline-based and cerium (IV) salt-alcohol-based initiators. Examples of photopolymerization initiators include acetophenones, benzoin ethers and ketals. One type of these can be used alone or two or more types can be used in combination.

The concentration of the above-mentioned polymerization initiator is preferably 0.1 parts by mass to 20 parts by mass and more preferably 0.1 parts by mass to 10 parts by mass based on 100 parts by mass of polymerizable monomer. Although varying slightly according to the polymerization method, one type of the above-mentioned polymerization initiator is used alone or two or more types are used as a mixture with reference to the 10-hour half-life temperature.

The aqueous medium used in the above-mentioned suspension polymerization method preferably contains a dispersion stabilizer. A known inorganic or organic dispersion stabilizer can be used for the dispersion stabilizer.

Examples of inorganic dispersion stabilizers include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica and alumina.

Examples of organic dispersion stabilizers include polyvinyl alcohol, gelatin, methyl cellulose, methyl hydroxypropyl cellulose, ethyl cellulose, carboxymethyl cellulose sodium salt and starch. In addition, nonionic, anionic and cationic surfactants can also be used. Examples thereof include sodium dodecyl sulfate, sodium tetradecyl sulfate, sodium pentadecyl sulfate, sodium octyl sulfate, sodium oleate, sodium laurate, potassium stearate and potassium oleate.

Among the above-mentioned dispersion stabilizers, a water-insoluble inorganic dispersion stabilizer that is soluble in acid is preferably used in the present invention. In addition, in the case of preparing an aqueous dispersion medium using a water-insoluble inorganic dispersion stabilizer in the present invention, the use of these dispersion stabilizers at a ratio within the range of 0.2 parts by mass to 2.0 parts by mass with respect to 100 parts by mass of polymerizable monomer is preferable from the viewpoint of drop stability in the aqueous medium of the polymerizable monomer composition. In addition, in the present invention, the aqueous medium is preferably prepared using water within a range of 300 parts by mass to 3,000 parts by mass based on 100 parts by mass of the polymerizable monomer composition.

In the present invention, in the case of preparing an aqueous medium with the above-mentioned water-insoluble inorganic dispersion stabilizer dispersed therein, although a commercially available dispersion stabilizer can be used by directly dispersing therein, in order to obtain a dispersion stabilizer particles having a fine, uniform particle diameter, the aqueous medium is preferably prepared by forming the above-mentioned water-insoluble inorganic dispersion stabilizer while stirring at high speed in water. For example, in the case of using calcium phosphate as a dispersion stabilizer, an aqueous sodium phosphate solution and an aqueous calcium chloride solution are mixed while stirring at high speed to form fine particles of calcium phosphate, thereby allowing the obtaining of a preferable dispersion stabilizer.

Preferable toner particles can also be obtained for the toner particles of the present invention in the case of producing according to the suspension granulation method. Since the production process of the suspension granulation method does not require a heating step, compatibilization between resin and wax that occurs in the case of using a low melting point wax can be suppressed and a decrease in the glass transition temperature of the toner caused by compatibilization can be prevented. In addition, since the suspension granulation method allows a wide selection range of toner materials capable of serving as the binder resin, it is easier to use a binder resin composed mainly of polyester resin, which is typically considered to be advantageous for fixing performance. Consequently, this production method is advantageous in the case of producing toner having a resin composition to which the suspension polymerization method cannot be applied.

Toner particles produced according to the above-mentioned suspension granulation method are produced, for example, in the manner described below. First, a colorant containing the pigment composition of the present invention, a binder resin and a wax component and the like are mixed in a solvent to prepare a solvent composition. Next, the solvent composition is dispersed in an aqueous medium followed by granulating the particles of the resin composition to obtain a toner particle suspension. Toner particles can then be obtained by removing the solvent by heating or reducing the pressure of the resulting suspension.

The solvent composition in the above-mentioned step is preferably prepared by mixing a liquid dispersion, obtained by dispersing the above-mentioned colorant in a first solvent, with a second solvent. Namely, after having more adequately dispersed the above-mentioned colorant in the first solvent, mixing with the second solvent together with other toner materials makes it possible for the pigment to be present in the toner particles in a favorably dispersed state.

Examples of solvents that can be used in the above-mentioned suspension granulation method include hydrocarbons such as toluene, xylene or hexane, halocarbons such as methylene chloride, chloroform, dichloroethane, trichloroethane or carbon tetrachloride, alcohols such as methanol, ethanol, butanol or isopropyl alcohol, polyvalent alcohols such as ethylene glycol, propylene glycol, diethylene glycol or triethylene glycol, cellosolves such as methyl cellosolve or ethyl cellosolve, ketones such as acetone, methyl ethyl ketone or methyl isobutyl ketone, ethers such as benzyl alcohol ethyl ether, benzyl alcohol isopropyl ether or tetrahydrofuran, and esters such as methyl acetate, ethyl acetate or butyl acetate. One type of these can be used alone or two or more types can be used as a mixture. Among these, a solvent that has a low boiling point and is able to adequately dissolve the above-mentioned binder resin is used preferably to facilitate removal of solvent in the above-mentioned toner particle suspension.

The amount of the above-mentioned solvent used is preferably 50 parts by mass to 5,000 parts by mass and more preferably 120 parts by mass to 1,000 parts by mass based on 100 parts by mass of the binder resin.

The aqueous medium used in the above-mentioned suspension granulation method preferably contains a dispersion stabilizer. A known inorganic or organic dispersion stabilizer can be used for the dispersion stabilizer.

Examples of inorganic dispersion stabilizers include calcium phosphate, calcium carbonate, aluminum hydroxide, calcium sulfate and barium carbonate. Examples of organic dispersion stabilizers include water-soluble polymers such as polyvinyl alcohol, methyl cellulose, hydroxyl ethyl cellulose, ethyl cellulose, carboxymethyl cellulose sodium salt, sodium polyacrylate or sodium polymethacrylate, anionic surfactants such as sodium dodecyl benzene sulfonate, sodium octadecyl sulfonate, sodium oleate, sodium laurate or potassium stearate, cationic surfactants such as lauryl amine acetate, stearyl amine acetate or lauryl trimethyl ammonium chloride, amphoteric surfactants such as lauryl dimethyl amine oxide, and nonionic surfactants such as polyoxyethylene alkyl ethers, polyoxyethylene alkyl phenyl ethers or polyoxyethylene alkyl amines.

The amount of the above-mentioned dispersing agent used is preferably 0.01 parts by weight to 20 parts by weight based on 100 parts by weight of the binder resin from the viewpoint of drop stability of the solvent composition in the aqueous medium.

In the present invention, the weight-average particle diameter (to be described as D4) of the toner particles in the present invention is preferably 3.00 μm to 15.0 μm and more preferably 4.00 μm to 12.0 μm. By making D4 to be 3.00 μm or more, charge stabilization is easily achieved when applying to an electrophotographic development system, and the development of toner at unprinted portions of images (fogging) and toner scattering can be suppressed during continuous operation when developing multiple prints (durability test operation). By making D4 to be 15.0 μm or less, half-tone reproducibility is high and unevenness of the surfaces of resulting images can be suppressed.

In addition, the ratio of D4 to the number-average particle diameter (to be described as D1) of the toner particles (described as D4/D1) is preferably 1.35 or less and more preferably 1.30 or less. By making D4/D1 to be 1.35 or less, the occurrence of fogging and decreases in transfer efficiency can be suppressed, thereby facilitating the obtaining of high resolution.

Furthermore, the method used to adjust D4 and D1 of the toner of the present invention differs depending on the method used to produce the toner particles. For example, in the case of the suspension polymerization method, D4 and D1 are adjusted by controlling the concentration of dispersing agent used when preparing the aqueous dispersion medium, the stirring speed during the reaction or the stirring time during the reaction.

The toner of the present invention may be a magnetic toner or anon-magnetic toner. In the case of using as a magnetic toner, the toner particles that compose the toner of the present invention may be used as a mixture of magnetic materials. Examples of such magnetic materials include irons oxides such as magnetite, maghemite or ferrite, iron oxides containing other metal oxides, metals such as Fe, Co or Ni, and alloys of these metals and metals such as Al, Co, Cu, Pb, Mg, Ni, Sn, Zn, Sb, Be, Bi, Cd, Ca, Mn, Se, Ti, W or V, and mixtures thereof. A magnetic material that is particularly preferable for the object of the present invention is fine powder of triiron tetraoxide or γ-diiron trioxide.

The average particle diameter of these magnetic bodies is 0.1 μm to 2 μm (and preferably 0.1 μm to 0.3 μm), and preferable magnetic properties during application of 795.8 kA/m from the viewpoint of toner developability consist of coercive force of 1.6 kA/m to 12 kA/m, saturation magnetization of 5 $Am^2/kg$ to 200 $Am^2/kg$ (and preferably 50 $Am^2/kg$ to 100 $Am^2/kg$) and residual magnetization of 2 $Am^2/kg$ to 20 $Am^2/kg$.

The amount of these magnetic materials added is preferably 10 parts by mass to 200 parts by mass and more preferably 20 parts by mass to 150 parts by mass based on 100 parts by mass of the binder resin.

EXAMPLES

Although the following provides a more detailed explanation of the present invention using examples and comparative examples thereof, the present invention is not limited to the following examples provided the gist thereof is not exceeded. Furthermore, in the following descriptions, the terms "parts" and "%" are based on mass unless specifically indicated otherwise.

The following indicates measurement methods used in the synthesis examples.

(1) Measurement of Molecular Weight

The molecular weights of the above-mentioned polymer segment and compound having an azo skeleton structure are calculated based on polystyrene by size exclusion chromatography (SEC). Measurement of molecular weight by SEC was carried out in the manner indicated below.

A sample was added to the following eluent to a sample concentration of 1.0%, and the solution obtained by allowing to stand undisturbed for 24 hours at room temperature was filtered with a solvent-resistant membrane filter having a pore size of 0.2 μm to obtain a sample solution that was measured under the conditions indicated below.

Apparatus: High-performance GPC system "HLC-8220GPC" (Tosoh Corp.)
Column: LF-804, dual columns
Eluent: THF
Flow rate: 1.0 mL/min
Oven temperature: 40° C.
Sample injection volume: 0.025 mL In addition, in calculating the molecular weight of the sample, a molecular weight calibration curve was used that was prepared from standard polystyrene resins (Tosoh Corp., TSK Standard Polystyrene F-850, F-450, F-288, F-128, F-80, F-40, F-20, F-10, F-4, F-2, F-1, A-5000, A-2500, A-1000 and A-500).

(2) Measurement of Acid Value

The acid values of the above-mentioned polymer segment and compound having an azo skeleton structure were determined according to the method indicated below. The basic procedure is based on JIS K-0070.

1) 0.5 g to 2.0 g of sample is weighed exactly. The mass at this time is designated as M (g).

2) The sample is placed in a 50 mL beaker followed by the addition of 25 mL of a mixed liquid of tetrahydrofuran and ethanol (2/1) and dissolving therein.

3) Titration is carried out with a potentiometric titration measuring apparatus using an ethanol solution having a KOH concentration of 0.1 mol/L (the Model COM-2500 automated titration measuring apparatus manufactured by Hiranuma Sangyo Corp., for example, can be used).

4) The amount of KOH solution used at this time is designated as S (mL). A blank is measured simultaneously and the amount of KOH used at this time is designated as B (mL).

5) Acid value is then calculated according to the following equation. f represents the factor of the KOH solution.

$$\text{Acid value(mg KOH/g)} = \frac{(S-B) \times f \times 5.61}{M} \quad \text{[Equation 1]}$$

(3) Composition Analysis

Determination of the structures of the above-mentioned polymer segment and compound having an azo skeleton structure was carried out using the apparatuses indicated below.

$^1$H-NMR: ECA-400, JEOL Ltd. (solvent: deuterochloroform)

$^{13}$C-NMR: FT-NMR Avance-600, Bruker Biospin GmbH) (solvent:
deuterochloroform)

Furthermore, composition analysis by $^{13}$C-NMR was carried out by reverse gate decoupling using chromium (III) acetyl acetonate for the relaxation reagent.

Example 1

Compounds having an azo skeleton structure were obtained according to the method indicated below.

Production Example of Compound (C-1)

A compound (C-1) having an azo skeleton structure represented by the following formula was produced in accordance with the scheme indicated below.

[Chemical Formula 16]

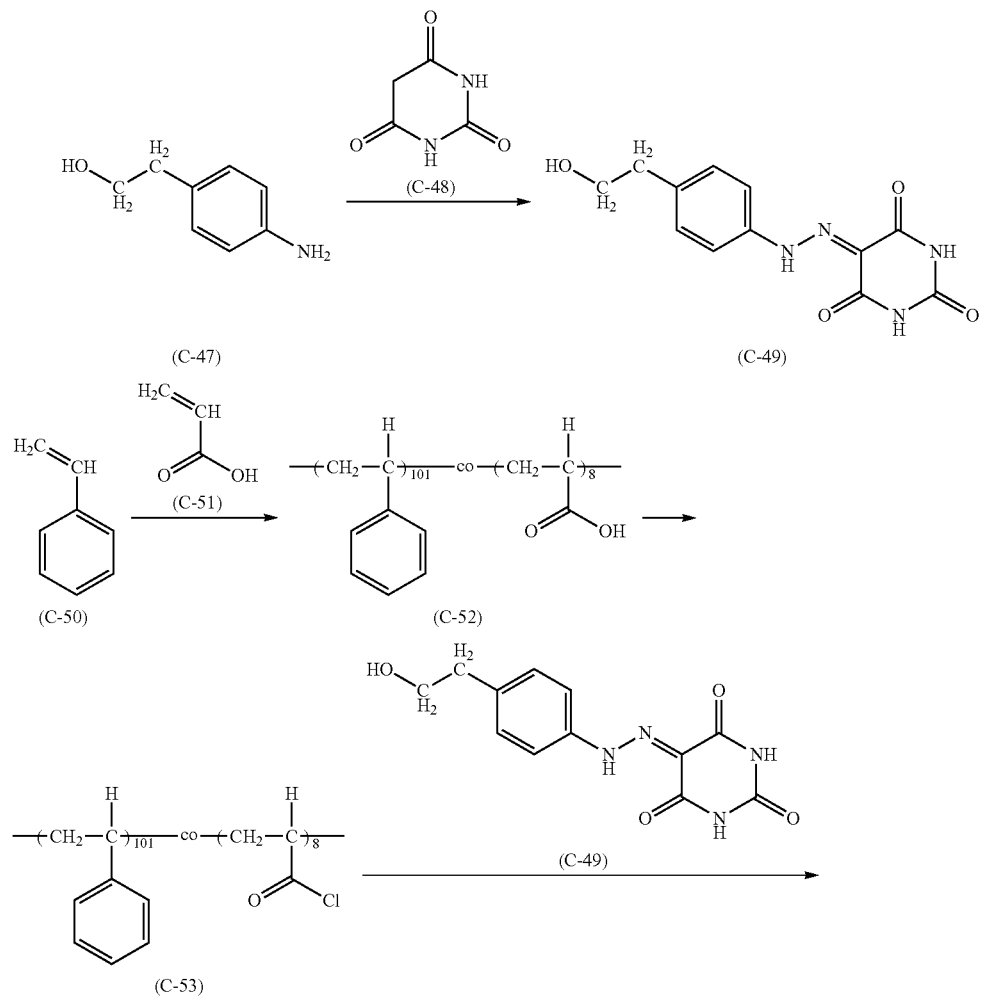

-continued

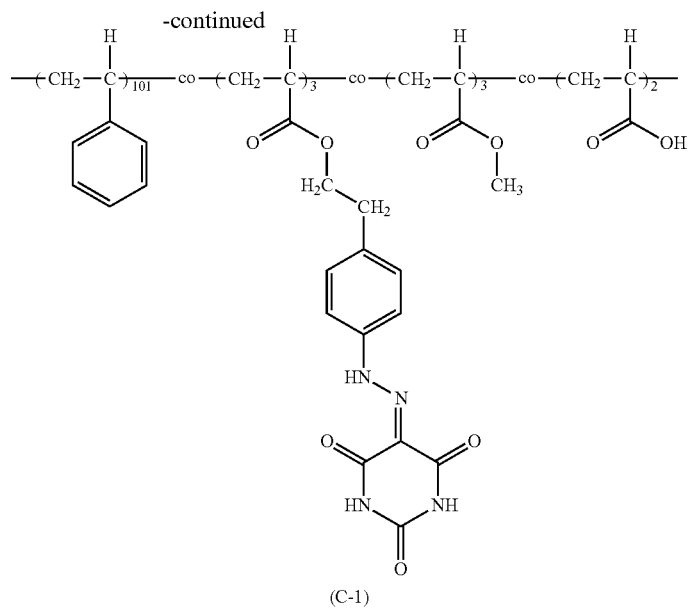

(C-1)

First, 30.0 parts of methanol and 6.07 parts of concentrated hydrochloric acid were added to 2.50 parts of 2-(4-aminophenyl)ethanol (C-47) followed by cooling with ice to 0° C. or lower. A solution obtained by dissolving 1.38 parts of sodium nitrite in 5.53 parts of water was added and allowed to react for 1 hour at the same temperature (diazonium salt solution). A solution obtained by dissolving 8.97 parts of sodium carbonate in 35.9 parts of water and 2.33 parts of barbituric acid (C-48) were added to 30.0 parts of methanol followed by cooling with ice to 10° C. or lower, adding the above-mentioned diazonium salt solution and reacting for 3 hours at 10° C. or lower. Following completion of the reaction, the solid was filtered out and purified by washing with 300 parts of water and methanol to obtain 4.95 parts of compound (C-49) (yield: 98.4%).

Next, 100 parts of propylene glycol monomethyl ether were heated while purging with nitrogen gas followed by refluxing at a liquid temperature of 120° C. or higher and dropping in a mixture of 190 parts of styrene (C-50), 10.0 parts of acrylic acid (C-51) and 1.00 part of tert-butyl peroxybenzoate (organic peroxide-based polymerization initiator, trade name: Perbutyl Z, NOF Corp.) over the course of 3 hours. Following completion of dropping, the solution was stirred for 3 hours followed by distilling at normal pressure while raising the liquid temperature to 170° C. and after the liquid temperature reached 170° C., the solvent was distilled off for 1 hour at a reduced pressure of 1 hPa to obtain a resin solid. The solid was purified by dissolving in tetrahydrofuran and re-precipitating with n-hexane to obtain 185 parts of compound (C-52) (yield: 92.5%).

Moreover, 15 parts of compound (C-52) were dissolved in 222 parts of chloroform followed by dropping in 10 parts of thionyl chloride and stirring for 24 hours. Subsequently, the reaction solution was concentrated followed by removal of chloroform and excess thionyl chloride. The resulting resin solid was recovered to obtain compound (C-53).

Next, 10 parts of compound (C-53) were dissolved in 61 parts of N,N-dimethylacetoamide followed by the addition of 1.6 parts of compound (C-49) and stirring for 7 hours at 65° C. Subsequently, 20 parts of methanol were added followed by stirring for 1 hour at 65° C. After allowing the reaction solution to return to room temperature, the reaction solution was filtered and concentrated. The residue was purified by re-precipitating with 100 parts of methanol to obtain 9.8 parts of compound (C-1) having an azo skeleton structure (yield: 98.0%).

Next, the resulting product was confirmed to have the structure represented by the above-mentioned formula using the various apparatuses previously described. The following indicates the analysis results.

[Analysis Results of Compound (C-1) Having an Azo Skeleton Structure]

[1] Results of Measuring Molecular Weight (GPC)

Weight-average molecular weight (Mw)=24,037, number average molecular weight (Mn)=13,521

[2] Results of Measuring Acid Value 7.0 mg KOH/g

[3] Results of $^{13}$C-NMR (150 MHz, CDCl$_3$, room temperature) (see FIG. 1): δ [ppm]=179.88 (2C), 176.16 (3C), 175.53 (3C), 161.57 (3C), 159.82 (3C), 149.00 (3C), 147.29-142.68 (101C), 138.87 (3C), 137.76 (3C), 131.18-124.04, 117.43, 115.53, 47.05-36.18

The ratios of the number of carbon atoms that compose the copolymer assigned to each peak were quantified according to the results of analyzing the above-mentioned $^{13}$C-NMR data. Calculation of the number of monomer units that compose compound (C-1) having an azo skeleton structure from these measurement results and the above-mentioned number average molecular weight determined by GPC analysis yielded 101 styrene units, 3 azo skeleton structures, 3 methyl acrylate units and 2 acrylic acid units.

Production Example of Compound (C-15)

Compound (C-15) having an azo skeleton structure represented by the following formula was produced in accordance with the scheme indicated below.

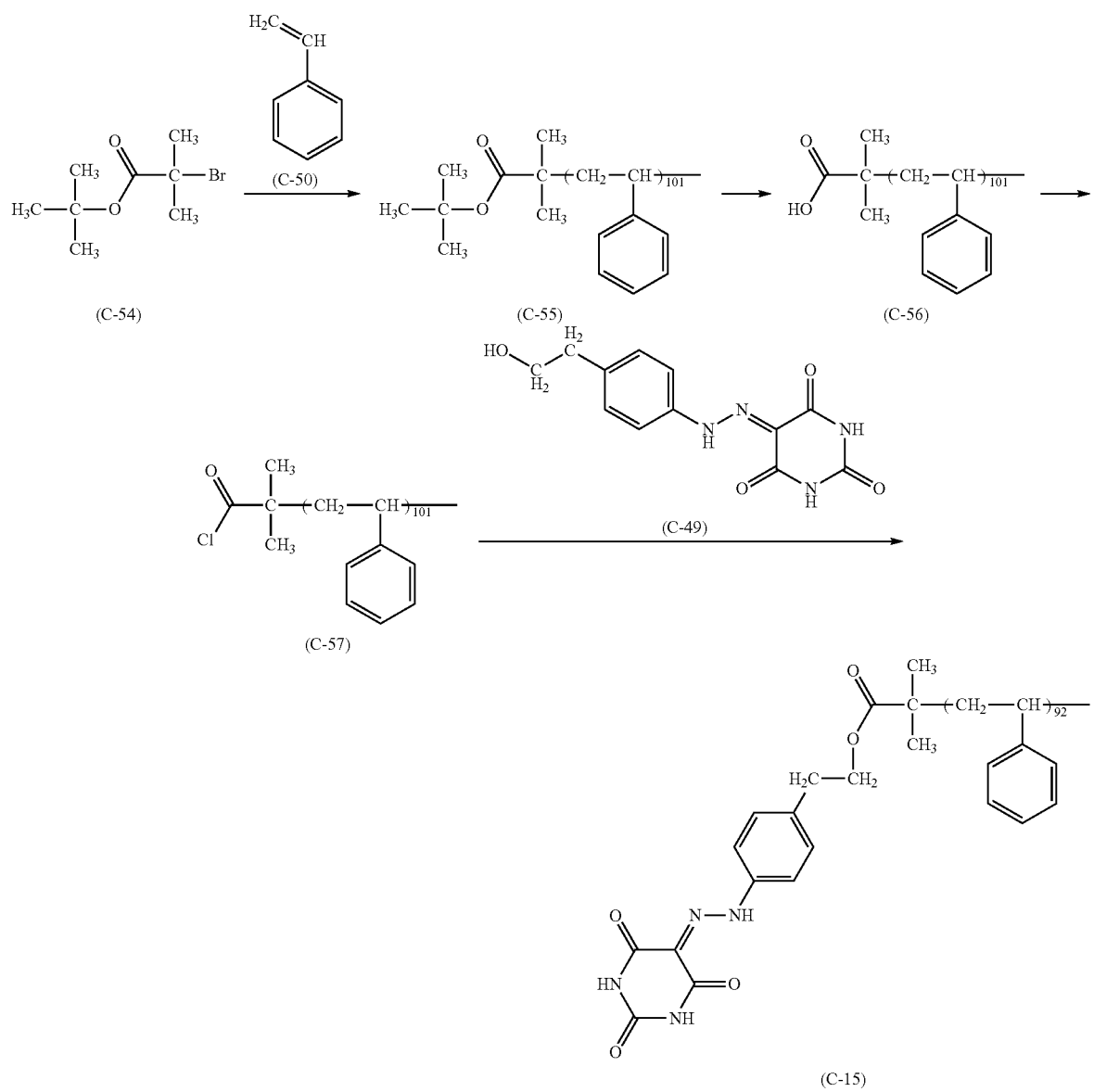

First, 1.1 parts of compound (C-54), 50 parts of styrene (C-50) and 0.83 parts of N,N,N',N'',N'''-pentamethyldiethylenetriamine were added to 5.0 parts of anisole followed by freezing and degassing three times and adding 0.69 parts of copper bromide in the presence of a nitrogen atmosphere. After allowing the solution to react for 8 hours at 100° C. in the presence of a nitrogen atmosphere, the reaction solution was exposed to air to terminate the reaction. Following completion of the reaction, the reaction solution was concentrated and re-precipitated with methanol and the resulting precipitate was dissolved in tetrahydrofuran. This solution was passed through activated alumina to remove the copper bromide. After distilling off the solvent under reduced pressure, the precipitate was exsiccated under reduced pressure to obtain 40 parts of polymer compound (C-55) (yield: 80%).

40 parts of the resulting polymer compound (C-55) were dissolved in 200 parts of 1,4-dioxane followed by the addition of 100 parts of 12 M aqueous hydrochloric acid solution and stirring for 12 hours at 120° C. Following completion of the reaction, the reaction liquid was concentrated and re-precipitated with methanol followed by exsiccating the resulting precipitate to obtain 36 parts of compound (C-56) (yield: 90.1%).

Moreover, 15 parts of compound (C-56) were dissolved in 222 parts of chloroform followed by dropping in 10 parts of thionyl chloride and stirring for 24 hours. Subsequently, the reaction solution was concentrated followed by removal of the chloroform and excess thionyl chloride. The resulting resin solid was recovered to obtain 14.5 parts of compound (C-57) (yield: 96.5%).

Next, 5 parts of compound (C-57) were dissolved in 30.6 parts of N,N-dimethylacetoamide followed by the addition of 0.139 parts of compound (C-49) and stirring for 7 hours at 65° C. After allowing the reaction solution to return to room temperature, the reaction solution was filtered and concentrated. The residue was purified by re-precipitating with 50 parts of methanol to obtain 4.6 parts of compound (C-15) having an azo skeleton structure (yield: 89.5%).

Next, the resulting product was confirmed to have the structure represented by the above-mentioned formula using the various apparatuses previously described. The following indicates the analysis results.

[Analysis Results of Compound (C-15) Having an Azo Skeleton Structure]

[1] Results of Measuring Molecular Weight (GPC)

Weight-average molecular weight (Mw)=11,445, number average molecular weight (Mn)=9,705

[2] Results of Measuring Acid Value 4.2 mg KOH/g

Figure 2:
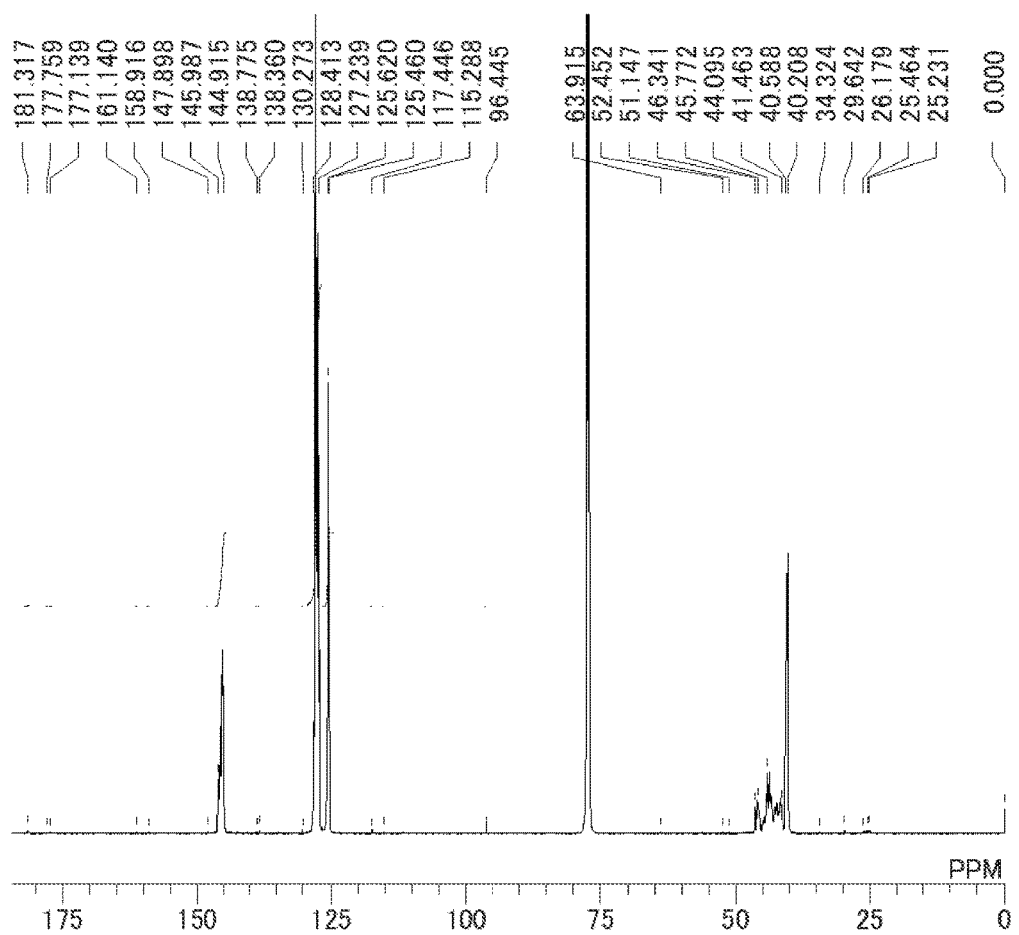
FIG. 2 is a drawing representing the $^{13}$C-NMR spectrum of a compound (C-15) relating to the present invention as determined in CDCl$_3$, at room temperature and at 150 MHz.

[3] Results of $^{13}$C-NMR (150 MHz, CDCl$_3$, room temperature) (see FIG. 2): δ [ppm]=181.3 (5.9C), 177.7 (1C), 177.1 (1C), 161.1 (1C), 158.9 (1C), 147.9 (1C), 146.0-144.9 (790.0C), 138.8 (1C), 138.4 (1C), 130.3 (1C), 128.4-127.2, 125.6-125.5, 117.4 (1C), 115.3 (1C), 96.2, 63.9 (1C), 52.6 (1C), 51.1 (1C), 46.3-45.8, 44.1-41.5, 40.6-40.2, 34.3, 29.6, 26.2, 25.5-25.2

The ratios of the number of carbon atoms that compose the copolymer assigned to each peak were quantified according to the results of analyzing the above-mentioned $^{13}$C-NMR data. Calculation of the number of monomer units that compose compound (C-15) having an azo skeleton structure from these measurement results and the above-mentioned number average molecular weight determined by GPC analysis yielded 92 styrene units and 1 azo skeleton structure. In addition, the introduction rate of the azo skeleton structure (C-49) into the polymer segment (C-57) was 14.5%.

Production Example of Compound (C-16)

A compound (C-16) having an azo skeleton structure represented by the following formula was produced in accordance with the scheme indicated below.

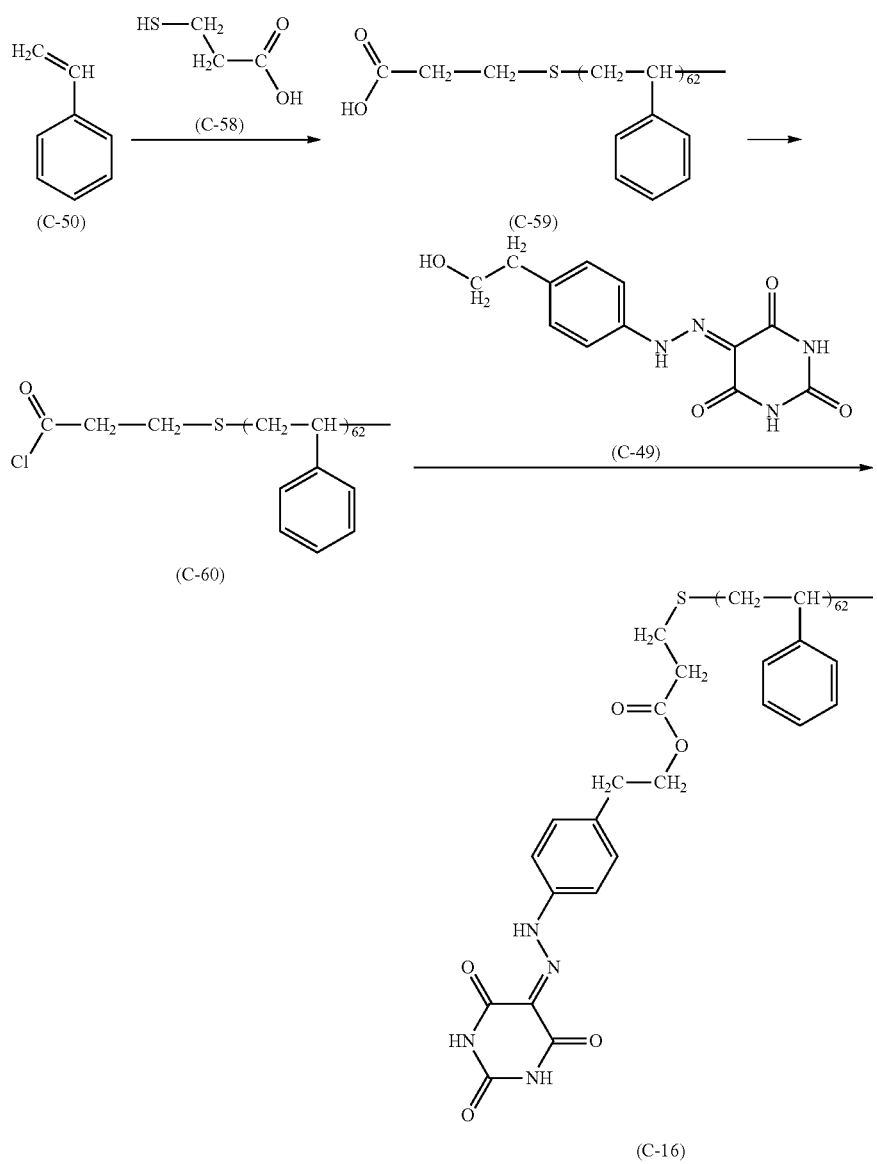

First, 100 parts of propylene glycol monomethyl ether were heated while purging with nitrogen gas followed by refluxing at a liquid temperature of 120° C. or higher. A mixture of 100 parts of styrene (C-50), 1.2 parts of β-mercaptopropionic acid (C-58) and 1.0 part of tert-butyl peroxybenzoate (organic peroxide-based polymerization initiator, trade name: Perbutyl Z, NOF Corp.) was dropped into the solution over the course of 3 hours. Following completion of dropping, the solution was stirred for 3 hours. The solution was distilled at normal pressure while raising the liquid temperature to 170° C. and after the liquid temperature reached 170° C., the solvent was distilled off for 1 hour at a reduced pressure of 1 hPa to obtain a polymer solid. The solid was purified by dissolving in tetrahydrofuran, re-precipitating with n-hexane and filtering out the precipitated solid to obtain 98.0 parts of compound (C-59) (yield: 98%).

Moreover, 15 parts of compound (C-59) were dissolved in 222 parts of chloroform followed by dropping in 10 parts of thionyl chloride and stirring for 24 hours. Subsequently, the reaction solution was concentrated followed by removal of chloroform and excess thionyl chloride. The resulting resin solid was recovered to obtain 14.7 parts of compound (C-60) (yield: 97.8%).

Next, 10 parts of compound (C-60) were dissolved in 61 parts of N,N-dimethylacetoamide followed by the addition of 0.273 parts of compound (C-49) and stirring for 7 hours at 65° C. After allowing the reaction solution to return to room temperature, the reaction solution was filtered and concentrated. The residue was purified by re-precipitating with 100 parts of methanol to obtain 9.5 parts of compound (C-16) having an azo skeleton structure (yield: 92.8%).

Next, the resulting product was confirmed to have the structure represented by the above-mentioned formula using the various apparatuses previously described. The following indicates the analysis results.

[Analysis Results of Compound (C-16) Having an Azo Skeleton Structure]

[1] Results of Measuring Molecular Weight (GPC)

Weight-average molecular weight (Mw)=12,022, number average molecular weight (Mn)=6,544

[2] Results of Measuring Acid Value 5.5 mg KOH/g

Figure 3:
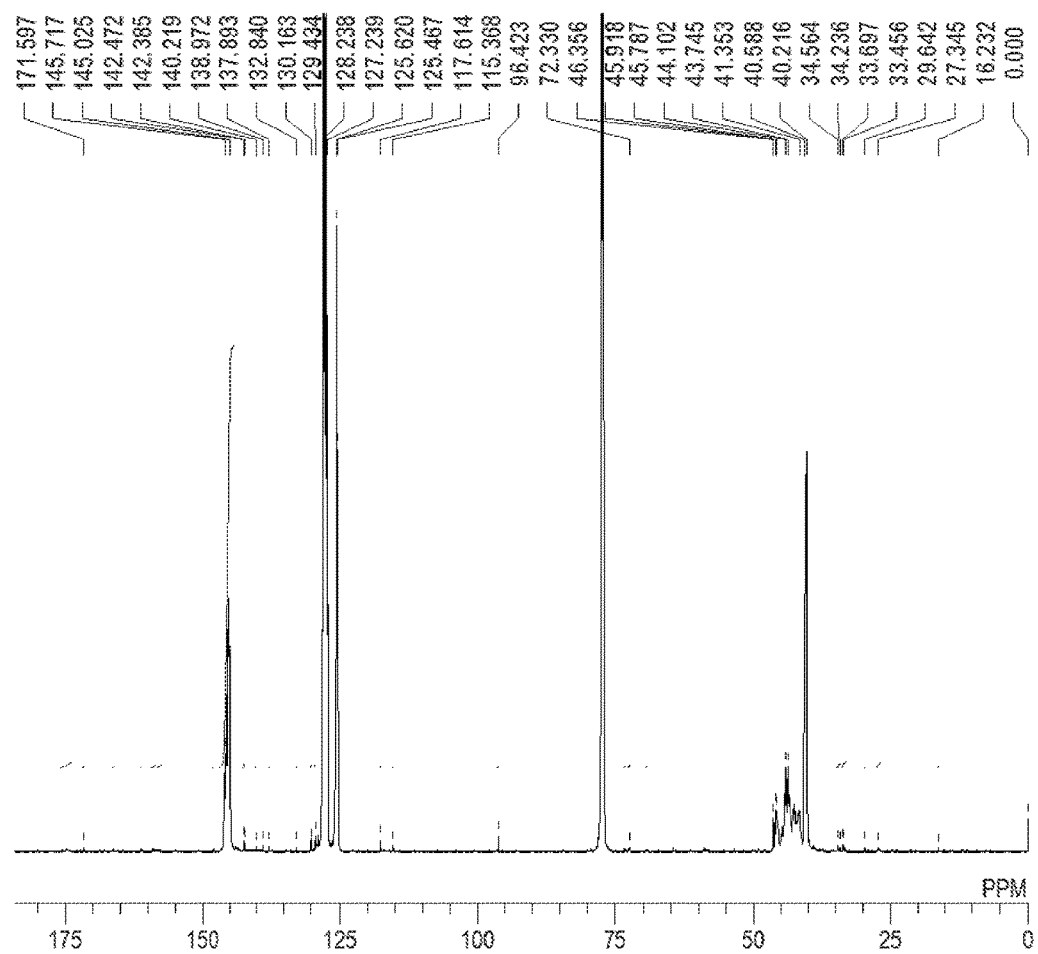
FIG. 3 is a drawing representing the $^{13}$C-NMR spectrum of a compound (C-16) relating to the present invention as determined in CDCl$_3$, at room temperature and at 150 MHz.

[3] Results of $^{13}$C-NMR (150 MHz, CDCl$_3$, room temperature) (see FIG. 3): δ [ppm]=174.8 (4.9C), 172.2 (1C), 171.6 (1C), 166.3 (1.5C), 161.1 (1C), 159.0, 147.9 (1C), 145.7-145.0 (461.5), 142.5-142.4, 140.2 (1C), 139.0 (1C), 137.9 (1C), 132.8 (1C), 130.4-130.2, 129.4 (1C), 128.2-127.2, 125.6-125.5, 117.6 (1C), 115.4 (1C), 96.4 (1C), 73.3 (1C), 72.5-72.3, 69.4-69.1, 64.5, 59.1-58.7, 53.5, 49.1, 48.0, 46.4, 45.9-45.8, 44.1-41.4, 40.6-40.2, 34.6-34.2, 33.7-33.5, 29.6 (1C), 27.3-26.9, 16.2

The ratios of the number of carbon atoms that compose the copolymer assigned to each peak were quantified according to the results of analyzing the above-mentioned $^{13}$C-NMR data. Calculation of the number of monomer units that compose compound (C-16) having an azo skeleton structure from these measurement results and the above-mentioned number average molecular weight determined by GPC analysis yielded 62 styrene units and 1 azo skeleton structure. In addition, the introduction rate of the azo skeleton structure (C-49) into the polymer segment (C-60) was 23.3%.

Production Example of Compound (C-44)

A compound (C-44) having an azo skeleton structure represented by the following formula was produced in accordance with the scheme indicated below.

[Chemical Formula 17]

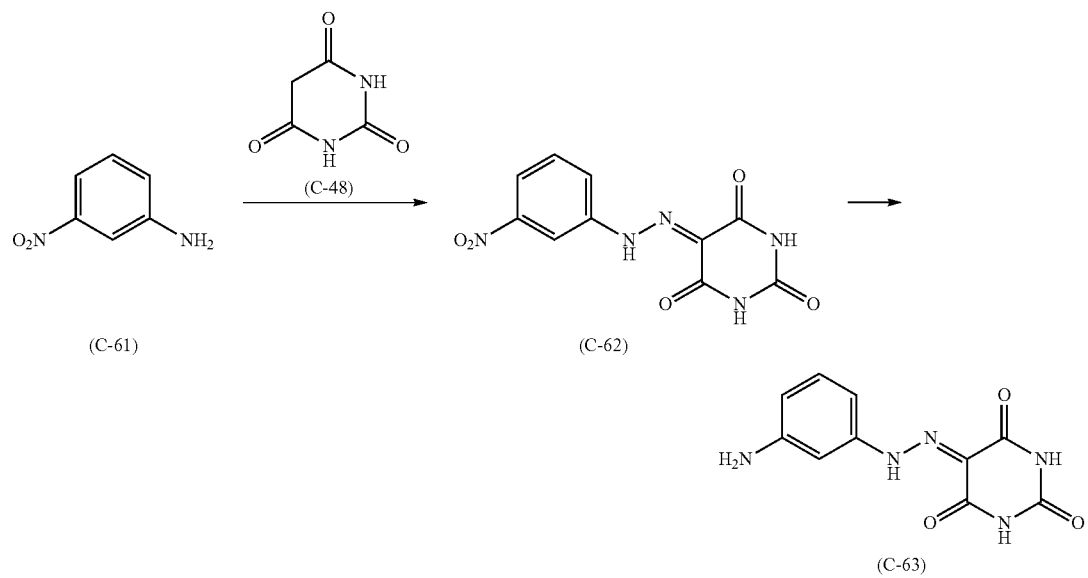

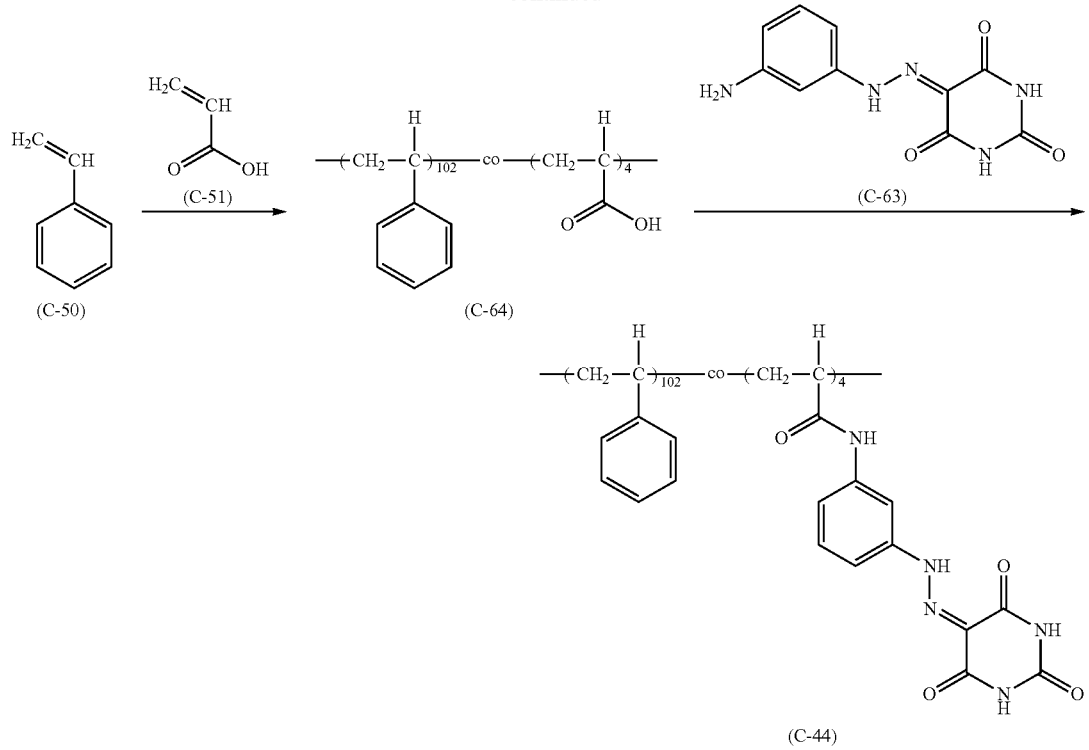

First, 20 parts of compound (C-61) were added and dissolved in 42.4 parts of concentrated hydrochloric acid and 150 parts of water. This solution was cooled with ice to a liquid temperature of 0° C. followed by the addition of a solution obtained by dissolving 10.4 parts of sodium nitrite in 50 parts of water and stirring for 30 minutes at the same temperature. Next, 1.98 parts of sulfamic acid were added to decompose excess sodium nitrite (diazonium salt solution).

Next, a solution obtained by dissolving 56.3 parts of sodium acetate in 200 parts of water and 17.7 parts of barbituric acid (C-48) was added followed by cooling with ice to 0° C. and dropping in the above-mentioned diazonium salt solution while maintaining at the same temperature and the pH to 8 or lower. Following dropping, the solution was stirred overnight while allowing to gradually return to room temperature to complete the reaction. Following completion of the reaction, the solution was filtered and the precipitate was washed with dilute hydrochloric acid followed by rinsing with water to obtain 28.4 parts of compound (C-62) (yield: 73.3%).

12 parts of the above-mentioned (C-62) were dissolved in 124 parts of 1,4-dioxane. Next, after adding a solution obtained by dissolving 10.0 parts of sodium hydrogen sulfide in 20 parts of water at room temperature, the temperature was raised to 65° C. followed by stirring for 45 hours. Following completion of the reaction, the solvent was added to water followed by filtering out the precipitated solid, re-suspending in water and adjusting to neutral pH with concentrated hydrochloric acid. After washing the precipitate with water, the precipitate was dispersed and washed with methanol to obtain 8.94 parts of compound (C-63) (yield: 78.7%).

Next, 100 parts of propylene glycol monomethyl ether were heated while purging with nitrogen gas followed by refluxing at a liquid temperature of 120° C. or higher and dropping in a mixture of 190 parts of styrene (C-50), 5.0 parts of acrylic acid (C-51) and 1.00 part of tert-butyl peroxybenzoate (organic peroxide-based polymerization initiator, trade name: Perbutyl Z, NOF Corp.) over the course of 3 hours. Following completion of dropping, the solution was stirred for 3 hours followed by distilling at normal pressure while raising the liquid temperature to 170° C., and after the liquid temperature reached 170° C., the solvent was distilled off for 1 hour at a reduced pressure of 1 hPa to obtain a resin solid. The solid was purified by dissolving in tetrahydrofuran and re-precipitating with n-hexane to obtain 185 parts of compound (C-64) (yield: 92.5%).

10 parts of the above-mentioned compound (C-64) were dissolved in 87.0 parts of toluene followed by cooling the solution to 5° C. with ice and dropping in 4.5 parts of thionyl chloride. Following completion of dropping, the ice bath was removed followed by stirring for 15 hours at room temperature. After concentrating the reaction liquid under reduced pressure, 61 parts of N,N-dimethylacetoamide were added followed by completely distilling off the toluene under reduced pressure. Next, the solution was cooled with ice followed by the addition of 1.12 parts of compound (C-63) at 5° C. Following addition, the temperature of the reaction liquid was raised and stirred for 3 hours at 65° C. Following completion of the reaction, 100 parts of methanol were poured in and the resulting precipitate was filtered out and washed with 15 parts of methanol. After re-dissolving in 87.0 parts of toluene and removing insoluble matter, the solution was concentrated and purified by re-precipitating with methanol to obtain 10.9 parts of compound (C-44) having an azo skeleton structure (yield: 98.0%).

Next, the resulting product was confirmed to have the structure represented by the above-mentioned formula using the various apparatuses previously described. The following indicates the analysis results.

Figure 4:
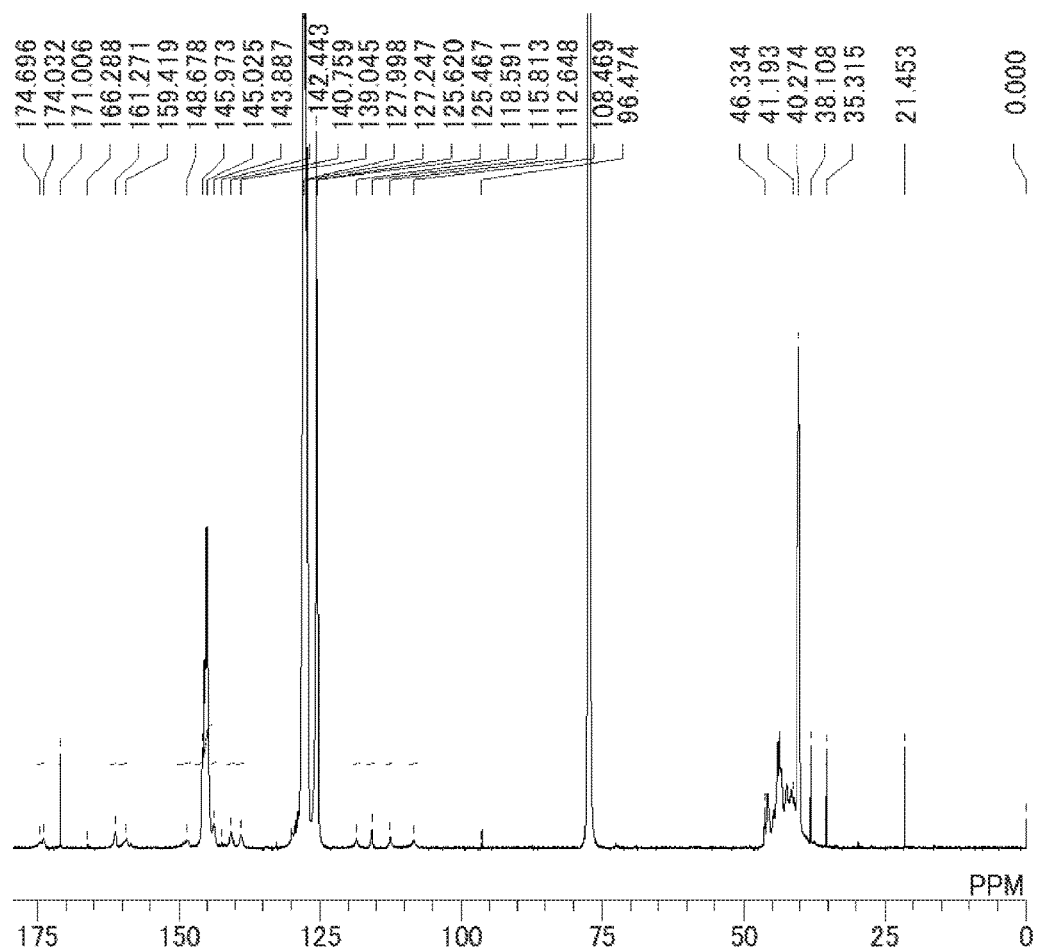
FIG. 4 is a drawing representing the $^{13}$C-NMR spectrum of a compound (C-44) relating to the present invention as determined in CDCl$_3$, at room temperature and at 150 MHz.

[Analysis Results of Compound (C-44) Having an Azo Skeleton Structure]
[1] Results of Measuring Molecular Weight (GPC)
Weight-average molecular weight (Mw)=25,027, number average molecular weight (Mn)=13,746
[2] Results of Measuring Acid Value
21.4 mg KOH/g
[3] Results of $^{13}$C-NMR (150 MHz, CDCl$_3$, room temperature) (see FIG. 4): δ [ppm]=174.7-174.0 (1C), 171.0, 161.3 (1C), 159.4 (1C), 148.7 (1C), 146.0-145.0 (30.2C), 143.9, 140.8 (1C), 139.0 (1C), 128.0-127.2, 125.6-125.5, 118.6 (1C), 115.8 (1C), 112.6 (1C), 108.5 (1C), 96.5, 46.3-41.2, 40.3, 38.1, 35.3, 21.5

The ratios of the number of carbon atoms that compose the copolymer assigned to each peak were quantified according to the results of analyzing the above-mentioned $^{13}$C-NMR data. Calculation of the number of monomer units that compose compound (C-44) having an azo skeleton structure from these measurement results and the above-mentioned number average molecular weight determined by GPC analysis yielded 102 styrene units and 4 azo skeleton structures.

Compounds (C-2) to (C-14) and (C-17) to (C-43) having an azo skeleton structure were produced using the same procedure as the synthesis examples of the above-mentioned compounds (C-1), (C-15), (C-16) and (C-44) having an azo skeleton structure.

The above-mentioned polymer segments are listed in the following Table 1, while the above-mentioned compounds having an azo skeleton structure are listed in the following Table 2.

[Chemical Formula 18]

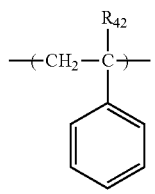

X (In formula (X), $R_{42}$ represents a hydrogen atom or alkyl group.)

[Chemical Formula 19]

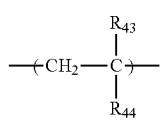

$Y_1$ (In formula $Y_1$, $R_{43}$ represents a hydrogen atom or alkyl group and $R_{44}$ represents a carboxylic acid ester group or carboxylic acid amide group.)

[Chemical Formula 20]

TABLE 1

| Polymer segment no. | Monomer chain sequence | No. of X | No. of $Y_1$ | No. of $Y_2$ | No. of Z | $R_{42}$ | $R_{43}$ | $R_{44}$ | $R_{45}$ | $R_{46}$ | $R_{47}$ |
|---|---|---|---|---|---|---|---|---|---|---|---|
| R-1 | poly(X-co-$Y_1$-co-Z) | 101 | 3 | 0 | 5 | H | H | COOCH$_3$ | — | — | H |
| R-2 | poly(X-co-$Y_1$-co-Z) | 52 | 2 | 0 | 2 | H | H | COOCH$_3$ | — | — | H |
| R-3 | poly(X-co-$Y_1$-co-Z) | 240 | 14 | 0 | 5 | H | H | COOCH$_3$ | — | — | H |
| R-4 | poly(X-co-$Y_1$-co-Z) | 101 | 4 | 0 | 4 | CH$_3$ | CH$_3$ | COOCH$_3$ | — | — | H |
| R-5 | poly(X-co-$Y_1$-co-Z) | 240 | 14 | 0 | 5 | H | H | COOC$_4$H$_9$ (n) | — | — | H |
| R-6 | poly(X-co-$Y_1$-co-Z) | 88 | 8 | 0 | 4 | H | H | COOCH$_2$CH(C$_2$H$_5$)C$_4$H$_9$ | — | — | H |
| R-7 | poly(X-co-$Y_1$-co-Z) | 88 | 8 | 0 | 4 | H | H | COOC$_{18}$H$_{37}$ (n) | — | — | H |
| R-8 | poly(X-co-$Y_1$-co-Z) | 92 | 4 | 0 | 4 | H | H | COOC$_{22}$H$_{45}$ (n) | — | — | H |
| R-9 | poly(X-co-$Y_1$-co-$Y_2$-co-Z) | 77 | 15 | 4 | 4 | H | H | COOCH$_3$ | H | COOC$_{22}$H$_{45}$ (n) | H |
| R-10 | poly(X-co-$Y_1$-co-$Y_2$-co-Z) | 60 | 30 | 6 | 4 | H | H | COOC$_4$H$_9$ (n) | H | COOC$_{22}$H$_{45}$ (n) | H |
| R-11 | poly(X-co-Z) | 102 | 0 | 0 | 4 | H | — | — | — | — | H |
| R-12 | poly($Y_1$-co-Z) | 0 | 90 | 0 | 10 | — | H | COOC$_4$H$_9$ (n) | — | — | H |
| R-13 | polyX-b-polyZ | 84 | 0 | 0 | 5 | H | — | — | — | — | H |
| R-14 | poly(X-co-$Y_1$)-b-polyZ | 74 | 14 | 0 | 2 | H | H | COOC$_4$H$_9$ (n) | — | — | H |
| R-15 | α-W-polyX | 101 | 0 | 0 | 0 | H | — | — | — | — | — |
| R-16 | α-W-poly$Y_1$ | 0 | 95 | 0 | 0 | — | H | COOC$_4$H$_9$ (n) | — | — | — |
| R-17 | α-W-poly(X-co-$Y_1$) | 71 | 18 | 0 | 0 | H | H | COOCH$_3$ | — | — | — |
| R-18 | α-W-poly(X-co-$Y_1$) | 71 | 18 | 0 | 0 | H | H | COOC$_4$H$_9$ (n) | — | — | — |
| R-19 | α-W-poly(X-co-$Y_1$) | 71 | 18 | 0 | 0 | H | H | CONH$_2$ | — | — | — |
| R-20 | α-W-poly(X-co-$Y_1$) | 71 | 18 | 0 | 0 | H | H | COOBn | — | — | — |
| R-21 | α-W-polyX | 62 | 0 | 0 | 0 | H | — | — | — | — | — |

(In Table 1, the prefix "α" represents a terminal group attached to the left of the structure. W represents a COOH group, and X, $Y_1$, $Y_2$ and Z represent the monomer units indicated below. "Bn" represents an unsubstituted benzyl group, and (n) indicates that the alkyl group is linear. In addition, "co" shown in the chain sequence of the monomers is a symbol indicating that the sequence of each monomer unit composing the copolymer is not ordered.)

-continued

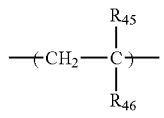

$Y_2$ (In formula $Y_2$, $R_{45}$ represents a hydrogen atom or alkyl group and $R_{46}$ represents a carboxylic acid ester group or carboxylic acid amide group.)

[Chemical Formula 21]

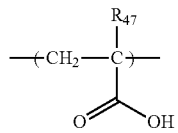

Z (In formula Z, $R_{47}$ represents a hydrogen atom or alkyl group.)

with polymer segment" is "W" form a linking group by bonding with a COOH group represented by "W" in the polymer segments listed in Table 1. However, not only are there cases in which the COOH group is bound directly to the polymer segment, but there are also cases in which the COOH group is bound through —$C(CH_3)_2$— in the manner of $L_2$, for example. Compounds in which the "bonding site with polymer segment" is Z form a linking group by bonding with a COOH group present in the monomer unit "Z" in the polymer segments listed in Table 1. $L_1$ to $L_{10}$ in Table 2 are linking groups with the polymer segment and are represented by the following structure.)

TABLE 2

Compounds having Azo Skeleton Structure

| Compound | Polymer segment | Bonding site with polymer segment | No. of azo skeleton structures introduced | X | $R_1$ | $R_2$ | $R_5$ | $R_6$ | $R_7$ | $R_8$ | $R_9$ |
|---|---|---|---|---|---|---|---|---|---|---|---|
| C-1 | R-1 | Z | 3 | O | H | H | H | H | $L_1$ | H | H |
| C-2 | R-2 | Z | 2 | O | H | H | H | H | $L_1$ | H | H |
| C-3 | R-3 | Z | 5 | O | H | H | H | H | $L_1$ | H | H |
| C-4 | R-4 | Z | 4 | O | H | H | H | H | $L_1$ | H | H |
| C-5 | R-5 | Z | 5 | O | H | H | H | H | $L_1$ | H | H |
| C-6 | R-6 | Z | 4 | O | H | H | H | H | $L_1$ | H | H |
| C-7 | R-7 | Z | 3 | O | H | H | H | H | $L_1$ | H | H |
| C-8 | R-8 | Z | 4 | O | H | H | H | H | $L_1$ | H | H |
| C-9 | R-9 | Z | 3 | O | H | H | H | H | $L_1$ | H | H |
| C-10 | R-10 | Z | 4 | O | H | H | H | H | $L_1$ | H | H |
| C-11 | R-11 | Z | 3 | O | H | H | H | H | $L_1$ | H | H |
| C-12 | R-12 | Z | 10 | O | H | H | H | H | $L_1$ | H | H |
| C-13 | R-13 | Z | 5 | O | H | H | H | H | $L_1$ | H | H |
| C-14 | R-14 | Z | 2 | O | H | H | H | H | $L_1$ | H | H |
| C-15 | R-15 | W | 1 | O | H | H | H | H | $L_2$ | H | H |
| C-16 | R-21 | W | 1 | O | H | H | H | H | $L_4$ | H | H |
| C-17 | R-16 | W | 1 | O | H | H | H | H | $L_3$ | H | H |
| C-18 | R-17 | W | 1 | O | H | H | H | H | $L_5$ | H | H |
| C-19 | R-18 | W | 1 | O | H | H | H | H | $L_6$ | H | H |
| C-20 | R-19 | W | 1 | O | H | H | H | H | $L_7$ | H | H |
| C-21 | R-20 | W | 1 | O | H | H | H | H | $L_8$ | H | H |
| C-22 | R-15 | W | 1 | O | H | H | H | H | $L_8$ | H | H |
| C-23 | R-1 | Z | 3 | O | $CH_3$ | $CH_3$ | H | H | $L_1$ | H | H |
| C-24 | R-1 | Z | 3 | S | $C_2H_5$ | $C_2H_5$ | H | H | $L_1$ | H | H |
| C-25 | R-1 | Z | 3 | O | Ph | Ph | H | H | $L_1$ | H | H |
| C-26 | R-1 | Z | 3 | O | $C_2H_4Ph$ | $C_2H_4Ph$ | H | H | $L_1$ | H | H |
| C-27 | R-1 | Z | 3 | O | H | H | COOH | H | H | $L_1$ | H |
| C-28 | R-1 | Z | 3 | O | H | H | $CONH_2$ | H | $COOCH_3$ | $L_1$ | H |
| C-29 | R-1 | Z | 3 | O | H | H | H | $CONHCH_3$ | $L_1$ | H | H |
| C-30 | R-1 | Z | 3 | O | H | $L_9$ | $COOCH_3$ | H | H | H | H |
| C-31 | R-1 | Z | 3 | O | H | $L_9$ | H | $COOCH_3$ | H | H | H |
| C-32 | R-1 | Z | 3 | O | H | $L_9$ | H | H | $COOCH_3$ | H | H |
| C-33 | R-1 | Z | 3 | O | H | $L_9$ | H | H | $CONH_2$ | H | H |
| C-34 | R-1 | Z | 3 | O | H | $L_9$ | H | H | H | $CONH_2$ | H |
| C-35 | R-1 | Z | 3 | O | H | $L_9$ | $COOC_2H_5$ | H | H | $COOC_2H_5$ | H |
| C-36 | R-1 | Z | 3 | O | H | $L_9$ | COOPr(n) | H | H | COOPr(n) | H |
| C-37 | R-1 | Z | 3 | O | H | $L_9$ | COOPr(i) | H | H | COOPr(i) | H |
| C-38 | R-1 | Z | 3 | O | H | $L_9$ | $CONHCH_3$ | H | H | $CONHCH_3$ | H |
| C-39 | R-1 | Z | 3 | O | H | $L_9$ | $CON(C_2H_5)_2$ | H | H | $CON(C_2H_5)_2$ | H |
| C-40 | R-15 | W | 1 | O | H | H | H | $L_{10}$ | H | $L_{10}$ | H |
| C-41 | R-15 | W | 1 | O | H | $L_9$ | H | $L_{10}$ | H | $L_{10}$ | H |
| C-42 | R-15 | W | 1 | S | H | H | H | H | $L_2$ | H | H |
| C-43 | R-1 | Z | 3 | NH | H | H | H | H | $L_{10}$ | H | H |
| C-44 | R-11 | Z | 4 | O | H | H | H | $L_{10}$ | H | H | H |

(In Table 2, $R_1$, $R_2$, $R_5$ to $R_9$ and X represent $R_1$, $R_2$, $R_5$ to $R_9$ and X in the following formula (3). "Ph" represents an unsubstituted phenyl group and (n) indicates that the alkyl group is linear. "Pr" represents an unsubstituted propyl group, (n) indicates that it is linear, and Pr(i) represents an isopropyl group. Compounds in which the "bonding site

[Chemical Formula 22]

-continued

Formula (3)

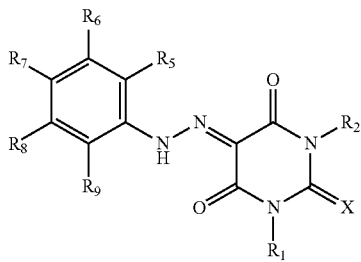

(In formula (3), $R_1$ and $R_2$ each independently represent a hydrogen atom, alkyl group, phenyl group or aralkyl group, and X represents O, NH or S. $R_5$ to $R_9$ each independently represent a hydrogen atom, $COOR_{10}$ group or $CONR_{11}R_{12}$ group. $R_{10}$ to $R_{12}$ each independently represent a hydrogen atom or alkyl group. However, at least one of $R_1$, $R_2$ and $R_5$ to $R_9$ has a substituent for bonding with the polymer as a linking group.)

[Chemical Formula 23]

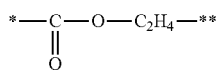
$L_1$ (Asterisks (*) in formula ($L_1$) indicate linking sites with the polymer segments listed in Table 1, while double asterisks (**) indicate linking sites with the azo skeleton structure represented by the above-mentioned formula (3).)

[Chemical Formula 24]

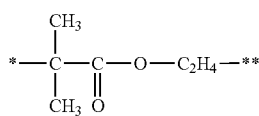
$L_2$ (Asterisks (*) in formula ($L_2$) indicate linking sites with the polymer segments listed in Table 1, while double asterisks (**) indicate linking sites with the azo skeleton structure represented by the above-mentioned formula (3).)

[Chemical Formula 25]

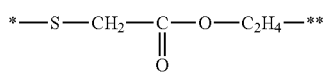
$L_3$ (Asterisks (*) in formula ($L_3$) indicate linking sites with the polymer segments listed in Table 1, while double asterisks (**) indicate linking sites with the azo skeleton structure represented by the above-mentioned formula (3).)

[Chemical Formula 26]

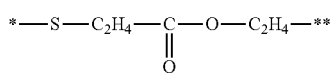
$L_4$ (Asterisks (*) in formula ($L_4$) indicate linking sites with the polymer segments listed in Table 1, while double asterisks (**) indicate linking sites with the azo skeleton structure represented by the above-mentioned formula (3).)

[Chemical Formula 27]

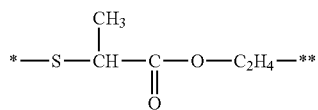
$L_5$ (Asterisks (*) in formula ($L_5$) indicate linking sites with the polymer segments listed in Table 1, while double asterisks (**) indicate linking sites with the azo skeleton structure represented by the above-mentioned formula (3).)

[Chemical Formula 28]

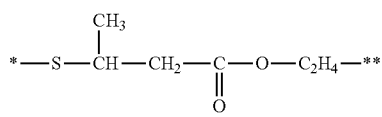
$L_6$ (Asterisks (*) in formula ($L_6$) indicate linking sites with the polymer segments listed in Table 1, while double asterisks (**) indicate linking sites with the azo skeleton structure represented by the above-mentioned formula (3).)

[Chemical Formula 29]

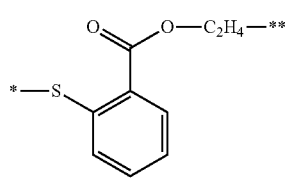
$L_7$ (Asterisks (*) in formula ($L_7$) indicate linking sites with the polymer segments listed in Table 1, while double asterisks (**) indicate linking sites with the azo skeleton structure represented by the above-mentioned formula (3).)

[Chemical Formula 30]

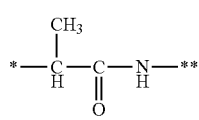
$L_8$ (Asterisks (*) in formula ($L_8$) indicate linking sites with the polymer segments listed in Table 1, while double asterisks (**) indicate linking sites with the azo skeleton structure represented by the above-mentioned formula (3).)

[Chemical Formula 31]

-continued

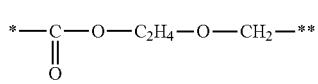

(Asterisks (*) in formula (L$_9$) indicate linking sites with the polymer segments listed in Table 1, while double asterisks (**) indicate linking sites with the azo skeleton structure represented by the above-mentioned formula (3).)

[Chemical Formula 32]

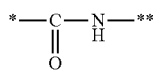

(Asterisks (*) in formula (L$_{10}$) indicate linking sites with the polymer segments listed in Table 1, while double asterisks (**) indicate linking sites with the azo skeleton structure represented by the above-mentioned formula (3).)

Comparative Example 1

Production Example of Comparative Compound (C-45)

The following pigment (C-45) having an azo skeleton was synthesized in compliance with Synthesis Example 3 (synthesis of Example Compound 9) in the description of Japanese Patent Application Laid-open No. 2000-239554 as a comparative example of the compound having an azo skeleton structure of the present invention.

[Chemical Formula 33]

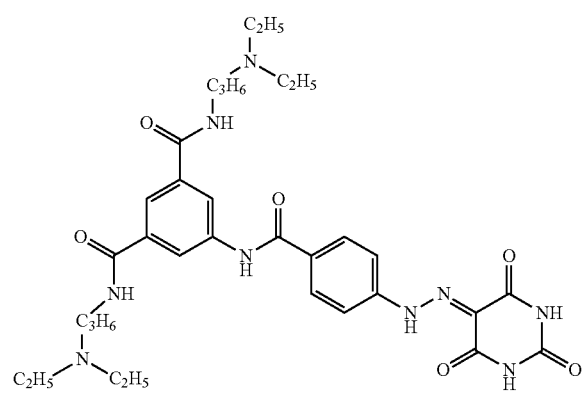

Production Example of Comparative Compound (C-46)

The following comparative azo compound (C-46) was synthesized in compliance with Example 2 (Coloring Compound Synthesis Example 3) in the description of Japanese Patent Application Laid-open No. 2012-067285 as a comparative example of the compound having an azo skeleton structure of the present invention.

[Chemical Formula 34]

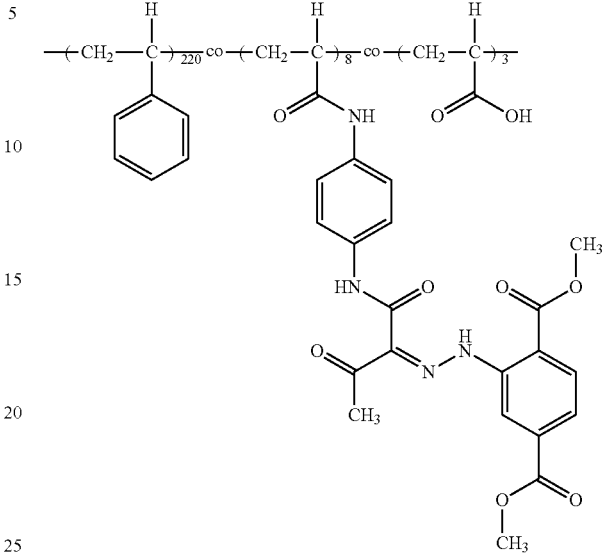

Example 2

Yellow pigment dispersions of the present invention were prepared according to the methods indicated below.

Yellow Pigment Dispersion Preparation Example 1

18.0 parts of a yellow pigment in the form of C.I. Pigment Yellow 155 (yellow pigment a) represented by the formula (Pig-A), 1.80 parts of the above-mentioned compound (C-1) having an azo skeleton structure, 180 parts of a non-water-soluble solvent in the form of styrene and 130 parts of glass beads (φ1 mm) were mixed and dispersed for 3 hours with an attritor (Nippon Coke & Engineering Co., Ltd.) followed by filtering with a mesh to obtain a yellow pigment dispersion (Dis-Y1).

[Chemical Formula 35]

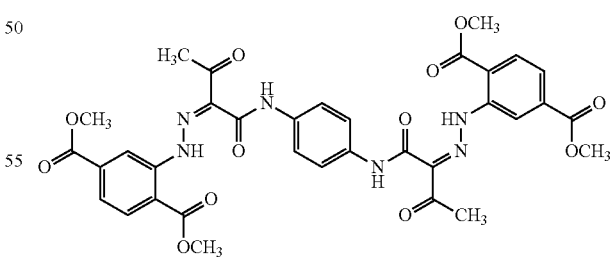

Yellow Pigment Dispersion Preparation Example 2

Yellow pigment dispersions (Dis-Y2) to (Dis-Y44) were respectively obtained by respectively carrying out the same procedure as the above-mentioned Yellow Pigment Dispersion Preparation Example 1 with the exception of changing the compound (C-1) having an azo skeleton structure to compounds (C-2) to (C-44) having an azo skeleton structure.

Yellow Pigment Dispersion Preparation Example 3

Yellow pigment dispersions (Dis-Y45) and (Dis-Y46) were obtained by respectively carrying out the same procedure as the above-mentioned Yellow Pigment Dispersion Preparation Example 1 with the exception of changing C.I. Pigment Yellow 155 (yellow pigment a) represented by formula (Pig-A) to C.I. Pigment Yellow 180 (yellow pigment b) represented by formula (Pig-B) or C.I. Pigment Yellow 185 (yellow pigment c) represented by formula (Pig-C).

[Chemical Formula 36]

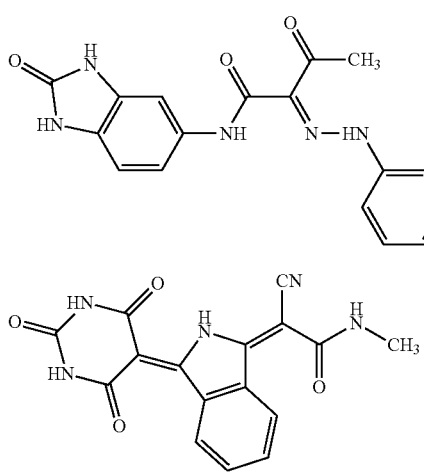

Yellow Pigment Dispersion Preparation Example 4

42.0 parts of yellow pigment in the form of C.I. Pigment Yellow 155 (yellow pigment a) represented by formula (Pig-A) and 4.2 parts of a pigment dispersing agent in the form of compound (C-1) having an azo skeleton structure were dry-mixed with the NHS-0 Hybridization System (Nara Machinery Co., Ltd.) to prepare a pigment composition. 19.8 parts of the resulting pigment composition were mixed with 180 parts of styrene and 130 parts of glass beads (diameter: 1 mm) followed by dispersing for 1 hour with a paint shaker (Toyo Seiki Seisaku-sho, Ltd.) and filtering with a mesh to obtain a yellow pigment dispersion (Dis-Y47).

Comparative Example 2

Yellow pigment dispersions to serve as reference values for evaluation and yellow pigment dispersions for comparison were prepared according to the methods indicated below.

Reference Yellow Pigment Dispersion Preparation Example 1

A reference yellow pigment dispersion (Dis-Y48) was obtained by carrying out the same procedure as the above-mentioned Yellow Pigment Dispersion Preparation Example 1 with the exception of not adding compound (C-1) having an azo skeleton structure.

Reference Yellow Pigment Dispersion Preparation Example 2

Reference yellow pigment dispersions (Dis-Y49) and (Dis-Y50) were respectively obtained by respectively carrying out the same procedure as the above-mentioned Yellow Pigment Dispersion Preparation Example 3 with the exception of not adding compound (C-1) having an azo skeleton structure.

Reference Yellow Pigment Dispersion Preparation Example 3

A reference yellow pigment dispersion (Dis-Y51) was obtained by carrying out the same procedure as the above-mentioned Yellow Pigment Dispersion Preparation Example 4 with the exception of not adding compound (C-1) having an azo skeleton structure.

Comparative Yellow Pigment Dispersion Preparation Example 1

Comparative yellow pigment dispersions (Dis-Y52) to (Dis-Y54) were respectively obtained by respectively carrying out the same procedure as the above-mentioned Yellow Pigment Dispersion Preparation Example 1 with the exception of changing the compound (C-1) having an azo skeleton structure to 0.216 parts of pigment (C-45) having an azo skeleton and 1.8 parts of a binder resin in the form of an acrylic acid-butyl acrylate (copolymer ratio (molar ratio)=1/12) random copolymer (Mw=26,290) described in Patent Document 1 (Comparative Compound 1), styrene-butyl acrylate (copolymer ratio (molar ratio)=95/5) block copolymer (Mw=9,718) described in Patent Document 2 (Comparative Compound 2), or compound (C-46) described in Patent Document 3 (Comparative Compound 3).

Example 3

Magenta pigment dispersions of the present invention were prepared according to the methods indicated below.

Magenta Pigment Dispersion Preparation Example 1

18.0 parts of a magenta pigment in the form of C.I. Pigment Red 122 (magenta pigment a) represented by the formula (Pig-D), 1.80 parts of the above-mentioned compound (C-1) having an azo skeleton structure, 180 parts of a non-water-soluble solvent in the form of styrene and 130 parts of glass beads (φ1 mm) were mixed and dispersed for 3 hours with an attritor (Nippon Coke & Engineering Co., Ltd.) followed by filtering with a mesh to obtain a magenta pigment dispersion (Dis-M1).

[Chemical Formula 37]

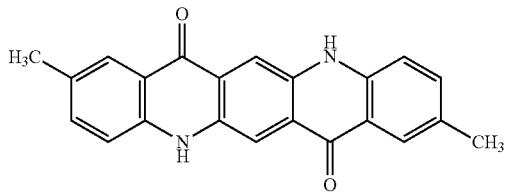

(Pig-D)

Magenta Pigment Dispersion Preparation Example 2

Magenta pigment dispersions (Dis-M2) to (Dis-M44) were respectively obtained by respectively carrying out the same procedure as the above-mentioned Magenta Pigment Dispersion Preparation Example 1 with the exception of changing the compound (C-1) having an azo skeleton structure to compounds (C-2) to (C-44) having an azo skeleton structure.

Magenta Pigment Dispersion Preparation Example 3

Magenta pigment dispersions (Dis-M45) and (Dis-M46) were obtained by respectively carrying out the same procedure as the above-mentioned Magenta Pigment Dispersion Preparation Example 1 with the exception of changing C.I. Pigment Red 122 (magenta pigment a) represented by formula (Pig-D) to C.I. Pigment Red 255 (magenta pigment b) represented by formula (Pig-E) or C.I. Pigment Red 150 (magenta pigment c) represented by formula (Pig-F).

[Chemical Formula 38]

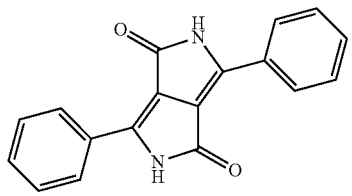

(Pig-E)

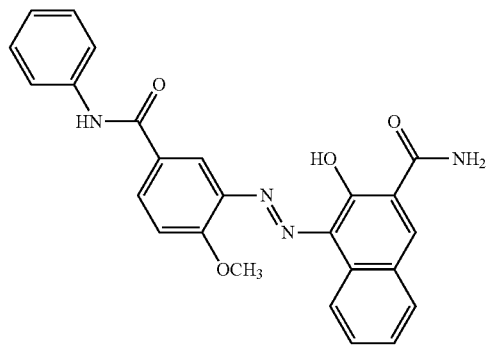

(Pig-F)

Magenta Pigment Dispersion Preparation Example 4

42.0 parts of magenta pigment in the form of C.I. Pigment Red 122 (magenta pigment a) represented by formula (Pig-D) and 4.2 parts of a pigment dispersing agent in the form of compound (C-1) having an azo skeleton structure were dry-mixed with the NHS-0 Hybridization System (Nara Machinery Co., Ltd.) to prepare a pigment composition. 19.8 parts of the resulting pigment composition were mixed with 180 parts of styrene and 130 parts of glass beads (diameter: 1 mm) followed by dispersing for 1 hour with a paint shaker (Toyo Seiki Seisaku-sho, Ltd.) and filtering with a mesh to obtain a magenta pigment dispersion (Dis-M47).

Comparative Example 3

Magenta pigment dispersions to serve as reference values for evaluation and magenta pigment dispersions for comparison were prepared according to the methods indicated below.

Reference Magenta Pigment Dispersion Preparation Example 1

A reference magenta pigment dispersion (Dis-M48) was obtained by carrying out the same procedure as the above-mentioned Magenta Pigment Dispersion Preparation Example 1 with the exception of not adding compound (C-1) having an azo skeleton structure.

Reference Magenta Pigment Dispersion Preparation Example 2

Reference magenta pigment dispersions (Dis-M49) and (Dis-M50) were respectively obtained by respectively carrying out the same procedure as the above-mentioned Magenta Pigment Dispersion Preparation Example 3 with the exception of not adding compound (C-1) having an azo skeleton structure.

Reference Magenta Pigment Dispersion Preparation Example 3

A reference magenta pigment dispersion (Dis-M51) was obtained by carrying out the same procedure as the above-mentioned Magenta Pigment Dispersion Preparation Example 4 with the exception of not adding compound (C-1) having an azo skeleton structure.

Comparative Magenta Pigment Dispersion Preparation Example 1

Comparative magenta pigment dispersions (Dis-M52) to (Dis-M54) were respectively obtained by respectively carrying out the same procedure as the above-mentioned Magenta Pigment Dispersion Preparation Example 1 with the exception of changing the compound (C-1) having an azo skeleton structure to 0.216 parts of pigment (C-45) having an azo skeleton and 1.8 parts of a binder resin in the form of an acrylic acid-butyl acrylate (copolymer ratio (molar ratio)=1/12) random copolymer (Mw=26,290) described in Patent Document 1 (Comparative Compound 1), styrene-butyl acrylate (copolymer ratio (molar ratio)=95/5) block copolymer (Mw=9,718) described in Patent Document 2 (Comparative Compound 2), or compound (C-46) described in Patent Document 3 (Comparative Compound 3).

Example 4

Cyan pigment dispersions of the present invention were prepared according to the methods indicated below.

Cyan Pigment Dispersion Preparation Example 1

18.0 parts of a cyan pigment in the form of C.I. Pigment Blue 15:3 (cyan pigment a) represented by the formula (Pig-G), 1.80 parts of the above-mentioned compound (C-1) having an azo skeleton structure, 180 parts of a non-water-soluble solvent in the form of styrene and 130 parts of glass beads (φ1 mm) were mixed and dispersed for 3 hours with an attritor (Nippon Coke & Engineering Co., Ltd.) followed by filtering with a mesh to obtain a cyan pigment dispersion (Dis-C1).

[Chemical Formula 39]

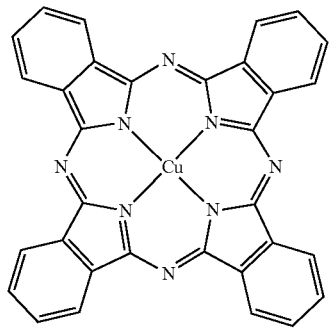

(Pig-G)

Cyan Pigment Dispersion Preparation Example 2

Cyan pigment dispersions (Dis-C2) to (Dis-C44) were respectively obtained by respectively carrying out the same procedure as the above-mentioned Cyan Pigment Dispersion Preparation Example 1 with the exception of changing the compound (C-1) having an azo skeleton structure to compounds (C-2) to (C-44) having an azo skeleton structure.

Cyan Pigment Dispersion Preparation Example 3

Cyan pigment dispersions (Dis-C45) and (Dis-C46) were obtained by respectively carrying out the same procedure as the above-mentioned Cyan Pigment Dispersion Preparation Example 1 with the exception of changing C.I. Pigment Blue 15:3 (cyan pigment a) represented by formula (Pig-G) to C.I. Pigment Blue 16 (cyan pigment b) represented by formula (Pig-H) or C.I. Pigment Blue 17:1 (cyan pigment c) represented by formula (Pig-I).

[Chemical Formula 40]

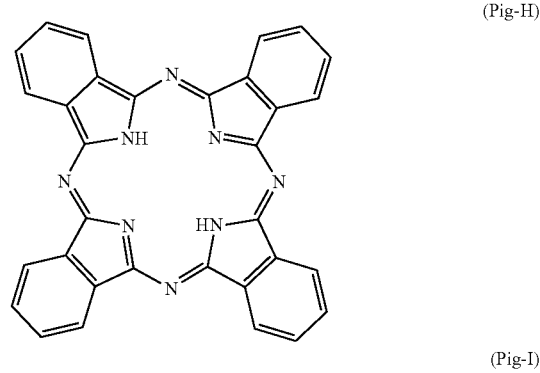

(Pig-H)

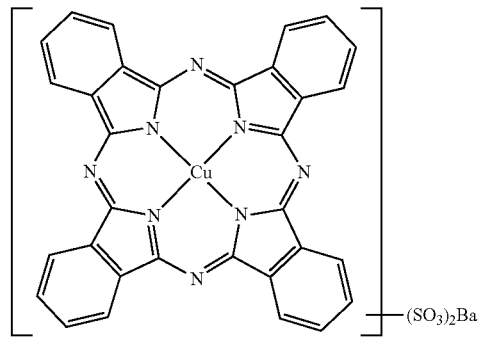

(Pig-I)

Cyan Pigment Dispersion Preparation Example 4

42.0 parts of cyan pigment in the form of C.I. Pigment Blue 15:3 (cyan pigment a) represented by formula (Pig-G) and 4.2 parts of a pigment dispersing agent in the form of compound (C-1) having an azo skeleton structure were dry-mixed with the NHS-0 Hybridization System (Nara Machinery Co., Ltd.) to prepare a pigment composition. 19.8 parts of the resulting pigment composition were mixed with 180 parts of styrene and 130 parts of glass beads (diameter: 1 mm) followed by dispersing for 1 hour with a paint shaker (Toyo Seiki Seisaku-sho, Ltd.) and filtering with a mesh to obtain a cyan pigment dispersion (Dis-C47).

Comparative Example 4

Cyan pigment dispersions to serve as reference values for evaluation and cyan pigment dispersions for comparison were prepared according to the methods indicated below.

Reference Cyan Pigment Dispersion Preparation Example 1

A reference cyan pigment dispersion (Dis-C48) was obtained by carrying out the same procedure as the above-mentioned Cyan Pigment Dispersion Preparation Example 1 with the exception of not adding compound (C-1) having an azo skeleton structure.

Reference Cyan Pigment Dispersion Preparation Example 2

Reference cyan pigment dispersions (Dis-C49) and (Dis-050) were respectively obtained by respectively carrying out the same procedure as the above-mentioned Cyan Pigment Dispersion Preparation Example 3 with the exception of not adding compound (C-1) having an azo skeleton structure.

Reference Cyan Pigment Dispersion Preparation Example 3

A reference cyan pigment dispersion (Dis-051) was obtained by carrying out the same procedure as the above-mentioned Cyan Pigment Dispersion Preparation Example 4 with the exception of not adding compound (C-1) having an azo skeleton structure.

Comparative Cyan Pigment Dispersion Preparation Example 1

Comparative cyan pigment dispersions (Dis-052) to (Dis-054) were respectively obtained by respectively carrying out the same procedure as the above-mentioned Cyan Pigment Dispersion Preparation Example 1 with the exception of changing the compound (C-1) having an azo skeleton structure to 0.216 parts of pigment (C-45) having an azo skeleton and 1.8 parts of a binder resin in the form of an acrylic acid-butyl acrylate (copolymer ratio (molar ratio)=1/12) random copolymer (Mw=26,290) described in Patent Document 1 (Comparative Compound 1), styrene-butyl acrylate (copolymer ratio (molar ratio)=95/5) block copolymer (Mw=9,718) described in Patent Document 2 (Comparative Compound 2), or compound (C-46) described in Patent Document 3 (Comparative Compound 3).

Example 5

Black pigment dispersions of the present invention were prepared according to the methods indicated below.

Black Pigment Dispersion Preparation Example 1

30.0 parts of black pigment in the form of carbon black (specific surface area=65 m$^2$/g, average particle diameter=30 nm, pH=9.0) (black pigment a), 3.0 parts of the above-mentioned compound (C-1) having an azo skeleton structure, 150 parts of a non-water-soluble solvent in the form of styrene, and 130 parts of glass beads (φ1 mm) were mixed and dispersed for 3 hours with an attritor (Nippon Coke & Engineering Co., Ltd.) followed by filtering with a mesh to obtain a black pigment dispersion (Dis-Bk1).

Black Pigment Dispersion Preparation Example 2

Black pigment dispersions (Dis-Bk2) to (Dis-Bk44) were respectively obtained by respectively carrying out the same procedure as the above-mentioned Black Pigment Dispersion Preparation Example 1 with the exception of changing the compound (C-1) having an azo skeleton structure to compounds (C-2) to (C-44) having an azo skeleton structure.

Black Pigment Dispersion Preparation Example 3

Black pigment dispersions (Dis-Bk45) and (Dis-Bk46) were obtained by respectively carrying out the same procedure as the above-mentioned Black Pigment Dispersion Preparation Example 1 with the exception of changing carbon black (specific surface area=65 m$^2$/g, average particle diameter=30 nm, pH=9.0) (black pigment a) to carbon black (specific surface area=77 m$^2$/g, average particle diameter=28 nm, pH=7.5) (black pigment b) or carbon black (specific surface area=370 m$^2$/g, average particle diameter=13 nm, pH=3.0) (black pigment c).

Black Pigment Dispersion Preparation Example 4

42.0 parts of black pigment in the form of carbon black (specific surface area=65 m$^2$/g, average particle diameter=30 nm, pH=9.0) (black pigment a) and 4.2 parts of a pigment dispersing agent in the form of compound (C-1) having an azo skeleton structure were dry-mixed with the NHS-0 Hybridization System (Nara Machinery Co., Ltd.) to prepare a pigment composition. 33.0 parts of the resulting pigment composition were mixed with 150 parts of styrene and 130 parts of glass beads (diameter: 1 mm) followed by dispersing for 1 hour with a paint shaker (Toyo Seiki Seisaku-sho, Ltd.) and filtering with a mesh to obtain a cyan pigment dispersion (Dis-Bk47).

Comparative Example 5

Black pigment dispersions to serve as reference values for evaluation and black pigment dispersions for comparison were prepared according to the methods indicated below.

Reference Black Pigment Dispersion Preparation Example 1

A reference black pigment dispersion (Dis-Bk48) was obtained by carrying out the same procedure as the above-mentioned Black Pigment Dispersion Preparation Example 1 with the exception of not adding compound (C-1) having an azo skeleton structure.

Reference Black Pigment Dispersion Preparation Example 2

Reference black pigment dispersions (Dis-Bk49) and (Dis-Bk50) were respectively obtained by respectively carrying out the same procedure as the above-mentioned Black Pigment Dispersion Preparation Example 3 with the exception of not adding compound (C-1) having an azo skeleton structure.

Reference Black Pigment Dispersion Preparation Example 3

A reference black pigment dispersion (Dis-Bk51) was obtained by carrying out the same procedure as the above-mentioned Black Pigment Dispersion Preparation Example 4 with the exception of not adding compound (C-1) having an azo skeleton structure.

Comparative Black Pigment Dispersion Preparation Example 1

Comparative black pigment dispersions (Dis-Bk52) to (Dis-Bk54) were respectively obtained by respectively carrying out the same procedure as the above-mentioned Black Pigment Dispersion Preparation Example 1 with the exception of changing the compound (C-1) having an azo skeleton structure to 0.361 parts of pigment (C-45) having an azo skeleton and 3.0 parts of a binder resin in the form of an acrylic acid-butyl acrylate (copolymer ratio (molar ratio)=1/12) random copolymer (Mw=26,290) described in Patent Document 1 (Comparative Compound 1), styrene-butyl acrylate (copolymer ratio (molar ratio)=95/5) block copolymer (Mw=9,718) described in Patent Document 2 (Comparative Compound 2), or compound (C-46) described in Patent Document 3 (Comparative Compound 3).

Example 6

The above-mentioned pigment dispersions of each color were evaluated according to the methods indicated below.
<Evaluation of Pigment Dispersibility>
The pigment dispersibility of the compound having an azo skeleton structure of the present invention was evaluated by carrying out a coated film gloss test using the above-mentioned yellow pigment dispersions (Dis-Y1) to (Dis-Y47), the above-mentioned magenta pigment dispersions (Dis-M1) to (Dis-M47), the above-mentioned cyan pigment dispersions (Dis-C1) to (Dis-C47) and the above-mentioned black pigment dispersions (Dis-Bk1) to (Dis-Bk47). Namely, each pigment dispersion was aspirated with a dropper, placed on a straight line on the upper portion of Super Art Paper (SA Kanefuji, 180 kg, 80×160, Oji Paper Co., Ltd.), evenly coated on the art paper using a wiper (#10), measuring the gloss after drying (angle of reflection: 75°) with the VG2000 Gloss Meter (Nippon Denshoku Industries Co., Ltd.), and evaluating based on the criteria indicated below. Furthermore, smoothness of the coated film improves and gloss improves the more finely the pigment is dispersed.

Gloss value improvement rates of the above-mentioned yellow pigment dispersions (Dis-Y1) to (Dis-Y44) were evaluated using the gloss value of the reference yellow pigment dispersion (Dis-Y48) as a reference value. Gloss value improvement rate of the above-mentioned yellow pigment dispersion (Dis-Y45) was evaluated using the gloss value of the reference yellow pigment dispersion (Dis-Y49) as a reference value. Gloss value improvement rate of the above-mentioned yellow pigment dispersion (Dis-Y46) was evaluated using the gloss value of the reference yellow pigment dispersion (Dis-Y50) as a reference value. Gloss value improvement rate of the above-mentioned yellow pigment dispersion (Dis-Y47) was evaluated using the gloss value of the reference yellow pigment dispersion (Dis-Y51) as a reference value.

Furthermore, gloss value improvement rates of the above-mentioned magenta pigment dispersions (Dis-M1) to (Dis-M44) were evaluated using the gloss value of the reference magenta pigment dispersion (Dis-M48) as a reference value. Gloss value improvement rate of the above-mentioned magenta pigment dispersion (Dis-M45) was evaluated using the gloss value of the reference magenta pigment dispersion (Dis-M49) as a reference value. Gloss value improvement rate of the above-mentioned magenta pigment dispersion (Dis-M46) was evaluated using the gloss value of the reference magenta pigment dispersion (Dis-M50) as a reference value. Gloss value improvement rate of the above-mentioned magenta pigment dispersion (Dis-M47) was evaluated using the gloss value of the reference magenta pigment dispersion (Dis-M51) as a reference value.

Gloss value improvement rates of the above-mentioned cyan pigment dispersions (Dis-C1) to (Dis-C44) were evaluated using the gloss value of the reference cyan pigment dispersion (Dis-C48) as a reference value. Gloss value improvement rate of the above-mentioned cyan pigment dispersion (Dis-C45) was evaluated using the gloss value of the reference cyan pigment dispersion (Dis-C49) as a reference value. Gloss value improvement rate of the above-mentioned cyan pigment dispersion (Dis-C46) was evaluated using the gloss value of the reference cyan pigment dispersion (Dis-050) as a reference value. Gloss value improvement rate of the above-mentioned cyan pigment dispersion (Dis-C47) was evaluated using the gloss value of the reference cyan pigment dispersion (Dis-051) as a reference value.

The following indicates the criteria used to evaluate the pigment dispersions of each color.
Yellow Pigment Dispersion Evaluation Criteria
A: Gloss value improvement rate of 20% or more
B: Gloss value improvement rate of 10% to less than 20%
C: Gloss value improvement rate of 0% to less than 10%
D: Decrease in gloss value
A gloss value improvement rate of 10% or more was judged to constitute favorable pigment dispersibility and be at a preferable level in terms of practical use.
Magenta Pigment Dispersion Evaluation Criteria
A: Gloss value improvement rate of 35% or more
B: Gloss value improvement rate of 20% to less than 35%
C: Gloss value improvement rate of 5% to less than 20%
D: Gloss value improvement rate of less than 5%
A gloss value improvement rate of 20% or more was judged to constitute favorable pigment dispersibility and be at a preferable level in terms of practical use.
Cyan Pigment Dispersion Evaluation Criteria
A: Gloss value improvement rate of 25% or more
B: Gloss value improvement rate of 15% to less than 25%
C: Gloss value improvement rate of 5% to less than 15%
D: Gloss value improvement rate of less than 5%
A gloss value improvement rate of 15% or more was judged to constitute favorable pigment dispersibility and be at a preferable level in terms of practical use.
Black Pigment Dispersion Evaluation Criteria
A: Gloss value of 80 or more
B: Gloss value of 50 to less than 80
C: Gloss value of 20 to less than 50
D: Gloss value of less than 20
A gloss value of 50 or more was judged to constitute favorable pigment dispersibility and be at a preferable level in terms of practical use.

Comparative Example 6

Gloss was evaluated using the same method as Example 6 for comparative yellow pigment dispersions (Dis-Y52) to (Dis-Y54), comparative magenta pigment dispersions (Dis-M52) to (Dis-M54), comparative cyan pigment dispersions (Dis-052) to (Dis-054) and comparative black pigment dispersions (Dis-Bk52) to (Dis-Bk54).

Furthermore, gloss value improvement rates of the above-mentioned comparative yellow pigment dispersions (Dis-Y52) to (Dis-Y54) were evaluated using the gloss value of the above-mentioned reference yellow pigment dispersion (Dis-Y48) as a reference value. Gloss value improvement rates of the above-mentioned comparative magenta pigment dispersions (Dis-M52) to (Dis-M54) were evaluated using the gloss value of the above-mentioned reference magenta pigment dispersion (Dis-M48) as a reference value. Gloss value improvement rates of the above-mentioned comparative cyan pigment dispersions (Dis-052) to (Dis-054) were evaluated using the gloss value of the above-mentioned reference cyan pigment dispersion (Dis-C48) as a reference value.

The results of evaluating the above-mentioned yellow pigment dispersions, the above-mentioned magenta pigment dispersions, the above-mentioned cyan pigment dispersions and the above-mentioned black pigment dispersions are shown in Table 3.

TABLE 3

Evaluation Results of Pigment Dispersions

| Compound no. | Yellow Dispersion | Gloss (gloss value) | Magenta Dispersion | Gloss (gloss value) | Cyan Dispersion | Gloss (gloss value) | Black Dispersion | Gloss (gloss value) |
|---|---|---|---|---|---|---|---|---|
| C-1 | Dis-Y 1 | A(70) | Dis-M 1 | A(66) | Dis-C 1 | A(60) | Dis-Bk 1 | A(109) |
| C-2 | Dis-Y 2 | A(72) | Dis-M 2 | A(66) | Dis-C 2 | A(62) | Dis-Bk 2 | A(107) |
| C-3 | Dis-Y 3 | A(71) | Dis-M 3 | A(68) | Dis-C 3 | A(60) | Dis-Bk 3 | A(110) |
| C-4 | Dis-Y 4 | A(70) | Dis-M 4 | A(65) | Dis-C 4 | A(59) | Dis-Bk 4 | A(115) |
| C-5 | Dis-Y 5 | A(71) | Dis-M 5 | A(66) | Dis-C 5 | A(61) | Dis-Bk 5 | A(109) |
| C-6 | Dis-Y 6 | A(72) | Dis-M 6 | A(65) | Dis-C 6 | A(62) | Dis-Bk 6 | A(114) |
| C-7 | Dis-Y 7 | A(70) | Dis-M 7 | A(67) | Dis-C 7 | A(59) | Dis-Bk 7 | A(110) |
| C-8 | Dis-Y 8 | A(69) | Dis-M 8 | A(68) | Dis-C 8 | A(60) | Dis-Bk 8 | A(115) |
| C-9 | Dis-Y 9 | A(70) | Dis-M 9 | A(69) | Dis-C 9 | A(62) | Dis-Bk 9 | A(92) |
| C-10 | Dis-Y 10 | A(71) | Dis-M 10 | A(65) | Dis-C 10 | A(61) | Dis-Bk 10 | A(102) |
| C-11 | Dis-Y 11 | A(70) | Dis-M 11 | A(65) | Dis-C 11 | A(61) | Dis-Bk 11 | A(115) |
| C-12 | Dis-Y 12 | A(72) | Dis-M 12 | A(64) | Dis-C 12 | A(60) | Dis-Bk 12 | B(78) |
| C-13 | Dis-Y 13 | A(70) | Dis-M 13 | A(67) | Dis-C 13 | A(60) | Dis-Bk 13 | A(103) |
| C-14 | Dis-Y 14 | A(70) | Dis-M 14 | A(66) | Dis-C 14 | A(63) | Dis-Bk 14 | A(109) |
| C-15 | Dis-Y 15 | A(71) | Dis-M 15 | A(69) | Dis-C 15 | A(62) | Dis-Bk 15 | A(100) |
| C-16 | Dis-Y 16 | A(69) | Dis-M 16 | A(68) | Dis-C 16 | A(59) | Dis-Bk 16 | A(115) |
| C-17 | Dis-Y 17 | A(70) | Dis-M 17 | A(67) | Dis-C 17 | A(60) | Dis-Bk 17 | A(102) |
| C-18 | Dis-Y 18 | A(71) | Dis-M 18 | A(66) | Dis-C 18 | A(62) | Dis-Bk 18 | A(114) |
| C-19 | Dis-Y 19 | A(70) | Dis-M 19 | A(68) | Dis-C 19 | A(60) | Dis-Bk 19 | A(103) |
| C-20 | Dis-Y 20 | A(71) | Dis-M 20 | A(68) | Dis-C 20 | A(60) | Dis-Bk 20 | A(109) |
| C-21 | Dis-Y 21 | A(69) | Dis-M 21 | A(65) | Dis-C 21 | A(61) | Dis-Bk 21 | A(100) |
| C-22 | Dis-Y 22 | A(70) | Dis-M 22 | A(66) | Dis-C 22 | A(62) | Dis-Bk 22 | A(109) |
| C-23 | Dis-Y 23 | A(72) | Dis-M 23 | A(67) | Dis-C 23 | A(60) | Dis-Bk 23 | A(114) |
| C-24 | Dis-Y 24 | A(70) | Dis-M 24 | A(64) | Dis-C 24 | A(61) | Dis-Bk 24 | A(113) |
| C-25 | Dis-Y 25 | A(70) | Dis-M 25 | A(68) | Dis-C 25 | A(62) | Dis-Bk 25 | A(112) |
| C-26 | Dis-Y 26 | A(71) | Dis-M 26 | A(67) | Dis-C 26 | A(60) | Dis-Bk 26 | A(109) |
| C-27 | Dis-Y 27 | A(70) | Dis-M 27 | A(68) | Dis-C 27 | A(58) | Dis-Bk 27 | A(115) |
| C-28 | Dis-Y 28 | A(71) | Dis-M 28 | A(67) | Dis-C 28 | A(61) | Dis-Bk 28 | A(118) |
| C-29 | Dis-Y 29 | A(69) | Dis-M 29 | A(65) | Dis-C 29 | A(60) | Dis-Bk 29 | A(92) |
| C-30 | Dis-Y 30 | A(70) | Dis-M 30 | A(64) | Dis-C 30 | A(59) | Dis-Bk 30 | A(100) |
| C-31 | Dis-Y 31 | A(70) | Dis-M 31 | A(64) | Dis-C 31 | A(58) | Dis-Bk 31 | A(110) |
| C-32 | Dis-Y 32 | A(69) | Dis-M 32 | A(65) | Dis-C 32 | A(58) | Dis-Bk 32 | A(96) |
| C-33 | Dis-Y 33 | A(70) | Dis-M 33 | A(64) | Dis-C 33 | A(59) | Dis-Bk 33 | A(85) |
| C-34 | Dis-Y 34 | A(69) | Dis-M 34 | A(65) | Dis-C 34 | A(58) | Dis-Bk 34 | A(97) |
| C-35 | Dis-Y 35 | A(70) | Dis-M 35 | A(64) | Dis-C 35 | A(59) | Dis-Bk 35 | A(98) |
| C-36 | Dis-Y 36 | A(69) | Dis-M 36 | A(65) | Dis-C 36 | A(60) | Dis-Bk 36 | A(95) |
| C-37 | Dis-Y 37 | A(70) | Dis-M 37 | A(64) | Dis-C 37 | A(58) | Dis-Bk 37 | A(96) |
| C-38 | Dis-Y 38 | A(69) | Dis-M 38 | A(65) | Dis-C 38 | A(59) | Dis-Bk 38 | A(102) |
| C-39 | Dis-Y 39 | A(70) | Dis-M 39 | A(66) | Dis-C 39 | A(60) | Dis-Bk 39 | A(92) |
| C-40 | Dis-Y 40 | A(69) | Dis-M 40 | A(64) | Dis-C 40 | A(58) | Dis-Bk 40 | A(85) |
| C-41 | Dis-Y 41 | A(69) | Dis-M 41 | A(64) | Dis-C 41 | A(61) | Dis-Bk 41 | A(96) |
| C-42 | Dis-Y 42 | A(72) | Dis-M 42 | A(68) | Dis-C 42 | A(62) | Dis-Bk 42 | A(112) |
| C-43 | Dis-Y 43 | A(73) | Dis-M 43 | A(66) | Dis-C 43 | A(61) | Dis-Bk 43 | A(110) |
| C-44 | Dis-Y 44 | A(72) | Dis-M 44 | A(67) | Dis-C 44 | A(62) | Dis-Bk 44 | A(112) |
| C-1 | Dis-Y 45 | A(73) | Dis-M 45 | A(58) | Dis-C 45 | B(74) | Dis-Bk 45 | B(64) |
| C-1 | Dis-Y 46 | A(71) | Dis-M 46 | A(87) | Dis-C 46 | B(73) | Dis-Bk 46 | A(98) |
| C-1 | Dis-Y 47 | A(72) | Dis-M 47 | A(70) | Dis-C 47 | A(62) | Dis-Bk 47 | A(114) |
| none | Dis-Y 48 | (57) | Dis-M 48 | (47) | Dis-C 48 | (46) | Dis-Bk 48 | D(7) |
| none | Dis-Y 49 | (60) | Dis-M 49 | (30) | Dis-C 49 | (63) | Dis-Bk 49 | C(42) |
| none | Dis-Y 50 | (53) | Dis-M 50 | (56) | Dis-C 50 | (63) | Dis-Bk 50 | D(2) |
| none | Dis-Y 51 | (55) | Dis-M 51 | (48) | Dis-C 51 | (44) | Dis-Bk 51 | D(5) |
| C-45 | Dis-Y 52 | B(66) | Dis-M 52 | A(73) | Dis-C 52 | D(48) | Dis-Bk 52 | D(17) |
| Comparative Compound 1 | | | | | | | | |
| Comparative Compound 2 | Dis-Y 53 | C(59) | Dis-M 53 | C(56) | Dis-C 53 | D(47) | Dis-Bk 53 | D(6) |
| Comparative Compound 3 | Dis-Y 54 | B(61) | Dis-M 54 | A(66) | Dis-C 54 | B(53) | Dis-Bk 54 | A(105) |

Example 7

Next, yellow toners were produced by the suspension polymerization method according to the methods indicated below.

Yellow Toner Production Example 1

Preparation of Aqueous Medium 710 parts of ion exchange water and 450 parts of a 0.1 mol/l aqueous $Na_3PO_4$ solution were added to a 2-liter, 4-mouth flask equipped with a T. K. Homo Mixer high-speed stirring apparatus (Primix Corp.) followed by adjusting the rotating speed to 12,000 rpm and warming to 60° C. 68 parts of a 1.0 mol/l aqueous $CaCl_2$ solution were gradually added thereto to prepare an aqueous medium containing a slightly water-soluble dispersion stabilizer in the form of $Ca_3(PO_4)_2$.

(Suspension Polymerization Step)

Next, the following composition was warmed to 60° C. and uniformly dissolved and dispersed at 5,000 rpm using the T. K. Homo Mixer high-speed stirring apparatus (Primix Corp.).

Yellow pigment dispersion (Dis-Y1): 132 parts
Styrene monomer: 46 parts
n-butylacrylate monomer: 34 parts
Polar resin (saturated polyester resin (terephthalic acid-propylene oxide-modified bisphenol A, acid value: 15 mg KOH/g, peak molecular weight: 6,000)): 10 parts
Ester wax (maximum endothermic peak as determined by DSC measurement=70° C., Mn=704): 25 parts
Aluminum salicylate compound (trade name: Bondron E-108, Orient Chemical Industries Co., Ltd.): 2 parts
Divinylbenzene monomer: 0.1 part 10 parts of a polymerization initiator in the form of 2,2'-azobis(2,4-dimethylvaleronitrile) were added thereto followed by adding to the above-mentioned aqueous medium and granulating for 15 minutes while maintaining at a rotating speed of 12,000 rpm. After subsequently changing the stirrer from a high-speed stirrer to a propeller stirring vane and continuing polymerization for 5 hours at a liquid temperature of 60° C., the liquid temperature was raised to 80° C. followed by continuing polymerization for 8 hours. Following completion of the polymerization reaction, residual monomer was distilled off under reduced pressure at 80° C. followed by cooling to 30° C. to obtain a dispersion of polymer fine particles.

(Washing and Dehydration Step)

The resulting dispersion of polymer fine particles was transferred to a washing container followed by the addition of dilute hydrochloric acid while stirring, stirring for 2 hours at pH 1.5 and dissolving a phosphoric acid and calcium compound containing $Ca_3(PO_4)_2$ followed by solid-liquid separation with a filter to obtain polymer fine particles. The polymer fine particles were placed in water and stirred to again form a dispersion followed by solid-liquid separation with a filter. Re-dispersion of the polymer fine particles in water and solid-liquid separation were repeatedly carried out until the phosphoric acid and calcium compound containing $Ca_3(PO_4)_2$ was adequately removed. Subsequently, polymer fine particles obtained following the final solid-liquid separation were adequately dried with a dryer to obtain toner particles.

1.0 part of hydrophobic silica fine powder surface-treated with hexamethyldisilazane (number average primary particle diameter: 7 nm), 0.15 parts of rutile-type titanium oxide fine powder (number average primary particle diameter: 45 nm) and 0.5 parts of rutile-type titanium oxide fine powder (number average primary particle diameter: 200 nm) with respect to 100 parts of the resulting toner particles were dry-mixed for 5 minutes with a Henschel mixer (Nippon Coke & Engineering Co., Ltd.) to obtain a yellow toner (Tnr-Y1).

Yellow Toner Production Example 2

Yellow toners (Tnr-Y2) to (Tnr-Y44) of the present invention were obtained by carrying out the same procedure as the above-mentioned Yellow Toner Production Example 1 with the exception of changing the yellow pigment dispersion (Dis-Y1) to the above-mentioned yellow pigment dispersions (Dis-Y2) to (Dis-Y44) respectively.

Yellow Toner Production Example 3

Yellow toners (Tnr-Y45) and (Tnr-Y46) were obtained by respectively carrying out the same procedure as the above-mentioned Yellow Toner Production Example 1 with the exception of changing the yellow pigment dispersion (Dis-Y1) to the above-mentioned yellow pigment dispersion (Dis-Y45) or (Dis-Y46).

Comparative Example 7

Yellow toners serving as reference values during evaluation and comparative yellow toners were produced according to the methods indicated below for the yellow toner of the present invention produced in the above-mentioned Example 7.

Reference Yellow Toner Production Example 1

A reference yellow toner (Tnr-Y47) was obtained by carrying out the same procedure as the above-mentioned Yellow Toner Production Example 1 with the exception of changing the yellow pigment dispersion (Dis-Y1) to yellow pigment dispersion (Dis-Y48).

Reference Yellow Toner Production Example 2

Reference yellow toners (Tnr-Y48) and (Tnr-Y49) were obtained by carrying out the same procedure as the above-mentioned Yellow Toner Production Example 1 with the exception of changing the yellow pigment dispersion (Dis-Y1) to yellow pigment dispersion (Dis-Y49) or (Dis-Y50).

Comparative Yellow Toner Production Example 1

Comparative yellow toners (Tnr-Y50) to (Tnr-Y52) were obtained by carrying out the same procedure as the above-mentioned Yellow Toner Production Example 1 with the exception of changing the above-mentioned yellow pigment dispersion (Dis-Y1) to yellow pigment dispersions (Dis-Y52) to (Dis-Y54) respectively.

Example 8

Next, magenta toners were produced by the suspension polymerization method according to the methods indicated below.

Magenta Toner Production Example 1

Magenta toner (Tnr-M1) was obtained by carrying out the same procedure as the above-mentioned Yellow Toner Production Example 1 with the exception of changing the yellow pigment dispersion (Dis-Y1) to the magenta pigment dispersion (Dis-M1).

Magenta Toner Production Example 2

Magenta toners (Tnr-M2) to (Tnr-M44) of the present invention were obtained by carrying out the same procedure as the above-mentioned Magenta Toner Production Example 1 with the exception of changing the magenta pigment dispersion (Dis-M1) to the above-mentioned magenta pigment dispersions (Dis-M2) to (Dis-M44) respectively.

Magenta Toner Production Example 3

Magenta toners (Tnr-M45) and (Tnr-M46) were obtained by respectively carrying out the same procedure as the above-mentioned Magenta Toner Production Example 1 with the exception of changing the magenta pigment dispersion (Dis-M1) to the magenta pigment dispersion (Dis-M45) or (Dis-M46).

Comparative Example 8

Reference Magenta Toner Production Example 1

A reference magenta toner (Tnr-M47) was obtained by carrying out the same procedure as the above-mentioned Magenta Toner Production Example 1 with the exception of changing the magenta pigment dispersion (Dis-M1) to magenta pigment dispersion (Dis-M48).

Reference Magenta Toner Production Example 2

Reference magenta toners (Tnr-M48) and (Tnr-M49) were obtained by carrying out the same procedure as the above-mentioned Magenta Toner Production Example 1 with the exception of changing the magenta pigment dispersion (Dis-M1) to magenta pigment dispersion (Dis-M49) or (Dis-M50).

Comparative Magenta Toner Production Example 1

Comparative magenta toners (Tnr-M50) to (Tnr-M52) were obtained by carrying out the same procedure as the above-mentioned Magenta Toner Production Example 1 with the exception of changing the above-mentioned magenta pigment dispersion (Dis-M1) to magenta pigment dispersions (Dis-M52) to (Dis-M54) respectively.

Example 9

Next, cyan toners were produced by the suspension polymerization method according to the methods indicated below.

Cyan Toner Production Example 1

Cyan toner (Tnr-C1) was obtained by carrying out the same procedure as the above-mentioned Yellow Toner Production Example 1 with the exception of changing the yellow pigment dispersion (Dis-Y1) to the cyan pigment dispersion (Dis-C1).

Cyan Toner Production Example 2

Cyan toners (Tnr-C2) to (Tnr-C44) of the present invention were obtained by carrying out the same procedure as the above-mentioned Cyan Toner Production Example 1 with the exception of changing the cyan pigment dispersion (Dis-C1) to the above-mentioned cyan pigment dispersions (Dis-C2) to (Dis-C44) respectively.

Cyan Toner Production Example 3

Cyan toners (Tnr-C45) and (Tnr-C46) were obtained by respectively carrying out the same procedure as the above-mentioned Cyan Toner Production Example 1 with the exception of changing the cyan pigment dispersion (Dis-C1) to the cyan pigment dispersion (Dis-C45) or (Dis-C46).

Comparative Example 9

Reference Cyan Toner Production Example 1

A reference cyan toner (Tnr-C47) was obtained by carrying out the same procedure as the above-mentioned Cyan Toner Production Example 1 with the exception of changing the cyan pigment dispersion (Dis-C1) to cyan pigment dispersion (Dis-C48).

Reference Cyan Toner Production Example 2

Reference cyan toners (Tnr-C48) and (Tnr-C49) were obtained by carrying out the same procedure as the above-mentioned Cyan Toner Production Example 1 with the exception of changing the cyan pigment dispersion (Dis-C1) to cyan pigment dispersion (Dis-C49) or (Dis-O50).

Comparative Cyan Toner Production Example 1

Comparative cyan toners (Tnr-O50) to (Tnr-O52) were obtained by carrying out the same procedure as the above-mentioned Cyan Toner Production Example 1 with the exception of changing the above-mentioned cyan pigment dispersion (Dis-C1) to cyan pigment dispersions (Dis-O52) to (Dis-O54) respectively.

Example 10

Next, black toners were produced by the suspension polymerization method according to the methods indicated below.

Black Toner Production Example 1

Black toner (Tnr-Bk1) was obtained by carrying out the same procedure as the above-mentioned Yellow Toner Production Example 1 with the exception of changing the yellow pigment dispersion (Dis-Y1) to the black pigment dispersion (Dis-Bk1).

Black Toner Production Example 2

Black toners (Tnr-Bk2) to (Tnr-Bk44) of the present invention were obtained by carrying out the same procedure as the above-mentioned Black Toner Production Example 1 with the exception of changing the black pigment dispersion (Dis-Bk1) to the above-mentioned black pigment dispersions (Dis-Bk2) to (Dis-Bk44) respectively.

Black Toner Production Example 3

Black toners (Tnr-Bk45) and (Tnr-Bk46) were obtained by respectively carrying out the same procedure as the above-mentioned Black Toner Production Example 1 with the exception of changing the black pigment dispersion (Dis-Bk1) to the black pigment dispersion (Dis-Bk45) or (Dis-Bk46).

Comparative Example 10

Reference Black Toner Production Example 1

A reference black toner (Tnr-Bk47) was obtained by carrying out the same procedure as the above-mentioned Cyan Toner Production Example 1 with the exception of changing the cyan pigment dispersion (Dis-C1) to black pigment dispersion (Dis-Bk48).

Reference Black Toner Production Example 2

Reference black toners (Tnr-Bk48) and (Tnr-Bk49) were obtained by carrying out the same procedure as the above-mentioned Black Toner Production Example 1 with the exception of changing the black pigment dispersion (Dis-Bk1) to black pigment dispersion (Dis-Bk49) or (Dis-Bk50).

Comparative Black Toner Production Example 1

Comparative black toners (Tnr-Bk50) to (Tnr-Bk52) were obtained by carrying out the same procedure as the above-mentioned Black Toner Production Example 1 with the exception of changing the above-mentioned black pigment dispersion (Dis-Bk1) to black pigment dispersions (Dis-Bk52) to (Dis-Bk54) respectively.

Example 11

Next, yellow toners were produced by the suspension granulation method according to the methods indicated below.

Yellow Toner Production Example 4

Preparation of Yellow Pigment Dispersion 180 parts of ethyl acetate, 12 parts of C.I. Pigment Yellow 155 (yellow pigment a), 1.2 parts of the above-mentioned compound (C-1) having an azo skeleton structure and 130 parts of glass beads (φ1 mm) were mixed and dispersed for 3 hours with an attritor (Nippon Coke & Engineering Co., Ltd.) followed by filtering with a mesh to obtain a yellow pigment dispersion.

(Mixing Step)

The following composition was dispersed for 24 hours with a ball mill to obtain 200 parts of a toner composition mixed liquid.
  Above-mentioned yellow pigment dispersion: 96.0 parts
  Polar resin (saturated polyester resin (polycondensate of propylene oxide-modified bisphenol A and phthalic acid, Tg=75.9° C., Mw=11,000, Mn=4,200, acid value=11 mg KOH/g)): 85.0 parts
  Hydrocarbon wax (Fischer-Tropsch wax, maximum endothermic peak as determined by DSC measurement=80° C., Mw=750): 9.0 parts
  Aluminum salicylate compound (trade name: Bondron E-108, Orient Chemical Industries Co., Ltd.): 2 parts
  Ethyl acetate (solvent): 10.0 parts
(Dispersion and Suspension Step)

The following composition was dispersed for 24 hours with a ball mill followed by carboxymethyl cellulose to obtain an aqueous medium.
  Calcium carbonate (coated with acrylic acid-based copolymer): 20.0 parts
  Carboxymethyl cellulose (Cerogen BS-H, Daiichi Kogyo Seiyaku Co., Ltd.): 0.5 parts
  Ion exchange water: 99.5 parts 1,200 parts of the aqueous medium were placed in a T. K. Homo Mixer high-speed stirring apparatus (Primix Corp.) followed by adding 1,000 parts of the above-mentioned toner composition mixed liquid while stirring with a rotor at a peripheral velocity of 20 m/sec and stirring for 1 minute while holding at a constant temperature of 25° C. to obtain a suspension.

(Solvent Removal Step)

The vapor phase above the liquid surface of the above-mentioned suspension was forcibly suctioned off using a blower while stirring 2,200 parts of the suspension at a peripheral velocity of 45 m/min with full zone blades (Kobelco Eco-Solutions Co., Ltd.) and holding at a constant liquid temperature of 40° C. to initiate removal of solvent. At that time, 75 parts of an ionic substance in the form of aqueous ammonium diluted to 1% were added 15 minutes after the start of solvent removal followed by adding 25 parts of the above-mentioned aqueous ammonia 1 hour after the start of solvent removal, adding 25 parts of the above-mentioned aqueous ammonia 2 hours after the start of solvent removal, and finally adding 25 parts of the above-mentioned aqueous ammonia 3 hours after the start of solvent removal to bring to a total added amount of 150 parts. Moreover, the liquid temperature was maintained constant for 17 hours from the start of solvent removal to obtain a toner dispersion in which solvent (ethyl acetate) had been removed from the suspended particles.

(Washing and Dehydration Step)

80 parts of 10 mol/L hydrochloric acid were added to 300 parts of the toner dispersion obtained in the solvent removal step, and after further subjecting to neutralization treatment with 0.1 mol/L aqueous sodium hydroxide solution, washing with ion exchange water by suction filtration was repeated four times to obtain a toner cake. The resulting toner cake was dried with a vacuum dryer and sized with a sieve having a pore size of 45 μm to obtain toner particles. A yellow toner (Tnr-Y53) was obtained by carrying out the same procedure as Yellow Toner Production Example 1 of Example 7 for the remainder of the procedure.

Yellow Toner Production Example 5

Yellow toners (Tnr-Y54) to (Tnr-Y96) of the present invention were obtained by carrying out the same procedure as the above-mentioned Yellow Toner Production Example 4 with the exception of changing the compound (C-1) having an azo skeleton structure to compounds (C-2) to (C-44) respectively.

Yellow Toner Production Example 6

Yellow toners (Tnr-Y97) and (Tnr-Y98) of the present invention were obtained by carrying out the same procedure as the above-mentioned Yellow Toner Production Example 4 with the exception of changing C.I. Pigment Yellow 155 represented by formula (Pig-A) (yellow pigment a) to C.I. Pigment Yellow 180 represented by formula (Pig-B) (yellow pigment b) or C.I. Pigment Yellow 185 represented by formula (Pig-C) (yellow pigment c).

Comparative Example 11

Yellow toners to serve as reference values for evaluation and yellow toners for comparison were prepared according to the methods indicated below.

Reference Yellow Toner Production Example 3

A reference yellow toner (Tnr-Y99) was obtained by carrying out the same procedure as the above-mentioned Yellow Toner Production Example 4 with the exception of not adding compound (C-1) having an azo skeleton structure.

Reference Yellow Toner Production Example 4

Reference yellow toners (Tnr-Y100) and (Tnr-Y101) were obtained by respectively carrying out the same procedure as the above-mentioned Yellow Toner Production Example 6 with the exception of not adding compound (C-1) having an azo skeleton structure.

Comparative Yellow Toner Production Example 2

Comparative yellow toners (Tnr-Y102) to (Tnr-Y104) were obtained by respectively carrying out the same procedure as the above-mentioned Yellow Toner Production Example 4 with the exception of changing the compound (C-1) having an azo skeleton structure to 0.265 parts of pigment (C-45) having an azo skeleton and 8.35 parts of a binder resin in the form of an acrylic acid-butyl acrylate (copolymer ratio (molar ratio)=1/12) random copolymer (Mw=26,290) described in Patent Document 1 (Comparative Compound 1), styrene-butyl acrylate (copolymer ratio (molar ratio)=95/5) block copolymer (Mw=9,718) described in Patent Document 2 (Comparative Compound 2), or compound (C-46) described in Patent Document 3 (Comparative Compound 3).

Example 12

Next, magenta toners were produced by the suspension granulation method according to the methods indicated below.

Magenta Toner Production Example 4

Magenta toner (Tnr-M53) of the present invention was obtained by carrying out the same procedure as the above-mentioned Yellow Toner Production Example 4 with the exception of changing C.I. Pigment Yellow 155 represented by formula (Pig-A) (yellow pigment a) to C.I. Pigment Red 122 represented by formula (Pig-D) (magenta pigment a).

Magenta Toner Production Example 5

Magenta toners (Tnr-M54) to (Tnr-M96) of the present invention were obtained by carrying out the same procedure as the above-mentioned Magenta Toner Production Example 4 with the exception of changing the compound (C-1) having an azo skeleton structure to compounds (C-2) to (C-44) respectively.

Magenta Toner Production Example 6

Magenta toners (Tnr-M97) and (Tnr-M98) of the present invention were obtained by carrying out the same procedure as the above-mentioned Magenta Toner Production Example 4 with the exception of changing C.I. Pigment Red 122 represented by formula (Pig-D) (magenta pigment a) to C.I. Pigment Red 255 represented by formula (Pig-E) (magenta pigment b) or C.I. Pigment Red 150 represented by formula (Pig-F) (magenta pigment c).

Comparative Example 12

Magenta toners to serve as reference values for evaluation and magenta toners for comparison were prepared according to the methods indicated below.

Reference Magenta Toner Production Example 3

A reference magenta toner (Tnr-M99) was obtained by carrying out the same procedure as the above-mentioned Magenta Toner Production Example 4 with the exception of not adding compound (C-1) having an azo skeleton structure.

Reference Magenta Toner Production Example 4

Reference magenta toners (Tnr-M100) and (Tnr-M101) were obtained by respectively carrying out the same procedure as the above-mentioned Magenta Toner Production Example 6 with the exception of not adding compound (C-1) having an azo skeleton structure.

Comparative Magenta Toner Production Example 2

Comparative magenta toners (Tnr-M102) to (Tnr-M104) were obtained by respectively carrying out the same procedure as the above-mentioned Magenta Toner Production Example 4 with the exception of changing the compound (C-1) having an azo skeleton structure to 0.265 parts of pigment (C-45) having an azo skeleton and 8.35 parts of a binder resin in the form of an acrylic acid-butyl acrylate (copolymer ratio (molar ratio)=1/12) random copolymer (Mw=26,290) described in Patent Document 1 (Comparative Compound 1), styrene-butyl acrylate (copolymer ratio (molar ratio)=95/5) block copolymer (Mw=9,718) described in Patent Document 2 (Comparative Compound 2), or compound (C-46) described in Patent Document 3 (Comparative Compound 3).

Example 13

Next, cyan toners were produced by the suspension granulation method according to the methods indicated below.

Cyan Toner Production Example 4

Cyan toner (Tnr-053) of the present invention was obtained by carrying out the same procedure as the above-mentioned Yellow Toner Production Example 4 with the exception of changing C.I. Pigment Yellow 155 represented by formula (Pig-A) (yellow pigment a) to C.I. Pigment Blue 15:3 represented by formula (Pig-G) (cyan pigment a).

Cyan Toner Production Example 5

Cyan toners (Tnr-054) to (Tnr-C96) of the present invention were obtained by carrying out the same procedure as the above-mentioned Cyan Toner Production Example 4 with the exception of changing the compound (C-1) having an azo skeleton structure to compounds (C-2) to (C-44) respectively.

Cyan Toner Production Example 6

Cyan toners (Tnr-C97) and (Tnr-C98) of the present invention were obtained by carrying out the same procedure as the above-mentioned Cyan Toner Production Example 4 with the exception of changing C.I. Pigment Blue 15:3 represented by formula (Pig-G) (cyan pigment a) to C.I. Pigment Blue 16 represented by formula (Pig-H) (cyan pigment b) or C.I. Pigment Blue 17:1 represented by formula (Pig-I) (cyan pigment c).

Comparative Example 13

Cyan toners to serve as reference values for evaluation and cyan toners for comparison were prepared according to the methods indicated below.

Reference Cyan Toner Production Example 3

A reference cyan toner (Tnr-C99) was obtained by carrying out the same procedure as the above-mentioned Cyan Toner Production Example 4 with the exception of not adding compound (C-1) having an azo skeleton structure.

Reference Cyan Toner Production Example 4

Reference cyan toners (Tnr-C100) and (Tnr-C101) were obtained by respectively carrying out the same procedure as the above-mentioned Cyan Toner Production Example 6 with the exception of not adding compound (C-1) having an azo skeleton structure.

Comparative Cyan Toner Production Example 2

Comparative Cyan toners (Tnr-C102) to (Tnr-C104) were obtained by respectively carrying out the same procedure as the above-mentioned Cyan Toner Production Example 4 with the exception of changing the compound (C-1) having an azo skeleton structure to 0.265 parts of pigment (C-45) having an azo skeleton and 8.35 parts of a binder resin in the form of an acrylic acid-butyl acrylate (copolymer ratio (molar ratio)=1/12) random copolymer (Mw=26,290) described in Patent Document 1 (Comparative Compound 1), styrene-butyl acrylate (copolymer ratio (molar ratio)=95/5) block copolymer (Mw=9,718) described in Patent Document 2 (Comparative Compound 2), or compound (C-46) described in Patent Document 3 (Comparative Compound 3).

Example 14

Next, black toners were produced by the suspension granulation method according to the methods indicated below.

Black Toner Production Example 4

Black toner (Tnr-Bk53) of the present invention was obtained by carrying out the same procedure as the above-mentioned Yellow Toner Production Example 4 with the exception of respectively changing the 12 parts of C.I. Pigment Yellow 155 represented by formula (Pig-A) (yellow pigment a) and 1.2 parts of the above-mentioned compound (C-1) having an azo skeleton structure to 30 parts of carbon black (specific surface area=65 m$^2$/g, average particle diameter=30 nm, pH=9.0) (black pigment a) and 3.0 parts of the above-mentioned compound (C-1) having an azo skeleton structure.

Black Toner Production Example 5

Black toners (Tnr-Bk54) to (Tnr-Bk96) of the present invention were obtained by carrying out the same procedure as the above-mentioned Black Toner Production Example 4 with the exception of changing the compound (C-1) having an azo skeleton structure to compounds (C-2) to (C-44) respectively.

Black Toner Production Example 6

Black toners (Tnr-Bk97) and (Tnr-Bk98) of the present invention were obtained by carrying out the same procedure as the above-mentioned Black Toner Production Example 4 with the exception of changing the carbon black (specific surface area=65 m$^2$/g, average particle diameter=30 nm, pH=9.0) (black pigment a) to carbon black (specific surface area=77 m$^2$/g, average particle diameter=28 nm, pH=7.5) (black pigment b) or carbon black (specific surface area=370 m$^2$/g, average particle diameter=13 nm, pH=3.0) (black pigment c).

Comparative Example 14

Black toners to serve as reference values for evaluation and black toners for comparison were prepared according to the methods indicated below.

Reference Black Toner Production Example 3

A reference black toner (Tnr-Bk99) was obtained by carrying out the same procedure as the above-mentioned Black Toner Production Example 4 with the exception of not adding compound (C-1) having an azo skeleton structure.

Reference Black Toner Production Example 4

Reference black toners (Tnr-Bk100) and (Tnr-Bk101) were obtained by respectively carrying out the same procedure as the above-mentioned Black Toner Production Example 6 with the exception of not adding compound (C-1) having an azo skeleton structure.

Comparative Black Toner Production Example 2

Comparative black toners (Tnr-Bk102) to (Tnr-Bk104) were obtained by respectively carrying out the same procedure as the above-mentioned Black Toner Production Example 4 with the exception of changing the compound (C-1) having an azo skeleton structure to 0.666 parts of pigment (C-45) having an azo skeleton and 13.9 parts of a binder resin in the form of an acrylic acid-butyl acrylate (copolymer ratio (molar ratio)=1/12) random copolymer (Mw=26,290) described in Patent Document 1 (Comparative Compound 1), styrene-butyl acrylate (copolymer ratio (molar ratio)=95/5) block copolymer (Mw=9,718) described in Patent Document 2 (Comparative Compound 2), or compound (C-46) described in Patent Document 3 (Comparative Compound 3).

Example 15

The yellow toner, magenta toner, cyan toner and black toner obtained in the present invention were evaluated according to the method indicated below.

<Evaluation of Toner Tinting Strength>

Image samples were output and compared and evaluated for image characteristics to be subsequently described using yellow toners (Tnr-Y1) to (Tnr-Y49) and (Tnr-Y53) to (Tnr-Y101), magenta toners (Tnr-M1) to (Tnr-M49) and (Tnr-M53) to (Tnr-M101), cyan toners (Tnr-C1) to (Tnr-C49) and (Tnr-053) to (Tnr-C101) and black toners (Tnr-Bk1) to (Tnr-Bk49) and (Tnr-Bk53) to (Tnr-Bk101). Furthermore, during comparison of image characteristics, a paper passing durability test was carried out using a modified LBP-5300 laser printer (Canon Inc.) for the image-forming apparatus (abbreviated as LBP). The modifications consisted of replacing the developing blade in the process cartridge (to be referred to as CRG) with an SUS blade having a thickness of 8 μm. In addition, a blade bias of −200 (V) was made to be able to be applied for the developing bias applied to the toner carrier in the form of a developing roll.

Solid images having a toner mounting amount of 0.5 mg/cm$^2$ were produced on transfer paper (75 g/m$^2$ paper) in an environment at normal temperature and normal humidity (N/N: 23.5° C., 60% RH). The density of the solid images was measured using a Spectrolino reflection densitometer (GretagMacbeth GmbH). Toner tinting strength was evaluated based on the improvement rate of solid image density.

The solid image density improvement rates of the above-mentioned yellow toners (Tnr-Y1) to (Tnr-Y44) were evaluated using the solid image density of the above-mentioned reference yellow toner (Tnr-Y47) as a reference value. The solid image density improvement rate of the above-mentioned yellow toner (Tnr-Y45) was evaluated using the solid image density of the above-mentioned reference yellow toner (Tnr-Y48) as a reference value. The solid image density improvement rate of the above-mentioned yellow toner (Tnr-Y46) was evaluated using the solid image density of the above-mentioned reference yellow toner (Tnr-Y49) as a reference value.

The solid image density improvement rates of the above-mentioned yellow toners (Tnr-Y53) to (Tnr-Y96) were evaluated using the solid image density of the above-mentioned reference yellow toner (Tnr-Y99) as a reference value. The solid image density improvement rate of the above-mentioned yellow toner (Tnr-Y97) was evaluated using the solid image density of the above-mentioned reference yellow toner (Tnr-Y100) as a reference value. The solid image density improvement rate of the above-mentioned yellow toner (Tnr-Y98) was evaluated using the solid image density of the above-mentioned reference yellow toner (Tnr-Y101) as a reference value.

The solid image density improvement rates of the above-mentioned magenta toners (Tnr-M1) to (Tnr-M44) were evaluated using the solid image density of the above-mentioned reference magenta toner (Tnr-M47) as a reference value. The solid image density improvement rate of the above-mentioned magenta toner (Tnr-M45) was evaluated using the solid image density of the above-mentioned reference magenta toner (Tnr-M48) as a reference value. The solid image density improvement rate of the above-mentioned magenta toner (Tnr-M46) was evaluated using the solid image density of the above-mentioned reference magenta toner (Tnr-M49) as a reference value.

The solid image density improvement rates of the above-mentioned magenta toners (Tnr-M53) to (Tnr-M96) were evaluated using the solid image density of the above-mentioned reference magenta toner (Tnr-M99) as a reference value. The solid image density improvement rate of the above-mentioned magenta toner (Tnr-M97) was evaluated using the solid image density of the above-mentioned reference magenta toner (Tnr-M100) as a reference value. The solid image density improvement rate of the above-mentioned magenta toner (Tnr-M98) was evaluated using the solid image density of the above-mentioned reference magenta toner (Tnr-M101) as a reference value.

The solid image density improvement rates of the above-mentioned cyan toners (Tnr-C1) to (Tnr-C44) were evaluated using the solid image density of the above-mentioned reference cyan toner (Tnr-C47) as a reference value. The solid image density improvement rate of the above-mentioned cyan toner (Tnr-C45) was evaluated using the solid image density of the above-mentioned reference cyan toner (Tnr-C48) as a reference value. The solid image density improvement rate of the above-mentioned cyan toner (Tnr-C46) was evaluated using the solid image density of the above-mentioned reference cyan toner (Tnr-C49) as a reference value.

The solid image density improvement rates of the above-mentioned cyan toners (Tnr-053) to (Tnr-C96) were evaluated using the solid image density of the above-mentioned reference cyan toner (Tnr-C99) as a reference value. The solid image density improvement rate of the above-mentioned cyan toner (Tnr-C97) was evaluated using the solid image density of the above-mentioned reference cyan toner (Tnr-C100) as a reference value. The solid image density improvement rate of the above-mentioned cyan toner (Tnr-C98) was evaluated using the solid image density of the above-mentioned reference cyan toner (Tnr-C101) as a reference value.

The solid image density improvement rates of the above-mentioned black toners (Tnr-Bk1) to (Tnr-Bk44) were evaluated using the solid image density of the above-mentioned reference black toner (Tnr-Bk47) as a reference value. The solid image density improvement rate of the above-mentioned black toner (Tnr-Bk45) was evaluated using the solid image density of the above-mentioned reference black toner (Tnr-Bk48) as a reference value. The solid image density improvement rate of the above-mentioned black toner (Tnr-Bk46) was evaluated using the solid image density of the above-mentioned reference black toner (Tnr-Bk49) as a reference value.

The solid image density improvement rates of the above-mentioned black toners (Tnr-Bk53) to (Tnr-Bk96) were evaluated using the solid image density of the above-mentioned reference black toner (Tnr-Bk99) as a reference value. The solid image density improvement rate of the above-mentioned black toner (Tnr-Bk97) was evaluated using the solid image density of the above-mentioned reference black toner (Tnr-Bk100) as a reference value. The solid image density improvement rate of the above-mentioned black toner (Tnr-Bk98) was evaluated using the solid image density of the above-mentioned reference black toner (Tnr-Bk101) as a reference value.

The following indicates the criteria used to evaluate the improvement rate of solid image density of each color.

Evaluation Criteria for Yellow Toner Solid Image Density Improvement Rate

A: Solid image density improvement rate of 5% or more
B: Solid image density improvement rate of 1% to less than 5%
C: Solid image density improvement rate of 0% to less than 1%

D: Decrease in solid image density

A solid image density improvement rate of 1% or more was judged to constitute favorable color tone.

Evaluation Criteria for Magenta Toner Solid Image Density Improvement Rate

A: Solid image density improvement rate of 20% or more
B: Solid image density improvement rate of 10% to less than 20%
C: Solid image density improvement rate of 5% to less than 10%
D: Solid image density improvement rate of less than 5%

A solid image density improvement rate of 10% or more was judged to constitute favorable tinting strength.

Evaluation Criteria for Cyan Toner Solid Image Density Improvement Rate

A: Solid image density improvement rate of 30% or more
B: Solid image density improvement rate of 20% to less than 30%
C: Solid image density improvement rate of 10% to less than 20%
D: Solid image density improvement rate of less than 10%

A solid image density improvement rate of 20% or more was judged to constitute favorable tinting strength.

Evaluation Criteria for Black Toner Solid Image Density Improvement Rate

A: Solid image density improvement rate of 60% or more
B: Solid image density improvement rate of 40% to less than 60%
C: Solid image density improvement rate of 20% to less than 40%
D: Solid image density improvement rate of less than 20%

A solid image density improvement rate of 40% or more was judged to constitute favorable tinting strength.

Comparative Example 15

Tinting strength was evaluated using the same method as Example 15 for comparative yellow toners (Tnr-Y50) to (Tnr-Y52) and (Tnr-Y102) to (Tnr-Y104), comparative magenta toners (Tnr-M50) to (Tnr-M52) and (Tnr-M102) to (Tnr-M104), comparative cyan toners (Tnr-050) to (Tnr-052) and (Tnr-C102) to (Tnr-C104) and comparative black toners (Tnr-Bk50) to (Tnr-Bk52) and (Tnr-Bk102) to (Tnr-Bk104).

The solid image density improvement rates of the above-mentioned comparative yellow toners (Tnr-Y50) to (Tnr-Y52) were evaluated using the solid image density of reference yellow toner (Tnr-Y47) as a reference value.

The solid image density improvement rates of the above-mentioned comparative yellow toners (Tnr-Y102) to (Tnr-Y104) were evaluated using the solid image density of reference yellow toner (Tnr-Y99) as a reference value.

The solid image density improvement rates of the above-mentioned comparative magenta toners (Tnr-M50) to (Tnr-M52) were evaluated using the solid image density of reference magenta toner (Tnr-M47) as a reference value.

The solid image density improvement rates of the above-mentioned comparative magenta toners (Tnr-M102) to (Tnr-M104) were evaluated using the solid image density of reference magenta toner (Tnr-M99) as a reference value.

The solid image density improvement rates of the above-mentioned comparative cyan toners (Tnr-050) to (Tnr-052) were evaluated using the solid image density of reference cyan toner (Tnr-C47) as a reference value.

The solid image density improvement rates of the above-mentioned comparative cyan toners (Tnr-C102) to (Tnr-C104) were evaluated using the solid image density of reference cyan toner (Tnr-C99) as a reference value.

The solid image density improvement rates of the above-mentioned comparative black toners (Tnr-Bk50) to (Tnr-Bk52) were evaluated using the solid image density of reference black toner (Tnr-Bk47) as a reference value.

The solid image density improvement rates of the above-mentioned comparative black toners (Tnr-Bk102) to (Tnr-Bk104) were evaluated using the solid image density of reference black toner (Tnr-Bk99) as a reference value.

The results of evaluating the tinting strength of the toners of the present invention, reference toners and comparative toners of each color produced according to the suspension polymerization method are shown in Table 4, while the results of evaluating the tinting strength of the toners of the present invention, reference toners and comparative toners of each color produced according to the suspension granulation method are shown in Table 5.

TABLE 4

Evaluation Results of Suspension Polymerization Toners

| Compound | Yellow | | Magenta | | Cyan | | Black | |
| --- | --- | --- | --- | --- | --- | --- | --- | --- |
| | Toner | Tinting strength | Toner | Tinting strength | Toner | Tinting strength | Toner | Tinting strength |
| C-1 | Tnr-Y 1 | A | Tnr-M 1 | A | Tnr-C 1 | A | Tnr-Bk 1 | A |
| C-2 | Tnr-Y 2 | A | Tnr-M 2 | A | Tnr-C 2 | A | Tnr-Bk 2 | A |
| C-3 | Tnr-Y 3 | A | Tnr-M 3 | A | Tnr-C 3 | A | Tnr-Bk 3 | A |
| C-4 | Tnr-Y 4 | A | Tnr-M 4 | A | Tnr-C 4 | A | Tnr-Bk 4 | A |
| C-5 | Tnr-Y 5 | A | Tnr-M 5 | A | Tnr-C 5 | A | Tnr-Bk 5 | A |
| C-6 | Tnr-Y 6 | A | Tnr-M 6 | A | Tnr-C 6 | A | Tnr-Bk 6 | A |
| C-7 | Tnr-Y 7 | A | Tnr-M 7 | A | Tnr-C 7 | A | Tnr-Bk 7 | A |
| C-8 | Tnr-Y 8 | A | Tnr-M 8 | A | Tnr-C 8 | A | Tnr-Bk 8 | A |
| C-9 | Tnr-Y 9 | A | Tnr-M 9 | A | Tnr-C 9 | A | Tnr-Bk 9 | A |
| C-10 | Tnr-Y 10 | A | Tnr-M 10 | A | Tnr-C 10 | A | Tnr-Bk 10 | A |
| C-11 | Tnr-Y 11 | A | Tnr-M 11 | A | Tnr-C 11 | A | Tnr-Bk 11 | A |
| C-12 | Tnr-Y 12 | A | Tnr-M 12 | A | Tnr-C 12 | A | Tnr-Bk 12 | B |
| C-13 | Tnr-Y 13 | A | Tnr-M 13 | A | Tnr-C 13 | A | Tnr-Bk 13 | A |
| C-14 | Tnr-Y 14 | A | Tnr-M 14 | A | Tnr-C 14 | A | Tnr-Bk 14 | A |
| C-15 | Tnr-Y 15 | A | Tnr-M 15 | A | Tnr-C 15 | A | Tnr-Bk 15 | A |
| C-16 | Tnr-Y 16 | A | Tnr-M 16 | A | Tnr-C 16 | A | Tnr-Bk 16 | A |
| C-17 | Tnr-Y 17 | A | Tnr-M 17 | A | Tnr-C 17 | A | Tnr-Bk 17 | A |
| C-18 | Tnr-Y 18 | A | Tnr-M 18 | A | Tnr-C 18 | A | Tnr-Bk 18 | A |

TABLE 4-continued

Evaluation Results of Suspension Polymerization Toners

| Compound | Yellow Toner | Tinting strength | Magenta Toner | Tinting strength | Cyan Toner | Tinting strength | Black Toner | Tinting strength |
|---|---|---|---|---|---|---|---|---|
| C-19 | Tnr-Y 19 | A | Tnr-M 19 | A | Tnr-C 19 | A | Tnr-Bk 19 | A |
| C-20 | Tnr-Y 20 | A | Tnr-M 20 | A | Tnr-C 20 | A | Tnr-Bk 20 | A |
| C-21 | Tnr-Y 21 | A | Tnr-M 21 | A | Tnr-C 21 | A | Tnr-Bk 21 | A |
| C-22 | Tnr-Y 22 | A | Tnr-M 22 | A | Tnr-C 22 | A | Tnr-Bk 22 | A |
| C-23 | Tnr-Y 23 | A | Tnr-M 23 | A | Tnr-C 23 | A | Tnr-Bk 23 | A |
| C-24 | Tnr-Y 24 | A | Tnr-M 24 | A | Tnr-C 24 | A | Tnr-Bk 24 | A |
| C-25 | Tnr-Y 25 | A | Tnr-M 25 | A | Tnr-C 25 | A | Tnr-Bk 25 | A |
| C-26 | Tnr-Y 26 | A | Tnr-M 26 | A | Tnr-C 26 | A | Tnr-Bk 26 | A |
| C-27 | Tnr-Y 27 | A | Tnr-M 27 | A | Tnr-C 27 | A | Tnr-Bk 27 | A |
| C-28 | Tnr-Y 28 | A | Tnr-M 28 | A | Tnr-C 28 | A | Tnr-Bk 28 | A |
| C-29 | Tnr-Y 29 | A | Tnr-M 29 | A | Tnr-C 29 | A | Tnr-Bk 29 | A |
| C-30 | Tnr-Y 30 | A | Tnr-M 30 | A | Tnr-C 30 | A | Tnr-Bk 30 | A |
| C-31 | Tnr-Y 31 | A | Tnr-M 31 | A | Tnr-C 31 | A | Tnr-Bk 31 | A |
| C-32 | Tnr-Y 32 | A | Tnr-M 32 | A | Tnr-C 32 | A | Tnr-Bk 32 | A |
| C-33 | Tnr-Y 33 | A | Tnr-M 33 | A | Tnr-C 33 | A | Tnr-Bk 33 | A |
| C-34 | Tnr-Y 34 | A | Tnr-M 34 | A | Tnr-C 34 | A | Tnr-Bk 34 | A |
| C-35 | Tnr-Y 35 | A | Tnr-M 35 | A | Tnr-C 35 | A | Tnr-Bk 35 | A |
| C-36 | Tnr-Y 36 | A | Tnr-M 36 | A | Tnr-C 36 | A | Tnr-Bk 36 | A |
| C-37 | Tnr-Y 37 | A | Tnr-M 37 | A | Tnr-C 37 | A | Tnr-Bk 37 | A |
| C-38 | Tnr-Y 38 | A | Tnr-M 38 | A | Tnr-C 38 | A | Tnr-Bk 38 | A |
| C-39 | Tnr-Y 39 | A | Tnr-M 39 | A | Tnr-C 39 | A | Tnr-Bk 39 | A |
| C-40 | Tnr-Y 40 | A | Tnr-M 40 | A | Tnr-C 40 | A | Tnr-Bk 40 | A |
| C-41 | Tnr-Y 41 | A | Tnr-M 41 | A | Tnr-C 41 | A | Tnr-Bk 41 | A |
| C-42 | Tnr-Y 42 | A | Tnr-M 42 | A | Tnr-C 42 | A | Tnr-Bk 42 | A |
| C-43 | Tnr-Y 43 | A | Tnr-M 43 | A | Tnr-C 43 | A | Tnr-Bk 43 | A |
| C-44 | Tnr-Y 44 | A | Tnr-M 44 | A | Tnr-C 44 | A | Tnr-Bk 44 | A |
| C-1 | Tnr-Y 45 | A | Tnr-M 45 | A | Tnr-C 45 | A | Tnr-Bk 45 | A |
| C-1 | Tnr-Y 46 | A | Tnr-M 46 | A | Tnr-C 46 | B | Tnr-Bk 46 | A |
| none | Tnr-Y 47 | — | Tnr-M 47 | — | Tnr-C 47 | — | Tnr-Bk 47 | — |
| none | Tnr-Y 48 | — | Tnr-M 48 | — | Tnr-C 48 | — | Tnr-Bk 48 | — |
| none | Tnr-Y 49 | — | Tnr-M 49 | — | Tnr-C 49 | — | Tnr-Bk 49 | — |
| C-45 | Tnr-Y 50 | D | Tnr-M 50 | D | Tnr-C 50 | D | Tnr-Bk 50 | D |
| Comparative Compound 1 | | | | | | | | |
| Comparative Compound 2 | Tnr-Y 51 | D | Tnr-M 51 | D | Tnr-C 51 | D | Tnr-Bk 51 | D |
| Comparative Compound 3 | Tnr-Y 52 | B | Tnr-M 52 | A | Tnr-C 52 | B | Tnr-Bk 52 | A |

TABLE 5

Evaluation Results of Suspension Granulation Toners

| Compound | Yellow Toner | Tinting strength | Magenta Toner | Tinting strength | Cyan Toner | Tinting strength | Black Toner | Tinting strength |
|---|---|---|---|---|---|---|---|---|
| C-1 | Tnr-Y 53 | A | Tnr-M 53 | A | Tnr-C 53 | A | Tnr-Bk 53 | A |
| C-2 | Tnr-Y 54 | A | Tnr-M 54 | A | Tnr-C 54 | A | Tnr-Bk 54 | A |
| C-3 | Tnr-Y 55 | A | Tnr-M 55 | A | Tnr-C 55 | A | Tnr-Bk 55 | A |
| C-4 | Tnr-Y 56 | A | Tnr-M 56 | A | Tnr-C 56 | A | Tnr-Bk 56 | A |
| C-5 | Tnr-Y 57 | A | Tnr-M 57 | A | Tnr-C 57 | A | Tnr-Bk 57 | A |
| C-6 | Tnr-Y 58 | A | Tnr-M 58 | A | Tnr-C 58 | A | Tnr-Bk 58 | A |
| C-7 | Tnr-Y 59 | A | Tnr-M 59 | A | Tnr-C 59 | A | Tnr-Bk 59 | A |
| C-8 | Tnr-Y 60 | A | Tnr-M 60 | A | Tnr-C 60 | A | Tnr-Bk 60 | A |
| C-9 | Tnr-Y 61 | A | Tnr-M 61 | A | Tnr-C 61 | A | Tnr-Bk 61 | A |
| C-10 | Tnr-Y 62 | A | Tnr-M 62 | A | Tnr-C 62 | A | Tnr-Bk 62 | A |
| C-11 | Tnr-Y 63 | A | Tnr-M 63 | A | Tnr-C 63 | A | Tnr-Bk 63 | A |
| C-12 | Tnr-Y 64 | A | Tnr-M 64 | A | Tnr-C 64 | A | Tnr-Bk 64 | B |
| C-13 | Tnr-Y 65 | A | Tnr-M 65 | A | Tnr-C 65 | A | Tnr-Bk 65 | A |
| C-14 | Tnr-Y 66 | A | Tnr-M 66 | A | Tnr-C 66 | A | Tnr-Bk 66 | A |
| C-15 | Tnr-Y 67 | A | Tnr-M 67 | A | Tnr-C 67 | A | Tnr-Bk 67 | A |
| C-16 | Tnr-Y 68 | A | Tnr-M 68 | A | Tnr-C 68 | A | Tnr-Bk 68 | A |
| C-17 | Tnr-Y 69 | A | Tnr-M 69 | A | Tnr-C 69 | A | Tnr-Bk 69 | A |
| C-18 | Tnr-Y 70 | A | Tnr-M 70 | A | Tnr-C 70 | A | Tnr-Bk 70 | A |
| C-19 | Tnr-Y 71 | A | Tnr-M 71 | A | Tnr-C 71 | A | Tnr-Bk 71 | A |
| C-20 | Tnr-Y 72 | A | Tnr-M 72 | A | Tnr-C 72 | A | Tnr-Bk 72 | A |

TABLE 5-continued

Evaluation Resultsof Suspension Granulation Toners

| Compound | Yellow Toner | Tinting strength | Magenta Toner | Tinting strength | Cyan Toner | Tinting strength | Black Toner | Tinting strength |
|---|---|---|---|---|---|---|---|---|
| C-21 | Tnr-Y 73 | A | Tnr-M 73 | A | Tnr-C 73 | A | Tnr-Bk 73 | A |
| C-22 | Tnr-Y 74 | A | Tnr-M 74 | A | Tnr-C 74 | A | Tnr-Bk 74 | A |
| C-23 | Tnr-Y 75 | A | Tnr-M 75 | A | Tnr-C 75 | A | Tnr-Bk 75 | A |
| C-24 | Tnr-Y 76 | A | Tnr-M 76 | A | Tnr-C 76 | A | Tnr-Bk 76 | A |
| C-25 | Tnr-Y 77 | A | Tnr-M 77 | A | Tnr-C 77 | A | Tnr-Bk 77 | A |
| C-26 | Tnr-Y 78 | A | Tnr-M 78 | A | Tnr-C 78 | A | Tnr-Bk 78 | A |
| C-27 | Tnr-Y 79 | A | Tnr-M 79 | A | Tnr-C 79 | A | Tnr-Bk 79 | A |
| C-28 | Tnr-Y 80 | A | Tnr-M 80 | A | Tnr-C 80 | A | Tnr-Bk 80 | A |
| C-29 | Tnr-Y 81 | A | Tnr-M 81 | A | Tnr-C 81 | A | Tnr-Bk 81 | A |
| C-30 | Tnr-Y 82 | A | Tnr-M 82 | A | Tnr-C 82 | A | Tnr-Bk 82 | A |
| C-31 | Tnr-Y 83 | A | Tnr-M 83 | A | Tnr-C 83 | A | Tnr-Bk 83 | A |
| C-32 | Tnr-Y 84 | A | Tnr-M 84 | A | Tnr-C 84 | A | Tnr-Bk 84 | A |
| C-33 | Tnr-Y 85 | A | Tnr-M 85 | A | Tnr-C 85 | A | Tnr-Bk 85 | A |
| C-34 | Tnr-Y 86 | A | Tnr-M 86 | A | Tnr-C 86 | A | Tnr-Bk 86 | A |
| C-35 | Tnr-Y 87 | A | Tnr-M 87 | A | Tnr-C 87 | A | Tnr-Bk 87 | A |
| C-36 | Tnr-Y 88 | A | Tnr-M 88 | A | Tnr-C 88 | A | Tnr-Bk 88 | A |
| C-37 | Tnr-Y 89 | A | Tnr-M 89 | A | Tnr-C 89 | A | Tnr-Bk 89 | A |
| C-38 | Tnr-Y 90 | A | Tnr-M 90 | A | Tnr-C 90 | A | Tnr-Bk 90 | A |
| C-39 | Tnr-Y 91 | A | Tnr-M 91 | A | Tnr-C 91 | A | Tnr-Bk 91 | A |
| C-40 | Tnr-Y 92 | A | Tnr-M 92 | A | Tnr-C 92 | A | Tnr-Bk 92 | A |
| C-41 | Tnr-Y 93 | A | Tnr-M 93 | A | Tnr-C 93 | A | Tnr-Bk 93 | A |
| C-42 | Tnr-Y 94 | A | Tnr-M 94 | A | Tnr-C 94 | A | Tnr-Bk 94 | A |
| C-43 | Tnr-Y 95 | A | Tnr-M 95 | A | Tnr-C 95 | A | Tnr-Bk 95 | A |
| C-44 | Tnr-Y 96 | A | Tnr-M 96 | A | Tnr-C 96 | A | Tnr-Bk 96 | A |
| C-1 | Tnr-Y 97 | A | Tnr-M 97 | A | Tnr-C 97 | B | Tnr-Bk 97 | A |
| C-1 | Tnr-Y 98 | A | Tnr-M 98 | A | Tnr-C 98 | B | Tnr-Bk 98 | A |
| none | Tnr-Y 99 | — | Tnr-M 99 | — | Tnr-C 99 | — | Tnr-Bk 99 | — |
| none | Tnr-Y 100 | — | Tnr-M 100 | — | Tnr-C 100 | — | Tnr-Bk 100 | — |
| none | Tnr-Y 101 | — | Tnr-M 101 | — | Tnr-C 101 | — | Tnr-Bk 101 | — |
| C-45 | Tnr-Y 102 | D | Tnr-M 102 | D | Tnr-C 102 | D | Tnr-Bk 102 | D |
| Comparative Compound 1 | | | | | | | | |
| Comparative Compound 2 | Tnr-Y 103 | D | Tnr-M 103 | D | Tnr-C 103 | D | Tnr-Bk 103 | D |
| Comparative Compound 3 | Tnr-Y 104 | B | Tnr-M 104 | A | Tnr-C 104 | B | Tnr-Bk 104 | A |

As shown in Table 3, the use of the compound having an azo skeleton structure of the present invention was confirmed to allow the obtaining of a pigment composition and pigment dispersion having favorable pigment dispersibility.

In addition, as shown in Table 4, the use of the compound having an azo skeleton structure of the present invention was confirmed to improve dispersibility of pigment in binder resin and provide yellow, magenta, cyan and black toner having high tinting strength. Moreover, as shown in Table 5, improvement of dispersibility of pigment in binder resin and the providing of yellow, magenta, cyan and black toner having high tinting strength were similarly confirmed when produced according to the suspension granulation method as well.

INDUSTRIAL APPLICABILITY

The compound of the present invention is preferably used as a dispersing agent for dispersing a pigment in a non-water-soluble solvent. In addition, the compound of the present invention is not only used as a pigment dispersing agent, but can also be used as colorant for an electrophotographic toner, inkjet ink, heat-sensitive transfer recording sheet, or a color filter, or pigment for an optical recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-177371, filed Aug. 28, 2013, which is hereby incorporated by reference herein in its entirety.

The invention claimed is:

1. A compound in which a partial structure represented by formula (1) is bound to a polymer having a monomer unit represented by formula (2):

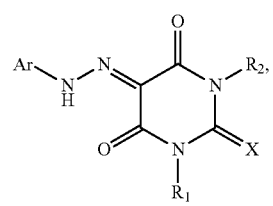

(1)

wherein:
Ar represents an aryl group,
Ar, $R_1$ and $R_2$ satisfy at least one of conditions (i) and (ii):

(i) Ar has a linking group that composes a bonding moiety with the polymer obtained by bonding to a carbon atom in the aryl group; and
(ii) $R_1$ or $R_2$ is a linking group that composes a bonding moiety with the polymer,
in a case $R_1$ and $R_2$ are not linking groups, $R_1$ and $R_2$ each independently represents a hydrogen atom, an alkyl group, a phenyl group, or an aralkyl group, and
X represents O, NH, or S; and

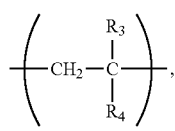
(2)

wherein $R_3$ represents a hydrogen atom or an alkyl group, and $R_4$ represents a phenyl group, a carboxyl group, a carboxylic acid ester group, or a carboxylic acid amide group.

2. The compound according to claim 1, wherein the partial structure represented by the formula (1) is represented by formula (3):

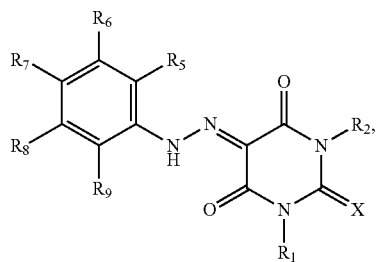
(3)

wherein:
at least one of $R_1$, $R_2$, $R_5$ to $R_9$ is a substituent for bonding with the polymer as a linking group, and
in a case $R_1$, $R_2$ and $R_5$ to $R_9$ are not linking groups, $R_1$, $R_2$, $R_5$ to $R_9$ each independently represents a hydrogen atom, a $COOR_{10}$ group, or a $CONR_{11}R_{12}$ group, and $R_{10}$ to $R_{12}$ each independently represents a hydrogen atom, an alkyl group, a phenyl group, or an aralkyl group.

3. The compound according to claim 2, wherein, in the partial structure represented by the formula (3):
   i) at least one of $R_5$ to $R_9$ is a linking group; and
   ii) all other $R_5$ to $R_9$ that are not linking groups are hydrogen atoms.

4. The compound according to claim 1, wherein Ar in the partial structure represented by the formula (1):
   i) has a linking group that composes a bonding moiety with the polymer that is obtained by bonding to a carbon atom in the aryl group; and
   ii) does not have a group other than the linking group as a substituent.

5. The compound according to claim 1, wherein $R_1$ and $R_2$ are hydrogen atoms.

6. The compound according to claim 1, wherein X is an oxygen atom.

7. The compound according to claim 1, wherein the linking group contains a carboxylic acid ester bond or a carboxylic acid amide bond.

8. The compound according to claim 1, wherein the polymer bonds with the partial structure represented by the formula (1) through a linking group on an end of a molecular chain, and the linking group contains a carboxylic acid ester bond or a carboxylic acid amide bond.

9. A pigment dispersing agent containing the compound according to claim 1.

10. A pigment composition containing the compound according to claim 1 and a pigment.

11. A pigment dispersion containing the pigment composition according to claim 10 and a non-water-soluble solvent.

12. The pigment dispersion according to claim 11, wherein the non-water-soluble solvent is styrene.

13. A toner comprising toner particles, the toner particles comprising a binder resin and a colorant,
   wherein the colorant is the pigment composition according to claim 10.

14. The toner according to claim 13, wherein the toner is produced in an aqueous medium.

15. The toner according to claim 13, wherein the toner is produced using a suspension polymerization method.

16. The toner according to claim 13, wherein the toner is produced using a suspension granulation method.

* * * * *